(12) United States Patent
Hernandez et al.

(10) Patent No.: US 7,361,279 B2
(45) Date of Patent: Apr. 22, 2008

(54) REMOVING METALS FROM SOLUTION USING METAL BINDING COMPOUNDS AND SORBENTS THEREFOR

(76) Inventors: Mark Hernandez, 4355 Butler Cir., Boulder, CO (US) 80305; Muna Ahmed Abu-Dalo, 9 Haggerty Rd., Potsdam, NY (US) 13676

( * ) Notice: Subject to any disclaimer, the term of this patent is extended or adjusted under 35 U.S.C. 154(b) by 450 days.

(21) Appl. No.: 10/627,947

(22) Filed: Jul. 25, 2003

(65) Prior Publication Data

US 2004/0178149 A1    Sep. 16, 2004

Related U.S. Application Data

(60) Provisional application No. 60/398,688, filed on Jul. 26, 2002.

(51) Int. Cl.
    *C02F 1/28* (2006.01)
(52) U.S. Cl. .................. 210/668; 210/669; 210/688; 210/694
(58) Field of Classification Search ................ 210/668, 210/669, 688, 694, 724, 725, 743, 749; 502/416, 502/417
    See application file for complete search history.

(56) References Cited

U.S. PATENT DOCUMENTS

| 3,870,033 A | 3/1975 | Faylor et al. ............... 392/470 |
| 4,536,189 A | 8/1985 | Sung ............................. 44/56 |
| 5,112,428 A | 5/1992 | Correa et al. ............... 156/324 |
| 5,500,126 A | 3/1996 | Fries .......................... 210/668 |
| 5,645,730 A | 7/1997 | Malachosky et al. ....... 210/665 |

OTHER PUBLICATIONS

C.P. Huang and D.W. Blankenship, "The Removal of Mercury(II) from Dilute Aqueous Solution by Activated Carbon," Water Res., vol. 18., No. 1 (1984).
A. Netzer and D.E. Hughes, "Adsorption of Copper, Lead and Cobalt by Activated Carbon," Water Res., vol. 18, No. 8 (1984).
B.E. Reed, "Identification of Removal Mechanisms for Lead in Granular Activated Carbon (GAC) Columns, Separation Science and Technology," 30(1), pp. 101-116 (1995).
Andrzej Wilczak and Thomas Keinath, "Kinetics of Sorption and Desorption of Copper(II) and Lead(II) on Activated Carbon, Water Environment Research," vol. 65, pp. 238-244 (1993).
Brian E. Reed and Sujith Kumar Nonavinakere, "Metal Adsorption by Activated Carbon: Effect of Complexing Ligands, Competing Adsorbates, Ionic Strength, and Background Electrolyte," Separation Science and Technology, 27(14), pp. 1985-2000 (1992).

(Continued)

*Primary Examiner*—Duane Smith
(74) *Attorney, Agent, or Firm*—Pritzkau Patent Group LLC

(57) ABSTRACT

Removing metals from metal containing acidic solutions, such as contaminated waters and industrial wastewaters, is described. An amphipathic, heterocyclic, metal-coordinating compound (an extraordinaiy ligand) and a sorbent are added to a solution, such that the addition, at a specific acidic pH of the solution, causes at least some of the metal-coordinating compound to bind with some of the metal cations and at least some of the metal-coordinating compound sorbs to the sorbent, along with any metal cations bound therewith. The compound and the sorbent may be added to the solution, either together or independently, so that the compound may bind the metal. The metal binding compound may be a benzotriazole, a benzothiazole, or another compound to bind a metal. The sorbent is selected to interact with the metal-coordinating compound in sequestering the metal from solution as part of a complexation. Thereafter, the ligand-metal complex may be removed from the solution.

26 Claims, 29 Drawing Sheets

OTHER PUBLICATIONS

Alan J. Rubin and Danny L. Mercer, "Effect of Complexation on the Adsorption of Cadmium by Activated Carbon," Separation Science and Technology, 22(5), pp. 1359-1381 (1987).

Margaret A. Shay and James E. Etzel, "Treatment of Metal-Containing Wastewaters by Carbon Adsorption of Metal-Chelate Complexes," 46th Purdue Industrial Waste Conference Proceedings (1992).

John V. Accashian, et al., "Aerobic Growth on Nitroglycerin as the Sole Carbon, Nitrogen, and Energy Source by a Mixed Bacterial Culture," Applied and Environmental Microbiology, pp. 3300-3304 (Sep. 1998).

Devon A. Cancilla et al., "Detection of Aircraft Deicing/Antiiicing Fluid Additives in a Perched Water Monitoring Well at an International Airport," Environ. Sci. Technol. 32, pp. 3834-3835 (1998).

C.B. Cobum, et al., "Environmental effects of engine coolant additives" (Abstract), Chemical Abstracts, vol. 130, No. 22, 300765m, pp. 1052 (1999).

Donald E. DeFord, et al., "The determination of consecutive formation constants of complex ions from polarographic data," J. Am. Chem. Soc. 73, 5321 (1951).

Cyndee L. Gruden, et al., "Fate and toxicity of aircraft deicing fluid additives through anaerobic digestion," Water Environment Research, vol. 73, No. 1, pp. 72-79 (Jan./Feb. 2001).

G. Heath, et al., "The use of differential pulse polarography for the determination of stability constants," Jnl. Electroanal. Chem., 84, pp. 295-302 (1977).

Dana W. Kolpin, et al., "Pharmaceuticals, hormones and other organic wastewater contaminants in U.S. streams, 1999-2000: A national reconnaissance," Environmental Sci. and Technol., vol. 36, No. 6 (2002).

E.P. Parry, et al., "Evaluation of Analytical Pulse Polarography," Analytical Chemistry, vol. 37, No. 13, pp. 1634-1637 (1965).

Mark Hernandez, "Investigation of selected potential environmental contaminants: benzotriazoles," EPA 560/2-77-001 (1977).

Ido Leden, "Einige potentiometrche messungen zur bestimmung de komplexionen in cadmiumsalzlosungen," Eingegangen am 24.1.41, pp. 160-181, Jan. 27, 1991.

Jefferey Cornell, "The environmental impact of 4(5)-Methylbenzotriazole from aircraft deicing operations," University of Colorado (2002).

Arup K. SenGupta (editor), "Environmental separation of heavy metals," chapter 7 by Brian E. Reed, "Removal of heavy metals by activated carbon," CRC Press LLC (2002).

D. R. Crow, "Polarography of metal complexes," Academic Press (1969).

Stanton B. Smith, "Trace metal removal by activated carbon," Princeton University (1973).

T. N. Chen, "Treatment of zinc industrial wastewater by combined chemical precipitation and activated carbon adsorption," 24th Mid-Atlantic Industrial Wastewater Conference, pp. 120-134 (1992).

Benzotriazole 310

(4-Methyl-1H-Benzotriazole)

Benzotriazole 310

(5-Methyl-1H-Benzotriazole)

REMOVING METALS FROM SOLUTION USING METAL BINDING COMPOUNDS AND SORBENTS THEREFOR

RELATED APPLICATION

The present application claims priority from U.S. Provisional Patent Application Ser. No. 60/398,688, bearing the same title, filed on Jul. 26, 2002, which is incorporated herein by reference in its entirety.

STATEMENT OF GOVERNMENT RIGHTS

The present invention was made with United States government support. The government has certain rights in the invention.

BACKGROUND OF THE INVENTION

1. Field of the Invention

The invention relates generally to the removal of metal from an acidic solution. More particularly, the invention relates to the use of a metal binding compound to bind a metal and a sorbent to sorb the compound and allow the compound and the metal bound thereto to be removed from the acidic solution.

2. Background of the Invention

The removal of metal from a variety of metal containing solutions, such as acid (rock) mine drainage and industrial wastewaters, is important for many reasons including to comply with environmental regulations. Examples of metal containing industrial wastewaters include those generated by leather tanning operations, textile manufacturing, electronic "chip" manufacturing, metal plating facilities, precious and semiprecious metal mining operations, nuclear fuel and nuclear weapons processing, and electric power generation (both nuclear and coal). Currently, there are several prior art approaches for removing metals from solution, although none of these approaches provides a perfect approach for all solutions, and new and useful systems and methods for removing metals from solution are desired and needed.

Acid mine drainage and ore processing water are exemplary metal ion bearing solutions. Acid mine drainage is a byproduct of hard rock mining operations that expose sulfide containing minerals to water and oxygen, inducing sulfide mineral oxidation. In aqueous systems, the oxidation of pyrite and other sulfide bearing minerals involves several oxidation/reduction reactions, some involving microbial catalysis, which can result in the formation of highly acidic conditions. As a result, active and abandoned hard rock mines generate millions of gallons of acidic runoff each year, which is commonly termed acid mine drainage. In the state of Colorado alone, it is estimated that there may be around 1000 or more miles of metal ion bearing streams that are impacted by acid mine drainage. Acid mine drainage is generally characterized by very low pH, elevated concentrations of dissolved iron Fe (II) and sulfate $SO_4^{-2}$, and depending on the local geology, oxidation/reduction conditions and pH, a suite of other dissolved metal cations and complexes. Exemplary metal cations found in many environmental waters include those of zinc, copper, mercury, lead, gold, silver, cadmium, uranium, chromium, and others. Many of these solutions are hazardous to humans, plants, and wildlife and have been mandated for treatment by regulatory agencies such as the Environmental Protection Agency (EPA). For example, in the state of Colorado several superfund sites have been dedicated to the prevention, containment and treatment of acid mine drainage and other mining associated metal containing solutions.

Among the remediation strategies that have been used to treat or otherwise recover metals from solution are controlled precipitation, membrane separation processes and immobilization on ion exchange resins. Controlled precipitation is generally accomplished by adding sufficient amounts of base (e.g., carbonate addition) to a metal containing water, processing water or wastewater, in order to shift chemical conditions to a point where metals have decreased solubility and precipitate as solids. One of the disadvantages of this approach is that the alkalinity additions used to drive the reliable precipitation of metals typically found in acid mine drainage, or many other metal containing wastewaters, are well in excess of natural levels and the corresponding reagent masses and volumes can be costly. In general, precipitation processes generate large amounts of metal laden sludge that is difficult and costly to move from the site (e.g., collect and transport) and otherwise dispose of, due in part to its amorphous structure and residual water content. Precious metal recovery from these types of sludges is generally not cost effective.

Ion exchange resins including zeolites have also been used to remove metals from solution. This generally involves introducing a metal containing water or wastewater through a resin bed, often configured as a packed column, to immobilize metal ions on/in sphereoidal beads, which are comprised of, or include, the active resin or zeolite. In this case, metals are exchanged on a charge equivalent basis for nonmetal species, which are liberated into solution as the metals are sequestered from solution. Among the disadvantages of this approach is that resin performance is very pH sensitive, results in other ions in solution (often hydrogen, an alkali (e.g. sodium) or alkali earth element) and that it is relatively expensive to implement; generally resin exchange is not well suited for in situ treatment (i.e., the waters need to be pumped through a packed bed rather than being treated in their natural place). Many, ion exchange resins that are employed for metal removal are so pH sensitive such that extremely narrow pH operating ranges are used to obtain effective exchange, which can need copious reagent additions prior to exchange treatment. Further, resin exchange processes are sensitive to the presence of suspended solids and colloidals such that pretreatments are often needed to remove particulate matter prior to ion exchange.

The prior art contains many examples of attempting to sorb metals directly from solution. While these processes are typically shown to be effective at neutral or higher pH, they are essentially ineffective in acidic pH ranges. See, for example:

Chen, T. N. and C. P. Haung (1992). "Treatment of zinc industrial; wastewater by combined chemical precipitation and activated carbon adsorption." 24*th Midatlantic industrial wastewater conference*: 120-134.

Huang, C. P. and D. W. Blankenship (1984). "The removal of mercury(II) from dilute aqueous solution by activated carbon." *Wat. Res.* 18(1): 37-46.

Kim, L. (1976). Adsorption of chromium on activated carbon. Gainesville, Fla., University of Florida.

Netzer, A. and D. E. Hughes (1984). "Adsorption of copper, lead and cobalt by activated carbon." *Wat. Res.* 18(8): 927-933.

Reed, B. E. (1995). "Identification of removal mechanisms for lead in granular activated carbon(GAC) column." *Separation Science and Technology* 30(1): 101-116.

SenGupta, A. K. (2002). *Environmental separation of heavy metals*. Boca Raton, Fla., CRC press LLC.

Smith, S. B. (1973). *Trace metal removal by activated carbon*. Traces of heavy metals in water:Removal Processes and monitoring, Princeton University, NJ.

Wilezak, A. and T. M. Keinath (1993). "Kinetics of sorption and desorption of copper(II) and lead(II) on activated carbon." *Water Environment Research* 65(3): 238-244.

The prior art also contains examples of attempts to use metal-coordinating organic compounds to enhance metal immobilization on activated carbon. These previous attempts used metal binding agents such as, for example: Ethylenediaminetetracetate (EDTA), porphyrin and porphyrin-containing compounds, citrate and citrate-containing compounds and dimercaprol. These attempts are outlined in the following scientific literature:

Reed, B. E. and S. K. Nonavinakere (1992). "Metal adsorption by activated carbon: Effect of complexing ligands, competing adsorbates, ionic strength, and background electrolyte." *Separation Science and Technology* 27(14): 1985-2000.

Rubin, A. J. and D. L. Mercer (1987). "Effect of complexation on the sorption of cadmium by activated carbon." *Separation Science and Technology* 22(5): 1359-1381.

Shay, M. and J. E. Etzel (1992). "Treatment of metal-containing wastewater by carbon adsorption of metal-chelate complexes." *Proc. Purdue Ind. Waste conf.* 46th: 563-569.

A general review of using complexing metal ligands to enhance the sorption of heavy metals is presented in:

SenGupta, A. K. (2002). *Environmental separation of heavy metals*. Boca Raton, Fla., CRC press LLC.

It is recognized by the present invention, as will be described in further detail below, that such use of metal-coordinating organic compounds in the prior art, as exemplified by the last four citations immediately above, appear to share two difficulties: (i) there is limited enhancement of the immobilization of metals, as compared with activated carbon used alone, and (ii) process efficiency drops markedly at depressed pH (i.e., these attempts fail to be significant below pH 4.5). It is noted that the cited prior art appears to be devoid of any use of Benzotriazole, any of its derivatives, or other Benzotriazole-containing compounds, or; Benzothiazoles, any of its derivatives, or other benzothiazole-containing compounds in remediation processes that are performed with acidic solutions.

In view of the foregoing, the prior art is replete with examples of successful wastewater treatment at approximately neutral or higher pH in performing metal contamination remediation, as well as for other purposes. As one example of the latter, benzotriazoles, as used, for instance, in aircraft deicing fluid, were demonstrated to be removable from wastewater in the scientific literature using a sorbent. See Anaerobic Digestion of Deicing Fluids: Interactions and Toxicity of Corrosion Inhibitors and Surfactants by C. Gruden, et al. Water Environment Research 74 (2): 149-158 (2002) and Fate and Toxicity of Aircraft Deicing Fluid Additives through Anaerobic Digestion by C. L. Gruden, et al. Water Environment Research. 73(1):72-79 (2001).

With such a catalog of successful prior art approaches available for use in basic wastewater, it is submitted that the prior art teaches directly away from attempting to remove metal contamination from acidic solutions. One of ordinary skill in the art, when faced with the task of removing metal contamination from an acidic solution is motivated, at the outset, by the prior art to first convert the acidic solution to a near neutral or basic solution for the subsequent application of these successful prior art approaches. Unfortunately, conversion to the basic solution can itself be quite costly, while introducing further contamination issues.

Aside from such general past use of metal-coordinating organic compounds, there have been attempts to remove metal contamination from acidic solutions, all of these attempts are considered to have met with limited, if any, success at least from a practical standpoint. For example, in the 1980's, a binder and sorbent were added to such an acidic solution. It was found that the binder, in this particular attempt, made essentially no contribution to a minimal amount of metal that was removed. That is, consistent with the remaining prior art, the result with the binder was no different than the result with the sorbent alone, clearly evidencing that the mechanism of metal removal was limited to sorption of the metal directly onto the sorbent. For these reasons, it is submitted there is simply no practical approach available in the prior art for treating metal contaminated acidic wastewater. This latter assertion may be evidenced by the ever increasing amount of untreated acidic wastewater contamination that is present throughout the world.

Accordingly, there is a need in the art for other useful and novel systems and methods for removing metals from solutions.

SUMMARY OF THE INVENTION

As will be described in more detail hereinafter, there is disclosed herein an arrangement and associated method for use in a solution having a specific acidic pH and containing metal cations. In one aspect of the invention, an amphipathic, heterocyclic, metal-coordinating compound and a sorbent are added to the solution, such that the addition at the specific acidic pH causes at least some of the metal-coordinating compound to bind with some of the metal cations and at least some of the metal-coordinating compound sorbs to the sorbent, along with any metal cations bound therewith.

In another aspect of the present invention, the metal cations which are bound with the metal-coordinating compound, and the metal-coordinating compound sorbed to the sorbent form a complexation. The metal cations are removed from the complexation to recover a base metal of the metal cations.

In still another aspect of the present invention, in a solution having a specific acidic pH and containing metal cations, after adding the metal-coordinating compound and the sorbent to the solution, at least some of the metal-coordinating compound and at least some of the sorbent cooperate at the specific acidic pH to sequester at least some of the metal cations from the solution.

In yet another aspect of the present invention, in a solution, having a specific acidic pH, that is contaminated with metal cations, at least some of the metal cations are bound to an amphipathic, heterocyclic metal-coordinating compound, at the specific acidic pH, for subsequent use.

In a continuing aspect of the present invention, for use in a system for removing metal cations from a solution having a specific acidic pH, an arrangement includes a filter enclosure defining an interior for supporting a flow of the solution therethrough. An amphipathic, heterocyclic metal-coordinating compound and a sorbent are received within the interior of the filter enclosure for exposure to the flow of the solution such that the metal-coordinating compound and the sorbent cooperate at the specific acidic pH to sequester at least some of the metal cations from solution.

In another aspect of the present invention, for use in a system in which metal cations are removed from a solution having a specific acidic pH, a product includes a container arrangement containing (i) an amphipathic, heterocyclic metal-coordinating compound and (ii) a sorbent, which container arrangement is adapted for exposing the metal-coordinating compound and the sorbent to the solution, such that at least some of the metal cations bind with the metal-coordinating compound at the specific acidic pH and so that at least some of the metal-coordinating compound sorbs to the sorbent at the specific acidic pH, along with any metal cations bound therewith.

BRIEF DESCRIPTION OF THE SEVERAL VIEWS OF THE DRAWINGS

The novel features that are characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

Figure 1:
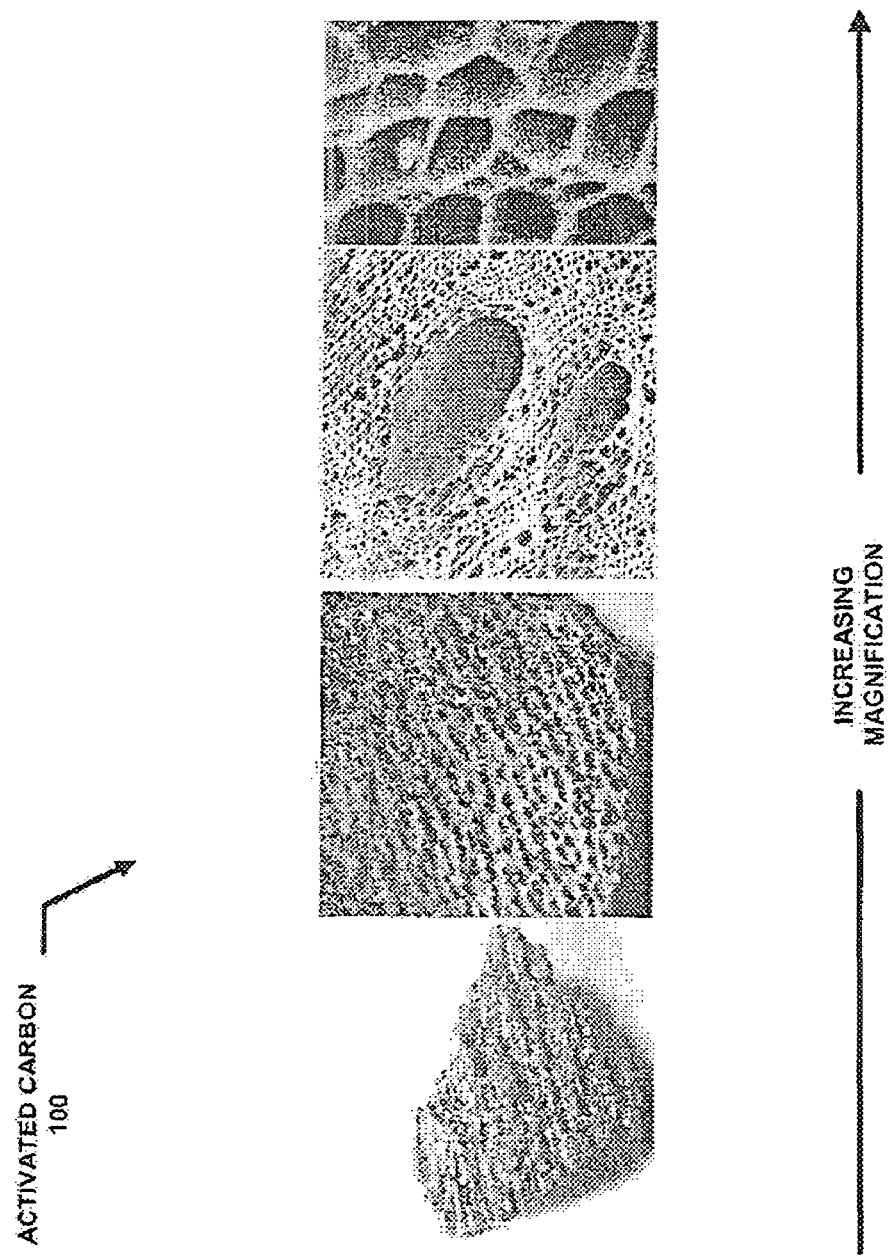
FIG. 1 shows different views (microscopic and macroscopic) of a sorbent, in this case an activated carbon particle, according to one embodiment of the present invention.

Disclosed herein are novel and useful systems and methods for removing metals from such metal containing solutions as acid mine drainage and industrial wastewaters. In the following description, for the purpose of explanation, numerous specific details are set forth in order to provide a thorough understanding of the present invention. It will be apparent, however, to one skilled in the art that the present invention may be practiced without some of these specific details. For example, other sorbents and metal binding compounds that those specifically disclosed herein may be used in alternate embodiments of the present invention. In other instances, well known structures and devices are shown in block diagram form.

In a typical embodiment of the present invention, a metal binding compound may be used to bind a metal in soultion and a sorbent may be used to sorb the compound so that the metal may be removed from the solution. In specific embodiments of the present invention, a benzotriazole, benzothiazole, EDTA, porphyrin, and dimercaprol, or some other metal binding compound may be used to bind arsenic, cadmium, cobalt, copper, gold, iron, lead, mercury, nickel, selenium, silver, zinc, or some other metal, and a sorbent, such as an activated carbon, a charcoal, a natural sorbent, an industrial sorbent, a polypropylene sorbent, an oil spill sorbent, or some other sorbent may be used to sorb the compound and potentially allow the compound and the metal to be removed from solution.

As used herein, the term metal will be used to include both metals and metalloids of the periodic table of the elements. The metals of the periodic table of the elements include alkali metals (e.g., lithium, cesium, etc.) alkaline earth metals (e.g., magnesium, calcium, strontium, etc.), and transition metal elements from all of the Groups 1B-8B (including the row 6 Lanthanides and the row 7 Actinides). The terms metalloid, semimetal and the like are used to refer to an element of the periodic table of the elements that has properties that fall between the extremes of metals and nonmetals. Exemplary metalloids include arsenic, antimony, boron, tellurium, and selenium, among others. The metals may exist as ions, as is common in many environmental and industrial treatment conditions, or as combinations, complexes, or coordinates of the metal elements or ions, regardless of their charge or solubility. The combinations, complexes, or coordinates may include combinations with other elements or compounds (e.g., colloidal precipitates, regardless of their size or crystallinity). Metal binding compounds, such as benzotriazole, are suitable to bind such metals (metals and metalloids).

As used herein, the terms bind, binding, and the like will be used to refer to a chemical interaction, linkage, attachment, or bond between a metal and a metal binding compound that allows the compound to bind and hold the metal. The terms bind, binding, and the like will include at least the chemical linkages, attachments, and bonds associated with coordinates and chelates between metals (including metalloids and non-ions) and compounds.

As used herein, the term solution will be used to include natural waters, potable waters, ground water, storm water, storm/snow/rainwater runoff, wastewaters, and industrial discharges. The solution will often be an aqueous solution, although this is not required.

As used herein, the term metal binding compound will be a compound that is able to bind a metal. The compound may be a ligand. A ligand is a compound with an affinity to bind to a second atom (such as a metal atom or ion) or molecule (such as a colloidal precipitate of a metal or organometallic compound containing a metal). The ligand and the second atom or molecule may have noncovalent interactions, such as the type of electrostatic binding that occurs in enzymes that are specific for certain substrates, or covalent interactions or bonds, such as the covalent interactions or bonds that may exist between a metal and a coordinating, chelating, or organometallic compound. Exemplary metal binding compounds include benzotriazole, benzothiazole, EDTA, porphyrin, and dimercaprol. Of course, it is also contemplated that many other anticorrosion compounds, metal coordinating compounds, chelating agents, and other metal binding organic compounds may also be used. As is well known, a ligand may coordinate, chelate or otherwise bind a metal regardless of whether or not the metal is alone, or in combination, coordination, or complexation, and regardless of whether or not the metal is in charged or uncharged form. As is known, a chelate is an inorganic complex in which a compound is coordinated to a metal element at two (or more) points having structure that is held by coordinate covalent or ionic bonds. Some metal binding compounds will have at least a portion that favorably sorbs to a sorbent, such as a hydrophobic portion or moiety that favorably sorbs to an activated carbon, and in one instance the compound may be amphipathic, meaning it has both hydrophobic and hydrophilic portions.

As used herein, the term sorbent will be used to refer to a material that is able to sorb a compound. Sorption is the process of a compound partitioning from a solution onto or into, or both onto and into, a sorbent surface or interior. Adsorbents take up and hold compounds onto their surfaces. Absorbents take up and hold compounds within their inner structure. The term sorbent will be used to collectively refer to adsorbents, absorbents, and materials that are both absorbents and absorbents.

Sorbents

A sorbent may be used to sorb a metal binding compound in a dissolved form or existing as a colloidal particle, a clearly defined precipitate, a poorly soluble complex (amorphous or crystalline), or otherwise. A variety of materials may be used as sorbents, including solid phase and amorphous solid phase material that presents surfaces or interiors for adsorption or absorption of compounds.

Activated carbon is one example of a common commercial sorbent that may remove various types of compounds (including compounds that contain hydrophobic portions) from a solution by sorbing the compounds. An activated carbon is a high carbon content sorbent material usually made by carbonization and chemical activation of a starting material. Activated carbon is often considered an adsorbent but may also be an absorbent. Activated carbon is used widely in the water and wastewater treatment industries and is well tested. As an example, organic compounds having nonpolar moieties collect as adsorbed compounds on the surface of activated carbon particles. The activated carbon is an effective adsorbent due in part to a large surface area, relative to its volume as a result of a large number of pores. The surface area and pore sizes of activated carbon particles may vary widely, depending upon the source of the activated carbon (e.g., coal, wood, coconut shells, peat, and petroleum residues) and how it is prepared and activated, although it is not uncommon for the area to be between about 100-2,000 square meters, or more, per gram of activated carbon. The activated carbon is able to sorb hydrophobic compounds, due to chemical and physical attractions, such as van der Waals forces, hydrophobic and hydrophilic interactions, and other electrostatic interactions that render the partitioning of compounds onto the surface favorable. The compounds may adsorb anywhere on the activated carbon particles, including on the exterior of activated carbon particles, and on the surfaces of internal pores.

Some of the significant characteristics of a particular activated carbon include its particle size, particle shape (e.g., void space between particles), total surface area, and pore structure, particle size distribution, pore size distribution, and industrial affinity standards for accepted compounds such as iodine. The activated carbon is often prepared by dehydration, carbonization, and activation. The dehydration and carbonization are often performed by slowly heating a precursor (e.g., wood) in an anaerobic environment. Sometimes chemicals such as zinc chloride or phosphoric acid are added to enhance the carbonization process. The carbonized form is often activated by an exposure to an oxidizing gas.

Activated carbon commonly comes in granular and powdered forms. The granular form may be prepared with any standard sieve or mesh size that is desired for the particular implementation. The powdered form may include sufficiently powdered carbon corresponding to a very small mesh size or unmeshed powder. The smaller sized particles and powdered forms often provide better access to the surface area and faster rates of adsorption compared to larger sized particles. Both forms are suitable. Both powdered and granular activated carbon particles, and the compounds sorbed to them, may be recovered by gravitational settling, centrifugation, or filtration. Powdered activated carbon can also be removed by dissolved air flotation techniques. However, the granular forms often allow easier separation and removal compared to the powdered forms although, powdered forms are often used in conjunction with biological wastewater treatment processes using activated sludge. Powdered activated carbon forms may be incorporated into the polysaccharide matrixes established by bacteria (i.e. floating bacterial colonies) in a wastewater treatment process, and may then be removed by conventional gravity settling. This size may be selected in order to facilitate recovery. Advantageously, this may reduce the costs and complexity of removing metals from a stream or lake, compared to controlled precipitation (e.g. with carbonate addition), which typically is costly and complex due to the processing of amorphous or fine sediment metal laden sludges. In the case of recovering the smaller granular forms and powdered activated carbon forms, they may be recovered by cost effective conventional processes such as coagulation, flocculation, and sedimentation. Either powdered or granular form may be used, depending upon the particular implementation.

An activated carbon suited for a particular processing scenario may be selected in practice, for example, by "batch" testing where several candidate activated carbons are mixed with solutions containing a contaminant of interest; this approach is further detailed below using two different activated carbons compared for their ability to sorb Methylbenzotriazole. Selection criteria include grain size distribution, pore size distribution, specific surface area, iodine retention ability, density, pH at zero point charge (the pH where carbon surface is near charge neutral), source material, preparation technique (e.g. oxidation or pyrolysis temperature), for a particular application. A batch test is then performed to ascertain which activated carbon performs the best under "mock" field conditions. Such a procedure will be familiar to one of ordinary skill in the art in view of this overall disclosure.

FIG. 1 shows different views of a particle of granular activated carbon observed under a microscope at different magnifications. The amount of magnification increases from right to left and shows the internal pores that give the activated carbon a high surface area sufficient for adsorption.

Activated carbons are commercially available from a number of sources both domestically and internationally. MRX which is commercially available from Calgon Corporation of Pittsburgh, Pa. (http://www.calgoncarbon.com/) and Norit 10×30 which is commercially available from NORIT Americas Inc of Atlanta, Ga. NORIT Americas Inc is a wholly owned subsidiary of NORIT N.V., which is based in The Netherlands. Of course other suitable activated carbons are available from such vendors as ActiveCarb Ltd., Carbochem, Carbon Link, Millenium Inorganic Chemicals, Northwest Carbon, and United Manufacturing International.

Sorbents other than activated carbon may also be used. For example, a charcoal may be used. A charcoal is often a dark or black porous carbon prepared from vegetable or animal materials, for example by charring wood in a kiln with less air than needed for combustion. As another example, it is contemplated that many of the sorbents that are conventionally used to treat oil spills in marine environments may be suitable sorbents for sorbing metal binding organic compounds having hydrophobic moieties. Often, these sorbents float on the top of the water and may be easily removed by skimming. One such sorbent is the oleophylic, hydrophobic sorbent available from Sea Sweep, Inc. (http://www.seasweep.com/) of Denver, Colo. Another such sorbent is the P.O.L. Sorb® sorbent available from The ARK Enterprises, Inc. of Warsaw, Mo. Other sorbents that are suitable are the emedco Oil-Dry Sorbents, in either pad, roll, or sock form, available from emedco of Buffalo, N.Y. Other sorbents that are suitable include polypropylene sorbents for oils, available in pad, roll, sock, boom, and pillow form from Intex Supply Company, a division of The Tranzonic Companies, of Alcoa (Knoxyille), Tenn. Other suitable sorbents include polymeric or carbonaceous resin sorbents. There are many natural products, industrial byproducts, recycled substances, and other materials that may be used as sorbents. Many solid hydrophobic materials may be used to sorb a hydrophobic metal binding organic compound from an aqueous solution. Specific examples of sorbents that are contemplated include diatomaceous earth, hay, slag, ashes, fly ash, sawdust, sugarcane bagasse, and granulated rubber tires.

Metal Binding Compounds

A metal binding compound may be used to bind a metal and assist with removing it from solution. According to one embodiment of the present invention the compound contains a metal binding portion to coordinate with a metal and a hydrophobic portion. The metal binding portion may be polar and relatively hydrophilic, the portion of the compound that is attracted to surfaces and solvents less polar than water is termed hydrophobic. Hydrophobic and hydrophilic are relative terms used to describe the partitioning behavior of a particular solute. Hydrophobic collectively describes the forces driving a solute out of water (or other polar solvent) and the tendency for collection on surfaces or in nonpolar solvents. The metal binding portion may often be polar and have corresponding hydrophilic character. Thus, in certain embodiments of the present invention, the compound may be an amphipathic compound containing both hydrophilic and hydrophobic portions. If a molecule contains both hydrophobic and hydrophilic moieties conjugated to each other, the compound is amphipathic. In this case, the metal binding compound is amphipathic. Often, the compound is an organic compound that contains carbon and hydrogen. The organic compound may contain heteroatoms (atoms that are not carbon or hydrogen) such as oxygen, nitrogen, sulfur, or the like. These heteroatoms may participate in binding a metal. Hydrophobic portions of these molecules, partition more readily into less polar media and onto surfaces such as activated carbon (an exemplary sorbent for organic compounds) rather than aqueous medium, and favorably sorb to the activated carbon. How strongly a compound partitions into a nonpolar medium, and out of an aqueous medium (i.e. water), is often measured by a standard octanol/water partitioning test, and reported as the octanol/water coefficient. Some benzotriazoles have an octanol/water partitioning coefficient of approximately 100, which is on the order of that commonly reported for benzene. This would indicate that these benzotrizoles should partition to activated carbon almost as favorably as benzene, which is readily removed from aqueous solution by activated carbon. Of course, such high octanol/water coefficients are not required, and compounds with lower octanol/water coefficients in the range of approximately 10, or less, are also suitable.

The metal binding compound contains at least one binding portion (e.g., a moiety, or a functional group) that is able to coordinate and bind metals by covalent and/or electrostatic chemical linkages or bonds. Benzothiazole contains one sulfur and two nitrogen atoms with unpaired lone electrons that are available to coordinate metals. Benzotriazole contains three nitrogen atoms with lone electrons that are available to coordinate with metals. Benzothiazoles and benzotriazoles can form multiple bonds with metals regardless if the metal is alone in solution or combined with other elements. The coordination with the metal can be monodentate (1 bond), bidentate (2 bonds) or multidentate (3 or more bonds). For copper and cobalt-benzotriazole complexes, there are 2 benzotriazole linkages for every metal molecule (i.e., bidentate interactions). The chemical linkage often contains linkages to two or more non-carbon or heteroatoms, such as nitrogen or sulfur. For example, in one embodiment of the invention, the metal binding chemical linkage may be a chemical attachment between a metal and two nitrogen atoms in a heterocylclic ring structure of the metal binding organic compound. The chemical linkages may be covalent and/or electrostatic metal coordinating interactions. In one embodiment of the present invention, the metal binding compound is a chelating agent having non-carbon heteroatoms to act as chemical claws to bind and hold a metal, such as a metal ion, and form a chelated structure.

Benzotriazoles

According to one particular embodiment of the present invention, the metal binding compound is benzotriazole, or a derivative thereof. According to another embodiment of the present invention, the metal binding compound is benzothiazole (molecular formula: $C_7H_5NS_1$, molecular weight: 135.2, CAS Number: 95-16-9), or a derivative thereof. As used herein, the terms benzotriazole and benzotriazoles will be used to refer collectively to both the specific compound benzotriazole and its derivatives. Likewise, benzothiazole and benzothiazoles will be used to refer collectively to both the specific compound benzothiazole and its derivatives. More broadly, these compounds may be characterized as amphipathic aromatic-containing compounds, bound to, conjugated with or which otherwise contains a heterocyclic moiety that coordinates metal ions and/or their complexes. For purposes of convenience, in the present description and in the appended claims, such a compound may be referred to as an amphipathic, heterocyclic, metal-coordinating compound. As will be described further, unlike other most other binding compounds, these compounds are recognized by the present invention as being unlike any other binding compound. These compounds exhibit an appropriate charge distribution for enhancing immobilization of metal cations on activated carbon surfaces at a specific acidic pH. Specifically, the mechanism by which it is thought that these metal-coordinating compounds are able to operate in acidic pH ranges resides in their ability to maintain, or to maintain at least to an approximation, a charge neutral state in acidic ranges, while certain ones of these compounds are able to maintain sufficient charge neutrality even in strongly acidic pH ranges such as, for example, extending below pH 2.

Figure 2:
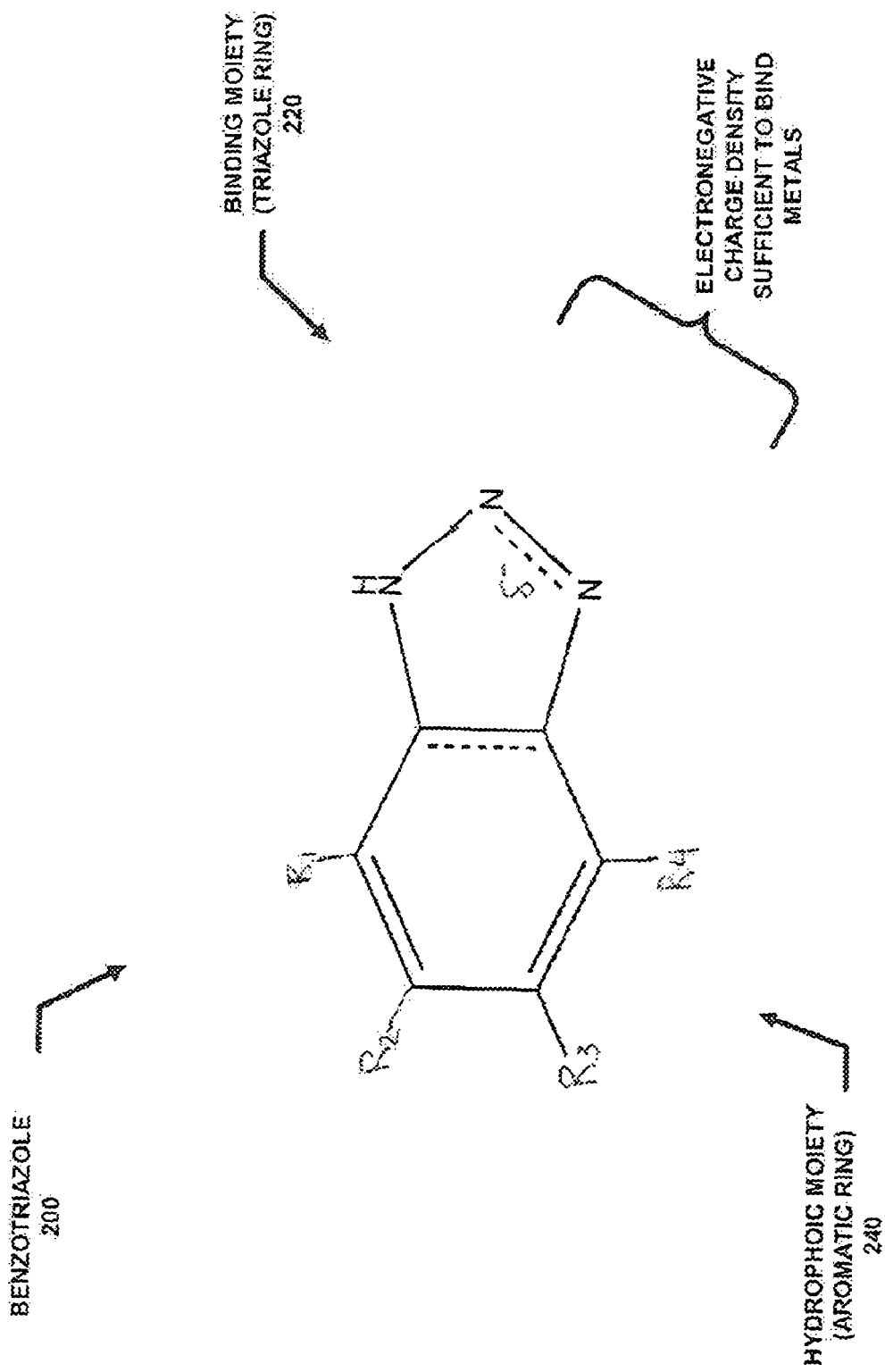
FIG. 2 shows the chemical structures for various benzotriazoles, according to embodiments of the present invention.

FIG. 2 shows a generalized chemical structure for benzotriazoles. The structure contains a triazole ring structure, serving as a metal binding moiety to bind a metal, and an aromatic ring structure, serving as a hydrophobic moiety to adsorb to the surface of a sorbent such as an activated carbon. Each of the groups $R_1$, $R_2$, $R_3$, and R4 may be the same or different and may be a functional group selected from the group comprising, among others, —H, —$CH_3$, —$(CH_2)nCH_3$ where n is an integer often between about 1-5, —COOH, and —NO2. Methylbenzotriazole and carboxybenzotriazole are non-limiting examples of suitable derivatives. Of course, there are numerous other functional groups that may also be used. The triazole ring structure contains three nitrogen atoms. As shown, two nitrogen atoms are without an attached hydrogen atom and have a region of electronegative charge density sufficient to attract and bind a metal. The nitrogen atoms are in a resonating structure such that the multiple bonds rotate among them and three tautomers exist although it is depicted as a single compound. Benzothiazole has a single substitution for nitrogen in the 2 position, and behaves similarly to benzotriazole in its metal binding capabilities and amphipathic character.

Benzotriazole is the derivative wherein $R_1$, $R_2$, $R_3$, and $R_4$ are each —H. Benzotriazole has the chemical formula $C_6H_5N_3$ and molecular weight of 119.12. Benzotriazole is also known as 1-H-Benzotriazole, Cobratec 99, 1,2-Aminozophenylene, Benzene Azimide, 1,2,3-Benzotriazole. Benzotriazole been assigned CAS No.: 95-14-7 and MSDS Number: B1692. Additional background information on benzotriazole and its derivatives is available from a number of sources, including from the MDSD datasheet that is available from vendors, and from the general literature. Benzotriazoles are often sold by vendors as corrosion inhibitors due to their ability to bind metals and metal containing surfaces.

Benzothiazoles and benzotriazoles each contain an aromatic ring conjugated to a thiazole or triazole ring, respectively, which makes them amphipathic compounds and allows them to both bind metals and have a strong affinity for adsorption to activated carbon surfaces. Amphipathic compounds retain both hydrophobic and hydrophilic properties. The present inventor has discovered that the amphipathic behavior and metal binding capacity of certain compounds, such as benzotriazoles, may be used to remove transition metals, metalloids, or their complexes from a variety of solutions including natural waters contaminated by acid mine drainage, and metal contaminated industrial wastewaters.

It is the thiazole ring of benzothiazoles and the triazole ring of benzotriazoles that is responsible for the metal binding properties of these compounds. The thiaxone and triazole rings form strong coordinate bonds with many environmentally relevant transition metals. Metals that may be bound by the ring include positively charged ions of copper, zinc, nickel, mercury, cadmium, lead, gold, silver, iron, and others and also include complexes containing these metals regardless of their charge. The ring may also bind arsenic, selenium, and other metalloids. Many of these metals and metalloids are present in relatively high concentration in Rocky Mountain region acid mine drainage and many industrial wastewaters, and are significant with regards to biological toxicity responses of invertebrates and vertebrates. The metal binding ability is also robust for a pH range relevant to many environmental situations and industrial scenarios where heavy metal contamination is a serious problem or where metals recovery is desired: acid mine drainages, industrial wastewater discharges (e.g., leather tanning, metal plating, microchip etc), precious metals mining operations (e.g., heap leach, cyanide leach) and radionuclide processing.

It is the aromatic moiety of benzotriazoles and benzothiazoles that governs their sorption potential and the surface active character of these compounds. The sorption potential and partitioning behavior may be varied by the particular choice of the functional groups, $R_1$-$R_4$. The sorption potential increases when more hydrophobic functional groups are used (e.g., —$CH_3$) and decreases when hydrophilic groups are used (e.g., $NO_2$). The sorption potential of the metal binding compounds to sorbents may be characterized by a standard Freundlich sorption isotherm model, or other techniques commonly used in the description of surface sorption behavior. In many cases, the sorption of benzotriazoles to granular activated carbon is so favorable, that the partitioning of benzotriazole to industrial grade activated carbon is effectively irreversible, over a period of months.

Methylbenzotriazole is a weak organic acid (pKa approximately 8.8), and its sorption to organic and/or hydrophobic surfaces is anticipated due to its relatively hydrophobic nature. The log of the octanol/water partition coefficient, which for methylbenzotriazole is greater than about 2, often provides a convenient metric for hydrophobicity, and indicates that methylbenzotriazole is mildly hydrophobic. Experiments indicate that activated carbon effectively scavenges benzotriazoles from wastewater and is often able to reduce the concentration of benzotriazole by several orders of magnitude, from about 1000 parts per million (ppm) to less than about 0.25 ppm, in less than 24 hours. (Gruden et al, (2001)).

Benzotriazoles and benzothiazoles are weak diprotic acids (pKa's near 2 and 9). Based on the acid/base properties of these compounds they are often in the charge neutral form in the pH range between 2 and 9. Based on this protonation range, there should be little affect of pH on partitioning to sorbent surfaces in the pH range between about 3-5. This behavior may change as pH drops below about 2. This sorbtion behavior has recently been confirmed on granular activated carbon that is commonly used to remove petroleum hydrocarbons from industrial wastewaters (e.g., Calgon MRX 10×30 mesh, Norit Americas MRX 10×30 mesh and Calgon HD 3000).

As will be further described below, sorption behavior of 5-Methylbenzotriazole on granular activated carbon (e.g., Calgon MRX 10×30 mesh) can be described by a standard Fruendlich sorption model in the pH range between 2 and 5. The affinity observed is approximately the same as that observed for benzene under otherwise identical conditions.

Metal coordination may increase the affinity of benzotriazoles and benzothiazoles for activated carbon surfaces. The hydrophobic characteristics of benzotriazoles will likely affect their strength of their retention on carbon surfaces. Benzotriazoles are unique amphipathic molecules defined by the highly electronegative character of their heterocyclic nitrogen rings. These triazole rings donate electrons to the metals they complex, which in turn changes the overall hydrophilic balance of these molecules. Thus, when metals complex with benzotriazoles, the hydrophilic character of these molecules is greatly reduced, likely resulting in an increased affinity for activated carbon surfaces. Benzotriazole coordination with metal ions greatly reduces its hydrophilic character by neutralizing the negative charge density of its triazole ring. This should make adsorption to an activated carbon even more favorable and cause slightly preferential adsorption of benzotriazole chelates over benzotriazole chelating agents. The binding of benzotriazoles with metals is very strong and practically irreversible in acidic pH range between 2 and 5 and temperatures below 20 C. It is this metal binding ability that imparts their excellent corrosion inhibiting abilities. Quantitative spectra of benzotriazole complexes with Cu, Co, Pb, Ni, Au and Zn have recently been resolved using differential pulse polarography. This resolution provided for accurate estimates of benzotriazole-metal complex stability constants; as expected, these stability constants are high because of benzotriazoles' unique abilities to bind transition metals: $K \geq 10^{15}$ for Cu; $K \geq 10^7$ for Co, Ni, and Au; and $K > 10^3$ for Pb. These results suggest that for common environmental remediation and wastewater engineering applications, the binding of methylbenzotriazole to these transition metals will be essentially irreversible.

Figure 3:
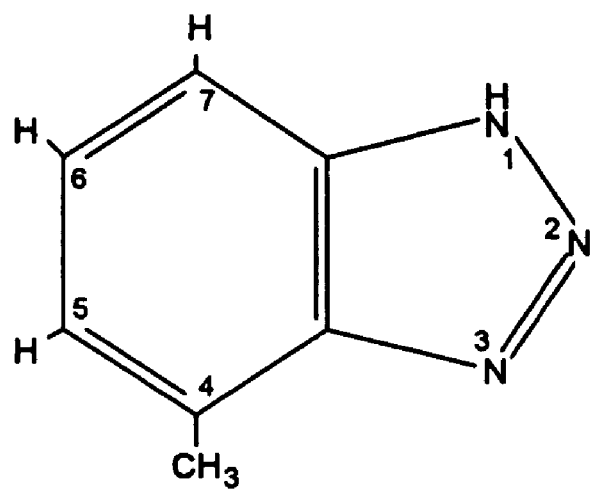
FIG. 3 shows the chemical structures for two exemplary benzotriazoles, according to one embodiment of the present invention.
Figure 3:
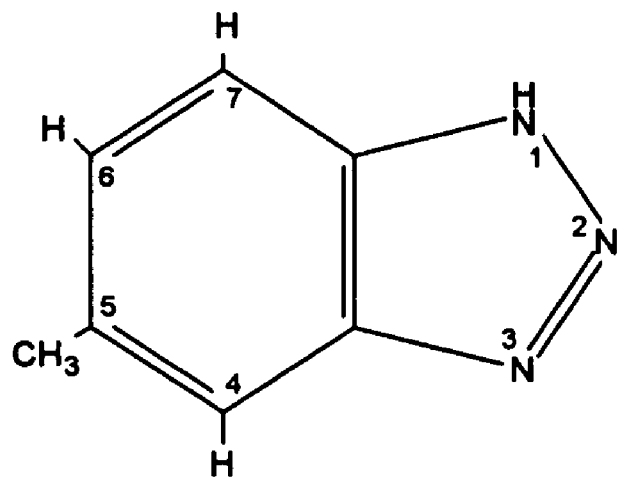

FIG. 3 shows the chemical structure of two exemplary benzotriazoles. A first benzotriazole derivative 310 is 5-methylbenzotriazole. A second benzotriazole derivative 320 is 4-methylbenzotriazole. These benzotriazoles are commercially available and relatively economical compared to other derivatives commonly used for corrosion inhibition. Of course, other benzotriazoles and benzothiazoles are contemplated for use.

Benzotriazoles such as those shown in FIG. 3, among others, are commercially available from a number of sources. Suitable metal binding organic compounds include the benzotriazole derivatives and other COBRATEC® corrosion inhibitors in solid, solution, or other forms available from PMC Specialties Group, Inc. (http://www.pmcsg.com/) of Westlake, Ohio. PMC Specialties Group, Inc. is a subsidiary of PMC, Inc. of Sun Valley, Calif. For example, the metal binder may be a COBRATEC® 99 Benzotriazole as a solid, or a COBRATEC® 40S Sodium Benzotriazole as an aqueous solution, or a COBRATEC® TT 101 a solid phase mixture of 4- and 5-methylbenzotriazole. Pure benzotriazole, several derivatives thereof, pure benzothiazole, several derivatives thereof, EDTA, and other metal binding compounds are available from Sigma-Aldrich Corporation of St. Louis Mo., (http://www.sigmaaldrich.com/) and radiolabelled methylbenzotriazoles are available from American Radiolabelled Chemicals of St. Louis Mo.

Other Metal Binding Compounds

The concepts underlying metal scavenging ability of metal removal systems extend beyond benzotriazoles to other organic metal binding ligands that have amphipathic character/behavior as well as other types of sorbents. For example, there are many different types of organic metal binding compounds with amphipathic character which would work in this metal scavenging capacity. Examples of other organic, metal binding compounds that are suitable for embodiments of the present invention include, benzothiazoles, ethylenediaminetetraacetic acid (EDTA), dimercaprol and porphyrin compounds (e.g., porphine or derivatives thereof).

Like benzotriazoles, all these chemical compounds have metal binding capabilities and at least some amphipathic (hydrophobic/hydrophilic) character. The combination of these two properties allows them to bind metals and be sorbed to a sorbent from an aqueous solution. Benzothiazole are closely related to benzotriazole in structure and function. Ethylenediaminetetraacetic acid (EDTA) is another suitable metal binding organic compound. EDTA is widely used industrially and is commercially available from a number of sources. EDTA is used in one capacity in detergents and soaps to remove calcium ions, magnesium ions and other ions contributing to water scale. EDTA may be removed from aqueous solution by activated carbon and other sorbents. Dimercaprol (2,3-dimercapto-1-propanol) is an effective chelating agent for heavy metals such as arsenic, mercury, antimony, and gold. Dimercaprol is often applied in a penut oil or other oily vehicle and injected into humans suffering from arsenic poisoning in order to bind the arsenic and allow it to be excreted from the body. As such, dimercaprol has metal binding capabilities and hydrophobicity that make it sufficient for binding metals from an aqueous solution and being bound itself, together with the metal, on a sorbent like activated carbon. These compounds are also commercially available.

Method For Removing Metals From Solution

Figure 4:
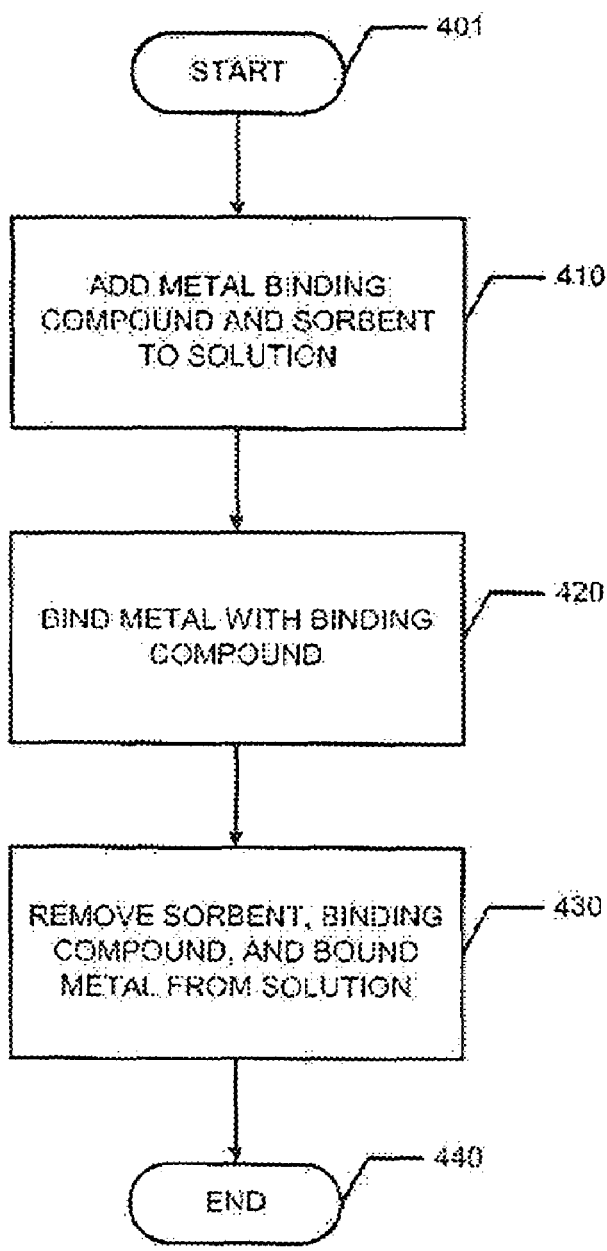
FIG. 4 shows a method for removing metals from an aqueous solution, according to one embodiment of the present invention.

FIG. 4 shows a method 400 for removing metals from an aqueous solution, according to one embodiment of the present invention. The method commences at block 401 and then proceeds to block 410 where a metal binding compound and a sorbent are added to an aqueous solution. According to a first embodiment of the method, a metal binding compound that is sorbed to a sorbent, may be added to the solution. According to a second embodiment of the method, a non-sorbed compound and the sorbent may be added to the solution. In this embodiment, the method may further comprise, after adding at block 410 and before removing at block 430, sorbing the metal binding compound to the sorbent. For example, an aromatic moiety of a benzotriazole may adsorb to a hydrophobic surface of a granular activated carbon particle.

The method advances from block 410 to block 420 where a metal is bound with the metal binding compound. For example, a transition metal may be bound through coordination with a triazole ring of a benzotriazole. Then, at block 430, the sorbent, the metal binding compound, and the metal may be removed from solution. This may include removing the sorbent, the metal binding compound sorbed to the sorbent, and metal bound to the compound. As desired, the completed structures may be regenerated, processed for metal recovery, or otherwise disposed of. It is also contemplated that the cost efficiency of the method may be improved by recovering metals from the binding compounds by heating, alkaline shock, or benzotriazole biodegradation, or solvent elution, although this is not required. The activated carbon may also be regenerated for reuse, as desired.

In one particular embodiment of the present invention, an effective and economical dose of granular activated carbon and a benzotriazole may be added to a metal containing solution, such as an acid mine drainage, or industrial wastewater, in order to coordinate the bind the metal with benzotriazole, and sorb the benzotriazole to the activated carbon, and remove the resulting three component granular structures by settling, filtering, or other solid separation technique common to the wastewater treatment arts. The effective result is sequestering metal out of solution in higher mass concentration density on the surface of the activated carbon.

As one example, approximately 500 mg/L methylbenzotriazole and approximately 1% (weight/volume) granular activated carbon (10×30 mesh Calgon MRX) may be used to treat a solution containing about 10 mg/L of metals, such as a combination of five transition metals copper (Cu), lead (Pb), zinc (Zn), cobalt (Co) and gold (Au). For metal removal systems using benzotriazoles, metal scavenging capacity is increased in the pH range between 2-5 and is capable of sequestering the metals from these solutions to approximately below 10 ug/L at temperatures not greater than approximately 25° C. in a time not exceeding approximately 8 hours. Of course, this system is not limited to these metals and similar parameters are likely to apply to other transition metals, including Lanthanum and Actinum series metals, and some metalloids. In a flow through implementation, 180 mg/L methylbenzotriazole was found to be remarkably effective.

With respect to using benzotriazoles as metal binding compounds with activated carbon as a sorbent, granular activated carbon (10×30 mesh Calgon MRX) becomes saturated when the aqueous benzotriazole concentration approaches approximately 1000 mg/L, and the granular activated carbon concentration is approximately 1% (weight/volume). Saturation represents the concentration at which activated carbon can no longer sequester benzotriazoles from solution. This saturation point dictates the metal scavenging capacity of this exemplified metal removal system. Increases in granular activated carbon quantities introduced to solution, leads to a proportional increase in ability to sequester benzotriazole and the metal scavenging ability of this two part, metal binding system.

Figure 12:
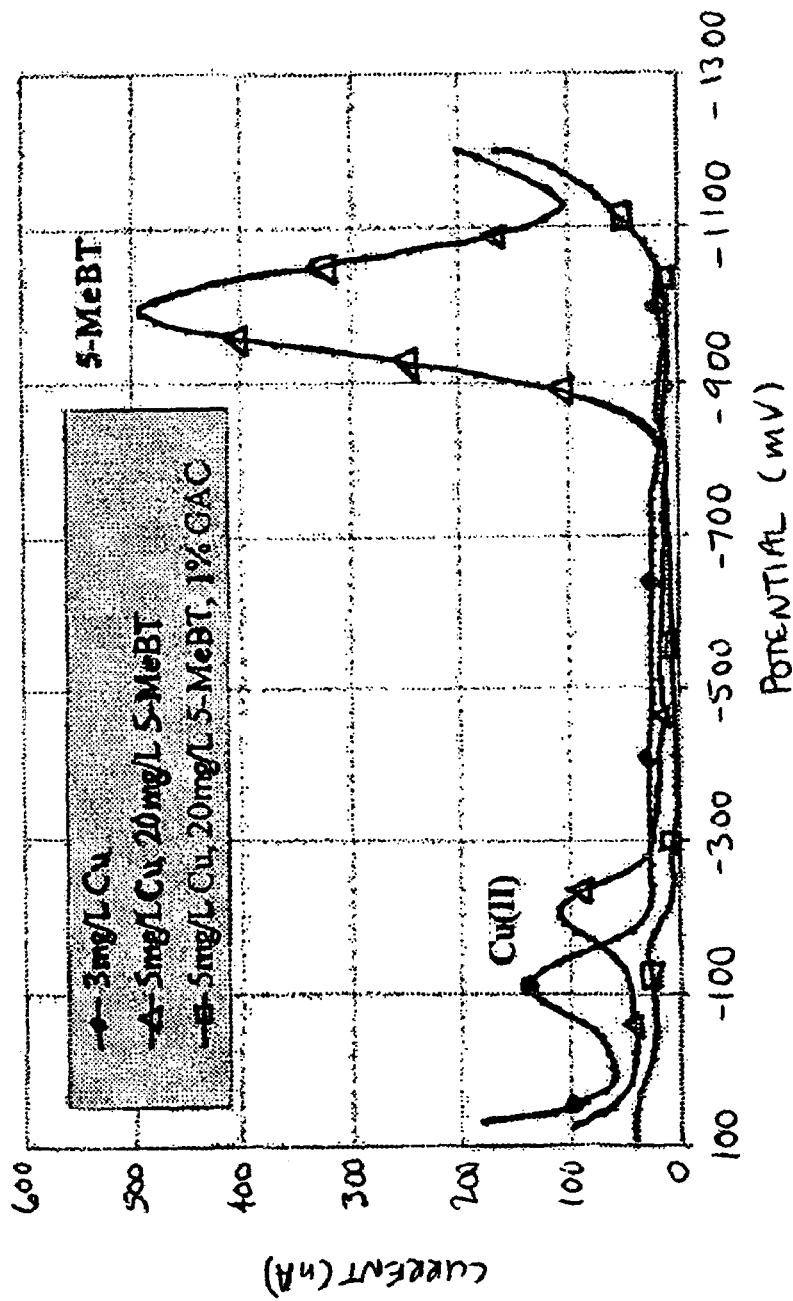
FIG. 12 depicts potentiometric data for a first solution containing copper, a second solution containing copper and a benzotriazole, and a third solution containing copper, benzotriazole, and activated carbon, according to one embodiment of the present invention.

FIG. 12 shows polargraphy data demonstrating another example of metal removal from a solution containing approximately 5 mg/L of copper in acidic aqueous solution having a pH of approximately 3 by using approximately 20 mg/L methylbenzotriazole with approximately 1% (weight/volume) granular activated carbon. The curve marked with solid circles shows free copper (II) ions in solution prior to the addition of methylbenzotriazole; the curve marked with open triangles shows addition of methlybenzotriazole (5-methylbenzotriazole) and nearly immediate complexation of copper (see shift in Cu peak from red to blue); the curve marked with open squares shows absence of soluble copper and methylbenzotriazole following 12 hour equilibration with granular activated carbon (Calgon MRX 10×30). This indicates that the 20 mg/L methylbenzotriazole and 1% activated carbon are sufficient to removal essentially all metal from this 5 mg/L initial solution, Of course it will be appreciated that less metal binding compound and sorbent may be used as desired, or more metal binding compound and sorbent may be desired for a solution having a higher initial metal concentration.

Embodiments of the present invention may allow for either in situ or ex situ removal of metals from a solution. The method 400 is construed to cover both in situ and ex situ metal removal. Under an in situ removal scenario, the sorbent and metal binding compound are added to a metal bearing water (in its original or natural place) and subsequently removed from the water. Under an ex situ removal scenario, the metal bearing water is removed from its original in situ location, added to a stationary amount of sorbent and compound at an ex situ location (removed from the waters natural place or origin, for example in a vessel), and subsequently removed from the stationary amount and returned to the in situ location or otherwise discharged.

To sequester metals from solution, a sufficient amount of benzotriazoles to add is an amount sufficient to bind a desired extent of the metals; this usually occurs in accordance with stoichiometric relationships determined by the coordination between metal and benzotriazoles (or other metal coordinating ligand). As determined by polorography, the coordination between methylbenzotriazole and copper, cobalt and nickel under acidic conditions in the pH range between 2-5 is approximately 2:1 methylbenzotriazole to metal on a molar basis. Of course, this may ratio may vary between about 1:1 to about 3:1, depending upon the particular implementation (e.g., the particular solution, pH, etc.). Although the stoichiometric ratio may not be strictly observed, it is expected that on average two molecule (or two moles) of benzotriazole may be able to bind a metal ion (or mole of metal ions). Accordingly, the sufficient amount of benzotriazoles to add under a given treatment scenario may be determined by measuring a concentration of metal in the water (e.g., in moles metal per liter of water), and adding an amount of benzotriazoles sufficient to coordinate this amount of metal (i.e., concentration in moles benzotriazole per mole of metal present in the water multiplied by the stochiometric ratio of metal coordination). This amount may be determined by obtaining a representative estimate of metal in a solution to be treated. Of course, excess benzotriazole may be added to account for any observed deviation from the stoichiometric ratio.

It is appreciated that many of the benzotriazoles are potentially toxic, or their degradation byproducts are potentially toxic, when applied to an ecosystem in high enough concentration. Accordingly, in the case of removing metal from an environmental water, the amount of benzotriazole added at any time is often less than that which would harm the environment, and more than the resident amounts metal. A relatively less toxic and more biodegradable derivative, such as carboxybenzotriazole, may be desired over others that are more toxic and less biodegradable. Since benzotriazole affinities for sorbents are large, it is anticipated that the the joint application of activated carbon and benztriazole (or other compounds) will be designed such that available sorption sites are in excess of benzotriazole such that free benzotriazole will not be left in solution. Further, when using activated carbon as a sorbent, desorption of benzotriazole into an environmental water occurs at a low level, often below detection. Laboratory experiments, executed with granular activated carbon nearly saturated with benzotriazoles, have verified the extremely low desorption potential of benzotriazoles once equilibrated with activated carbon. Heating or significant changes in pH or ionic strength may promote desorption of benzotriazoles from sorbents such as activated carbon as well as the metals they are binding.

One approach, for achieving the desired amount of removal, while minimizing the amounts of benzotriazole used (to lessen the potential for unintentional discharge to the environment), involves repeat additions and removals of the benzotriazoles. For example, between about 1-1000 or 10-100 milligrams benzotriazole per liter of aqueous solution may be added to solution and subsequently removed by addition of sufficient activated carbon (e.g., 1% w/v 10×30 mesh MRX grade) and waiting several hours, another 1-1000 or 10-100 milligrams of benzotriazole per liter of aqueous solution may then be added, removed by another addition of activated carbon and waiting, etc. These repeat additions and removals may be repeated until the metal concentration has been reduced to the desired extent. In one particular embodiment of the present invention, the desired extent involves the remaining unbound metal having a concentration that is lower than the concentration mandated in current EPA drinking water standards. Of course, it is appreciated that the invention is not limited to applying small amounts of the metal binding compounds. Any arbitrarily large amount may be added, as desired.

A sufficient amount of granular activated carbon is an amount sufficient to adsorb a desired extent, typically a majority (more than 50%) and often nearly all (e.g., more than 99%), of the benzotriazoles. Often, the granular activated carbon may be provided in any excess of this amount that is desired for the particular implementation, although this may increase the cost in proportion to this addition. According to one embodiment of the present invention, a granular activated carbon concentration between about 1-10% w/v may be used depending upon the amounts of benzotriazole used. Experiments indicate that a 10% w/v addition of granular activated carbon is often effective to adsorb a 10 µL benzotriazoles concentration to below about 1 mg/L within about 12-24 hrs at 15° C. A majority of the sorption occurred in the initial several hours. In column type treatment scenarios, such as that depicted in FIG. 10, activated carbon may be immobilized in a vessel. In such a scenario metal containing water would flow through the vessel where the activated carbon was already equilibrated with benzotriazoles. Preliminary experiments confirmed that the kinetics of metal coordination and benzotriazole sorption will be rapid enough at a pH greater than about 2 to provide a thousand fold reduction in the aqueous concentration (e.g., from 10 ppm to 10 ppb) within two hours. In one embodiment, a benzotriazole concentration may be obtained after about 12 hours after a granular activated carbon addition, and additional granular activated carbon may be added if the benzotriazole concentration is higher than desired. Benzotriazole concentration may be measured by polarography, high performance liquid chromatography, or other techniques.

It is to be appreciated that in some implementations, such as environmental remediation of natural waters, including acid mine drainage, that there may be processes or compounds that compete with the metal coordination and binding and/or compound sorption processes described herein. For example, it is expected that many iron bearing surfaces, such as colloids, particles, and sediment surfaces, that are commonly found in acid mine drainage environments may compete with benzotriazoles for metal ions and complexes that have an affinity for iron containing surfaces. In environments where iron bearing surfaces are predominant, and are expected to significantly compete with the metal binding compounds described herein, it may be desirable to add larger concentrations of these compounds. Similarly, benzotriazoles may have an affinity for certain natural surfaces, such as biological sludge, peats, wood; however it is anticipated that such sorption would be small as compared to activated carbon or other industrial sorbents specifically designed for the process. It may be desirable, when such matrices are available in high amount, and may significantly compete with sorption to the sorbents described herein, to add additional amounts of the sorbents.

Experiments indicate that the metal binding compounds and sorbents may be used in combination to remove metals from a strongly acidic aqueous solution having a pH between about 2-3, or a moderately acidic solution having a pH between about 3-5, or a mildly acidic solution having a pH between about 5-7. Many terrestrial waters affected by acid mine drainage are strongly or moderately acidic as are many industrial wastewaters. Advantageously, this means that such acidic waters may be treated by the present invention without, or without significant, pH adjustments. Experiments also indicate that the present invention may be used to remove metal ions from solution, such as copper, zinc, cobalt, nickel, gold, and lead, from acid waters having a temperature between about 1-30° C. or more favorably between about 5-15° C.

Figure 5:
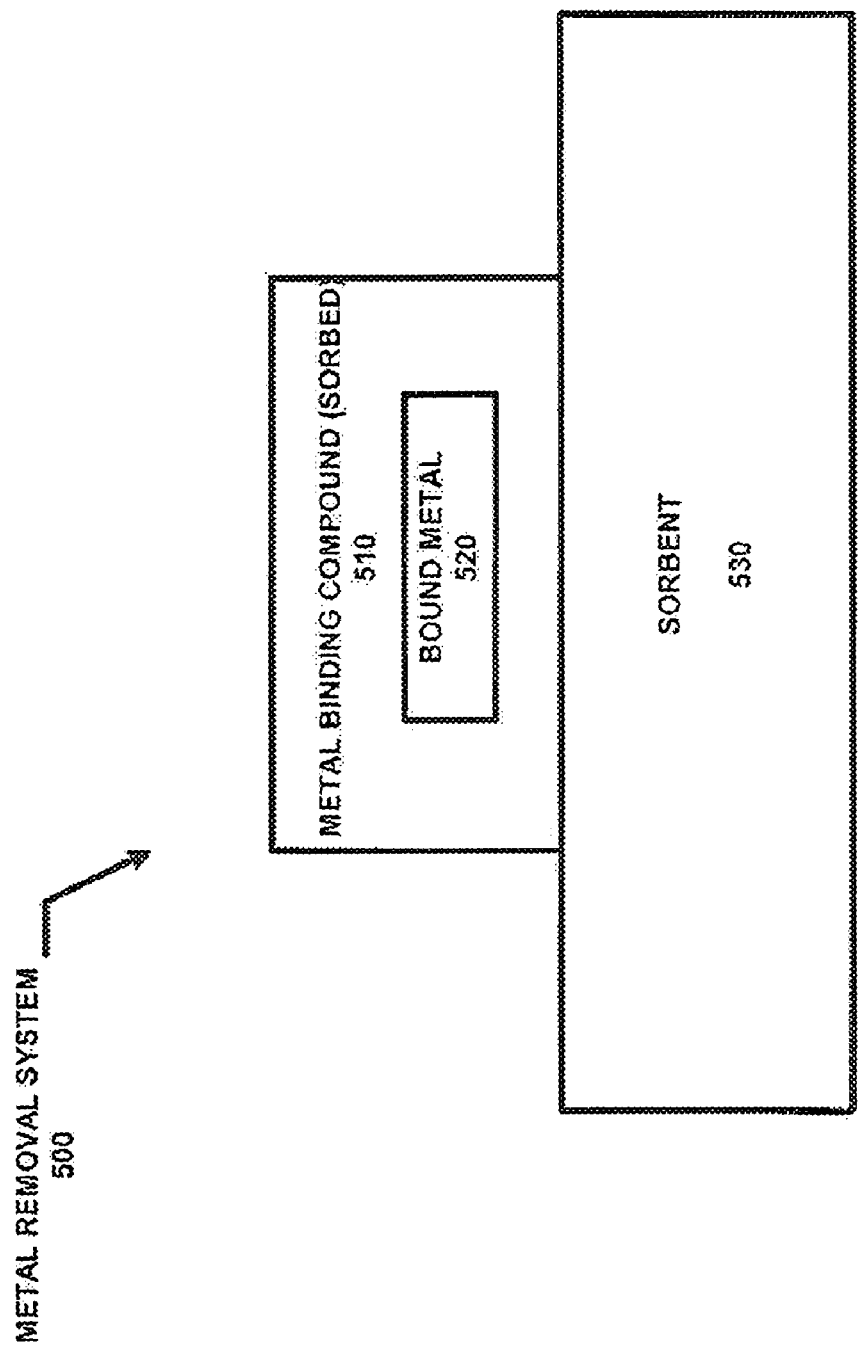
FIG. 5 shows a metal removal system, according to one embodiment of the present invention, which contains a metal binding compound binding a metal and sorbed to a sorbent.

FIG. 5 shows a metal removal system 500, according to one embodiment of the present invention. The metal removal system contains a metal binding compound 510, binding a bound metal 520, and sorbed to a sorbent 530. For convenience, the compound is shown sorbed to a surface of the sorbent, as in the case of an adsorbent, although the compound may also be absorbed within the sorbent. The metal removal system may be formed within a solution, such as a contaminated water at a remediation site or a metal containing industrial wastewater.

It is an aspect of one embodiment of the present invention that the sorbent and compound are added concurrently to the solution. They may be either added individually or as a composite of the compound. The sorbent may be pre-exposed and equilibrated with the metal binding compound prior to the addition of any metal containing solutions. It is an aspect of another embodiment of the present invention that the compound and sorbent are added sequentially with either one added before the other, as desired. In this embodiment, the metal is sequestered from solution by the compound and sorption performed in solution. The system may exist either in solution, or outside the solution in the case of vessel contained removal system.

Figure 6:
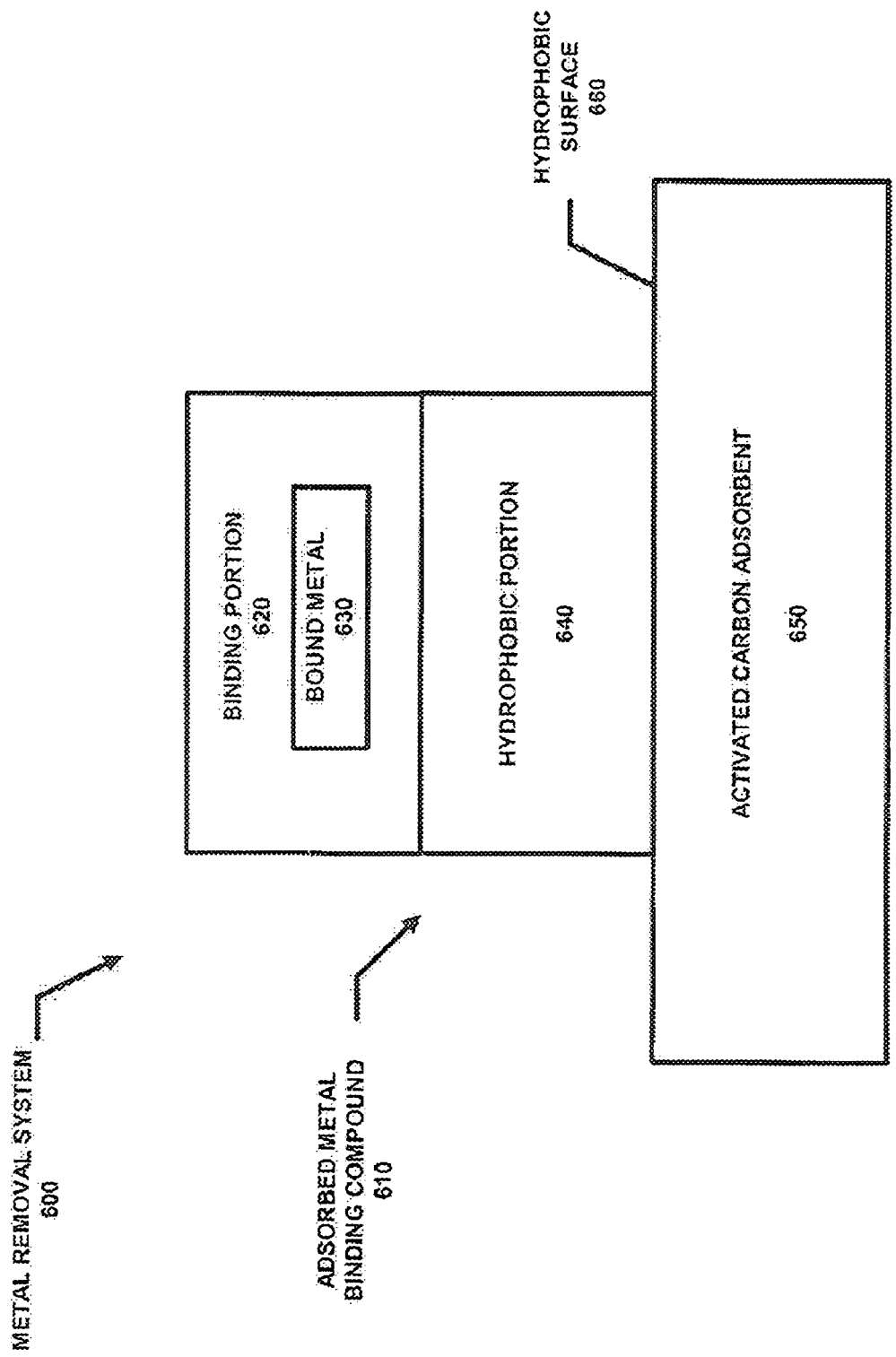
FIG. 6 shows a metal removal system, according to one embodiment of the present invention, which contains a metal bound by a compound that contains a binding portion that binds the metal and a hydrophobic portion that is sorbed or adsorbed to an activated carbon sorbent or adsorbent at a hydrophobic surface thereof.

FIG. 6 shows a metal removal system 600, according to one embodiment of the present invention. The system contains a sorbed metal binding compound 610, binding a metal 630, and sorbed to an activated carbon sorbent 650 at a surface 660 thereof. In particular, a binding portion 620 of the compound binds the metal and a hydrophobic portion 640 of the compound is sorbed to the surface of the sorbent, which in many cases is relatively hydrophobic surface.

Figure 7:
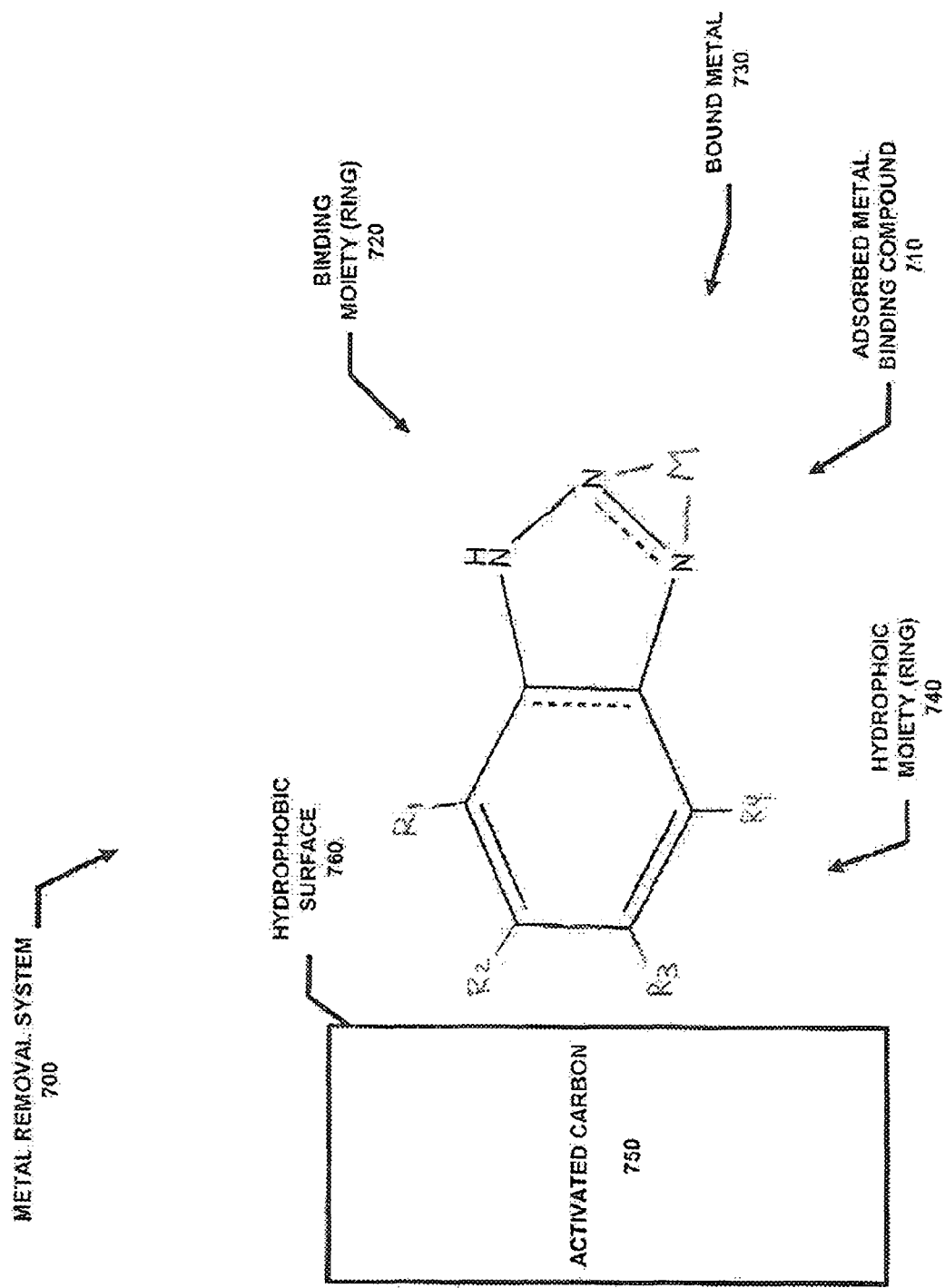
FIG. 7 shows a metal removal system, according to one embodiment of the present invention, which contains a sorbed benzotriazole having a triazole ring binding a metal and a hydrophobic aromatic ring moiety sorbed to an activated carbon sorbent.
Figure 8:
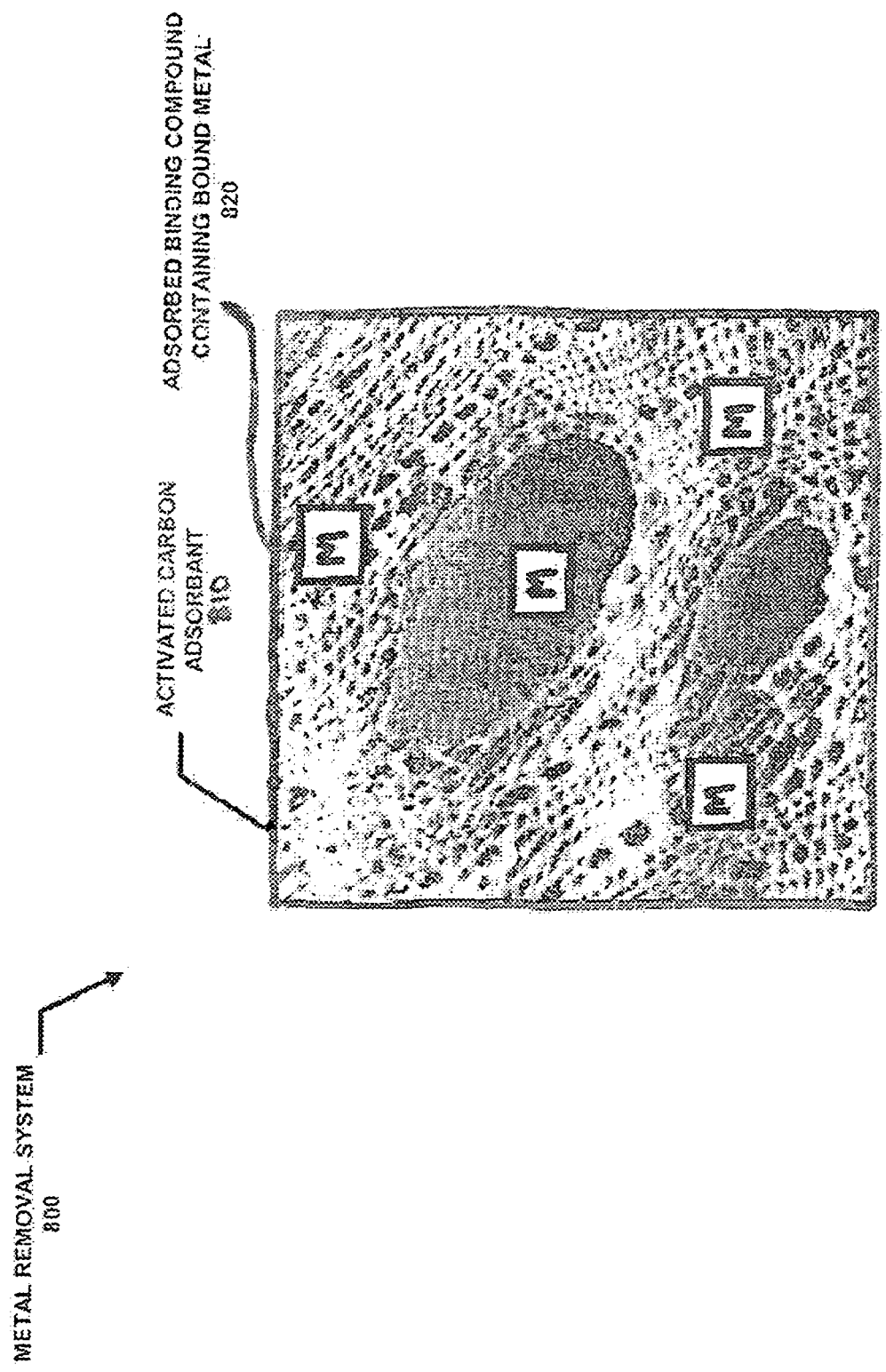
FIG. 8 shows a metal removal system, according to one embodiment of the present invention, that contains several metal binding compounds each of which contain a bound metal that are sorbed to an activated carbon sorbent.

FIG. 7 shows a metal removal system 700, according to one embodiment of the present invention. The system contains a sorbed benzotriazole 710 having triazole ring 720 coordinating and binding a metal 730 with nitrogen atoms in the ring and a hydrophobic aromatic ring moiety 740 sorbed or adsorbed to an activated carbon adsorbent 750 at a relatively hydrophobic surface 760 thereof FIG. 8 shows a metal removal system 800, according to one embodiment of the present invention. The system contains a granular activated carbon adsorbent 810 having adsorbed thereon several binding compounds 820, such as benzotriazoles, benzothiazoles, EDTA, porphyrin, or some mixture of these or other compounds, containing bound metals.

Figure 9:
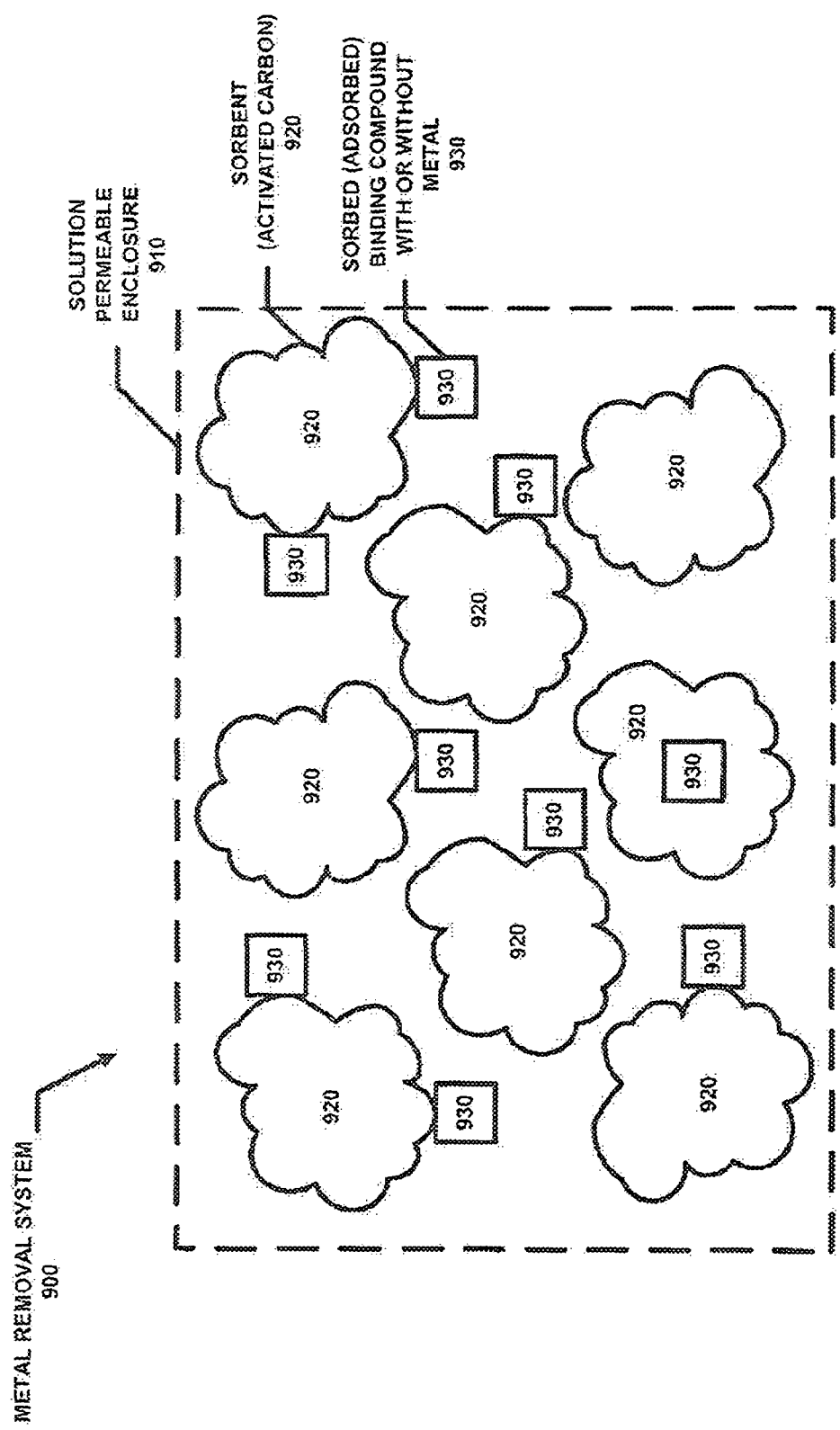
FIG. 9 shows a metal removal system, according to one embodiment of the present invention, which contains a sorbent and sorbed metal binding compounds, with or without bound metals, enclosed in a water permeable enclosure.

FIG. 9 shows a metal removal system 900, according to one embodiment of the present invention. The system contains a sorbent 920 and sorbed metal binding compounds, with or without bound metal elements coordinated with them, enclosed in a water permeable enclosure 910. The water permeable enclosure allows a solution to permeate the enclosure so that it can come into contact with the sorbed binding compound. The enclosure may comprise a textile, of plastic or natural fibers, a perforated plastic, or the like to allow water permeation, and to be durable in the environment.

Figure 10:
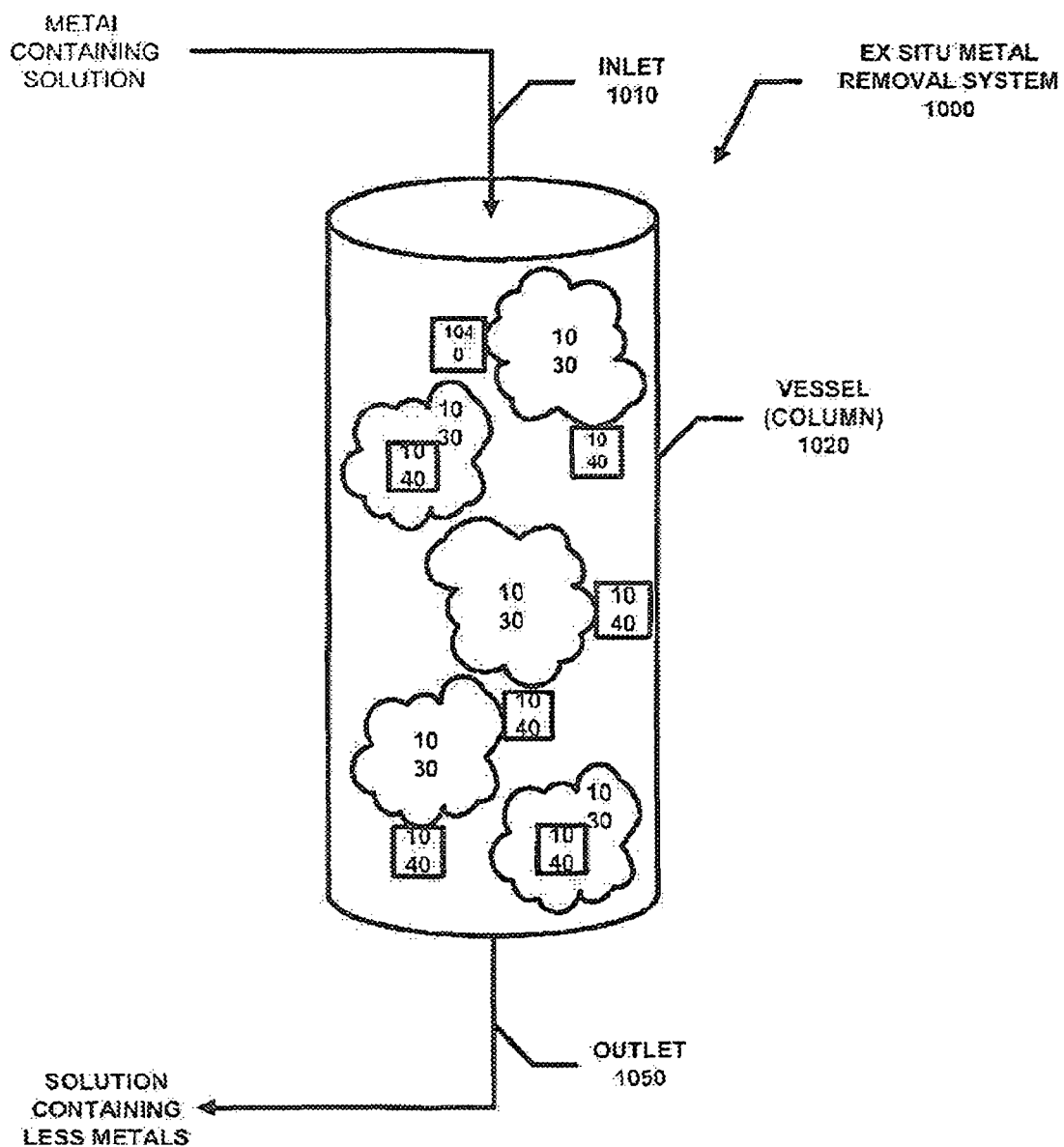
FIG. 10 shows an ex situ metal removal system, according to one embodiment of the present invention, which contains a sorbent and sorbed metal binding compounds, with or without bound metals, enclosed in a vessel, such as a column.

FIG. 10 shows an ex situ metal removal system 1000, according to one embodiment of the present invention. The system contains a vessel 1020, such as a column, having an inlet 1010 and an outlet 1050, and containing sorbent 1030 and sorbed metal binding compound 1040. Solution containing metals may be added though the inlet, contacted with the adsorbed binding compounds so that metals are bound by the compounds, and removed through the outlet to the solution source. The outlet concentration of metals may be less than the inlet concentration.

Figure 11:
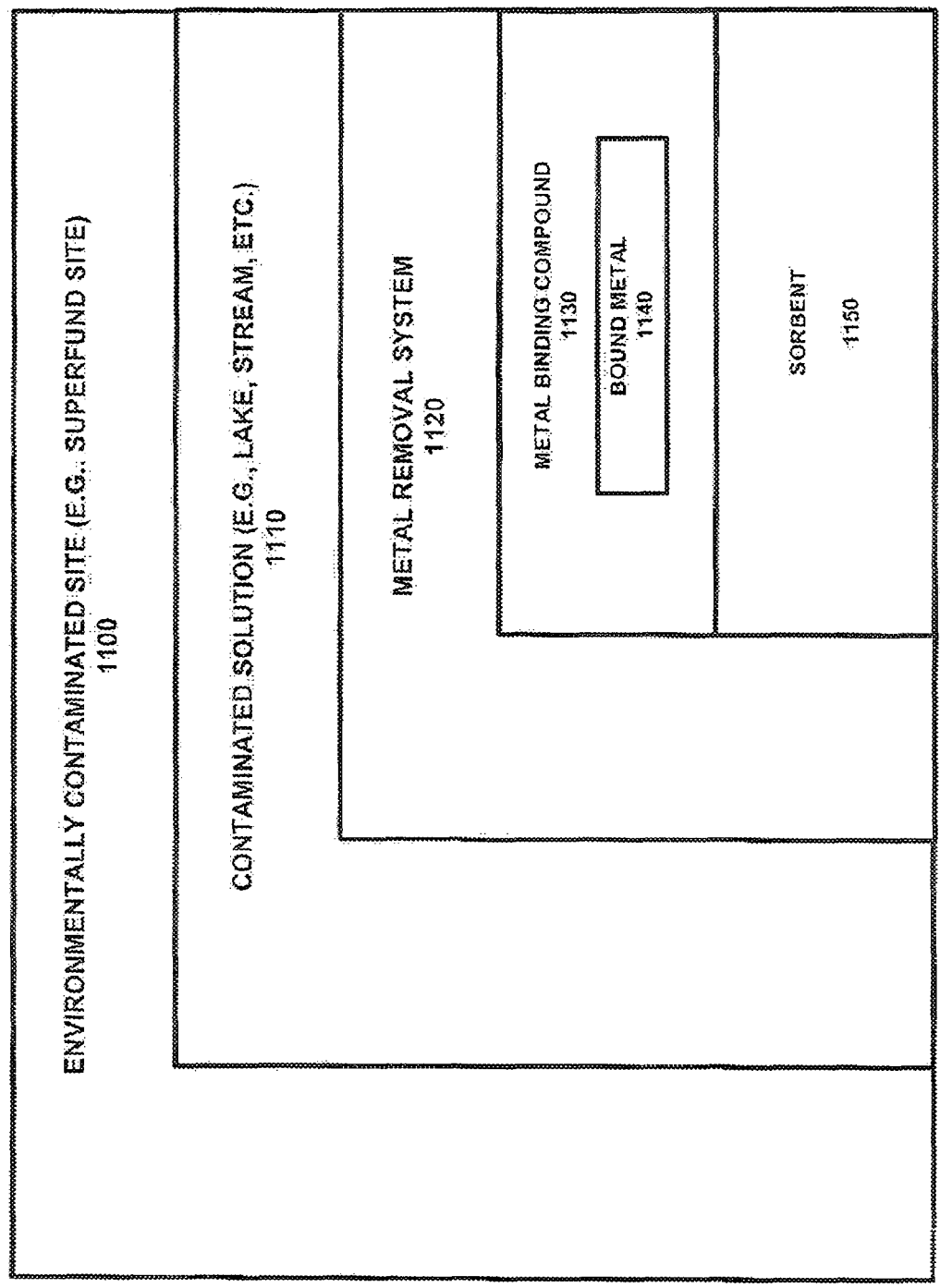
FIG. 11 shows an environmentally contaminated site that contains or generates a contaminated solution, and a metal removal system, according to one embodiment of the present invention, that may sequester metals from the water. In one embodiment of the present invention, the metal removal system contains a metal binding compound (e.g., a benzotriazole) to bind a metal, and a sorbent (e.g., an activated carbon) to sorb the compound and allow the compound and the metal to be removed from the site.

FIG. 11 shows an environmentally contaminated site 1100 containing a metal removal system 1120 to remove metal from the site, according to one embodiment of the present invention. The site may be classified or assessed as environmentally contaminated or impaired by a federal agency such as the EPA. In one instance the site may be a superfund site. The site contains a contaminated water 1110, such as a contaminated lake, stream, pond or lagoon having dissolved or other forms of metals available for complexation. The metal removal system is added to the contaminated water. The system contains a metal binding compound 1130 and a sorbent 1150. In one embodiment of the present invention the compound and the sorbent are added separately. The compound binds a metal 1140. The compound sorbs to the sorbent. Once this system is completed through binding and any needed sorbing, the system may be removed from the contaminated site. Accordingly, the system provides a means for removing metal from the site. This may be used for decontamination, remediation, or other purposes. In an alternate embodiment of the invention, a solution may be removed from the site 1100, and treated thereafter.

Figure 13:
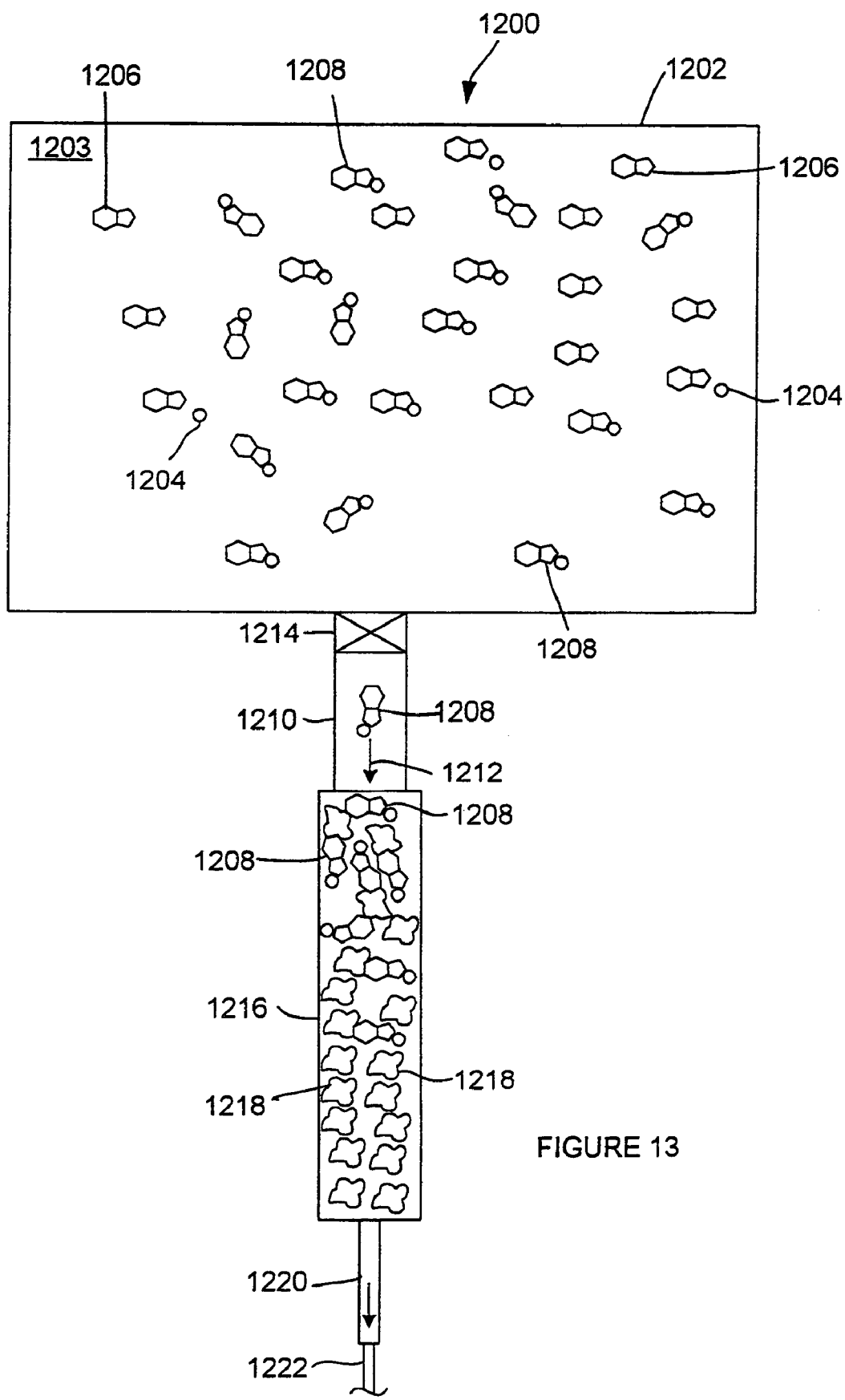
FIG. 13 is a diagrammatic illustration of one implementation of a flow-through treatment system that is produced in accordance with the present invention.

Attention is now directed to FIG. 13 which diagrammatically illustrates one implementation of a decontamination system produced in accordance with the present invention and generally indicated by the reference number 1200. System 1200 may use any suitable source 1202 of an acidic metal contaminated solution such as, for example, a natural or manmade pond, an onsite holding tank or a mobile truck-mounted tank. The latter can be used to transport contaminated solution away from its source site for decontamination elsewhere. Moreover, the present invention contemplates complete truck-mounted systems which may use multiple tanks.

Still referring to FIG. 13, source 1202 contains a solution 1203 (shown as transparent) having a specific acidic pH and includes metal cations 1204 (only a limited number of which are indicated), as a solute. In accordance with the present invention, an amphipathic, heterocyclic metal-coordinating compound 1206 (only a limited number of which molecules are indicated), which is thought to be charge neutral at the specific acidic pH of the solution, has been introduced into the solution. It is noted that not all of the metal coordinating compound is required to be in the appropriate state to bind, but only a sufficient proportion at the specific acidic pH of interest, so as to provide for acceptable process execution. As described above, metal-coordinating compound 1206 can be a benzotriazole, a benzothiazole, a derivative of either or any suitable combination of such compounds. Upon its addition to the solution, metal-coordinating compound 1206 begins to bind cations 1204. It is to be understood that, with certain metals, as described elsewhere in this disclosure, that more than one metal-coordinating molecule may be required to bind each cation, which has not been shown for purposes of illustrative clarity. Accordingly, a bound complex 1208 (only several instances of which are indicated) is present in the solution. With the presence of a sufficient amount of metal-coordinating compound 1206 and over a suitable time period, a large percentage if not essentially all of cations 1204 will be bound.

Having bound a sufficient percentage of the cations, based on parameters that are described elsewhere in this disclosure including, for example, metal-coordinating compound concentration, cation concentration, solution pH, and the specific metal that is ionized, solution 1203 is allowed to pass into a pipe 1210, flowing in a direction indicated by an arrow 1212 upon, for example, opening a valve 1214. Bound complex 1208, as part of the solution, then passes into a flow-through cartridge or enclosure 1216 which houses a sorbent 1218 (only a number of particles of which are indicated). The sorbent can be packed to maximize removal capacity. The solution flow may be produced in any suitable manner such as, for example, by using gravity flow, responsive to opening a valve, or by pumping. As the solution passes through sorbent 1218, bound complex 1208 is sorbed thereto such that the bound complex is effectively removed or sequestered from the solution. An outlet 1220 allows a decontaminated solution 1222 to flow out of enclosure 1216. As illustrated, bound complex 1208 typically demonstrates a high sorption affinity for sorbent 1218 such that the sorbent should saturate with metal from top to bottom in the view of the figure. As described, an amphipathic, heterocyclic metal-coordinating compound, having an appropriate charge distribution at the specific acidic pH of the solution may be used in combination with activated carbon having sorption properties (i.e., the sorbent may itself be thought of as being charge neutral) at the specific acidic pH. It is noted that the embodiment of FIG. 13, as well as the embodiment of FIG. 10, could be truck-mounted With continuing reference to FIG. 13, having saturated sorbent 1218 with metal, a new cartridge 1216 may be used to replace the saturated cartridge. If desired, recovery processes may then be applied to the saturated cartridge.

As an alternative delivery system, metal-coordinating compounds either with or without sorbent may be provided in a compressed solid pH. Moreover, a highly dense solid form may be used incorporating pH adjustment components.

Based on experiments using containments similar in configuration to FIG. 13, nominal hydraulic residence times on the order of at least two hours, and empty bed contact times of at least twice the nominal hydraulic residence time required to immobilize copper, lead and other metals on granular activated carbon surfaces (at least a thousand fold concentration reduction) using commercial Methylbenzotriazole in molar excess of the metal by 30:1. The limiting residence or empty bed contact time may change according to physical conditions (temperature) and ionic strength (conductivity).

For effective operation, the present invention recognizes that each of the metal coordinating compound and the sorbent should exhibit an appropriate charge distribution in order to remove metal through the mechanism that has been brought to light herein. In view of a specific or given acidic pH, the present invention enables one of ordinary skill in the art to select an appropriate metal-coordinating compound and sorbent. Of course, this selection may be made to accommodate proactive adjustments of the acidic pH.

In the instance of a solution which exhibits a highly depressed pH, for example, of 2.0 or lower, components that maintain an appropriate charge distribution at the depressed pH must be used. In the case of the metal-coordinating compound, Benzothiazoles and Benzotriazoles such as, for example, 4- or 5-carboxy-, 4- or 5-butyl-, nitrated- or other alkylated derivatives with pKa values less than 2.2 may be used in a depressed pH range extending below pH 2. Although any other suitable compound, either currently available or yet to be developed, may be used and the invention is in no way limited to the use of benzotriazoles and benzothiazoles at such depressed pH ranges. In the case of the sorbent, an L type or acidic activated carbon may be used. Again, any other suitable sorbent, either currently available or yet to be developed, may be used and the invention is in no way limited to the use of L type or acidic activated carbon at such depressed pH ranges. Such an implementation may be referred to as a "depressed pH configuration." While current, depressed pH configuration components are somewhat higher in cost than their "low" pH counterparts, it is considered that the additional expense of depressed pH components is likely to be more cost effective than converting the acidic solution to a less acidic solution, at which "low" pH counterparts can operate. It is also important to note, as will be described in further detail below, that the present invention has been found to enhance sorption at pH levels above those corresponding to the first dissociation constant (pKa) of the metal-coordinating compound. In this sense, the depressed pH configuration of the present invention is considered to provide a synergistic and highly advantageous response in depressed pH solutions. In and by itself, this synergistic response is considered to provide sweeping improvements over the state-of-the-art.

The present invention has been demonstrated to be particularly effective in the pH range between 2 and 4 (e.g., with respect to Pb and Cu), but is not limited to applications above pH 2, and that certain combinations of sorbents and amphipathic, heterocyclic metal coordinating agents with pKa values less than 2 can be used in such extremely depressed pH conditions. In situations where it is desired to remove particularly hazardous contaminants to the greatest extent possible, a depressed pH configuration is a viable option. In such situations, any additional percentage of contamination that is removed may be considered as well worth any additional expense that is attributable to the use of more expensive components that are effective at extremely depressed pH. The use of a depressed pH configuration, at any acidic pH range, can also be considered when very high ionic metal contamination levels are present, since it is thought that, in a depressed pH configuration, corresponding to the pH range where the metal-coordinating compound is relatively charge neutral, the present invention is capable of removing a correspondingly higher percentage of contamination As discussed above in the Background section of the present application, methylbenzotriazole was shown by the prior art to be sorbable in an approximately neutral to basic pH range (Gruden, et al, 2001). An approximately neutral pH range may be considered, generously, as extending from pH 6 to pH 8, such that acidic pH ranges extend below approximately pH 6. This is considered to have no relevance with respect to sorption of benzotriazole by activated carbon in acidic and strongly acidic solutions. In this regard, it is important to understand that even if a chemical structure might arguably reasonably suggest that a compound could be sequestered from solution onto activated carbon, sorption processes are extraordinarily empirical. The only way to establish such behavior with certainty is through empirical testing. Having recognized the highly advantageous acidic sorption behavior of these compounds, in accordance with the present invention, it is noted that Applicants are unaware of any prior art, specifically, or empirical results, generally, made available by the prior art with regard to the sorption behavior of amphipathic, heterocyclic metal-coordinating compounds in such acidic pH ranges. Moreover, the behavior of the sorbent, as a function of acidity, when used with the metal-coordinating compound is equally important.

Conditions which influence the chemical mechanisms upon which the present invention relies, to a significantly lesser degree than acidity, have been found to be generally consistent with what is typically found in metal laden wastewaters such as, for example, AMD. Acceptable conditions include, as examples, relatively low ionic strength, relatively low-organic matter concentration and relatively low levels of particulate matter. Remediation approaches for any of these factors, if found to be problematic in a specific scenario, are readily known by those having ordinary skill in the art, in view of this overall disclosure. Such remediation approaches include, but are not limited to simple sedimentation, coagulation and/or filtration processes.

While metal recovery from the bound complexation that is produced by the present invention, as discussed above, is thought to be enable one of ordinary skill in the art to practice recovery processes, additional descriptions will now be provided for still further explanatory purposes. This recovery may be defined as the selective liberation of a ligand (the metal-coordinating compound) and/or metal from the surface of the sorbent (such as activated carbon), back into a solution, after it has been immobilized through the teachings of the present invention.

With reference to FIG. 7, it is noted that while this figure illustrates a benzotriazole sorbed to activated carbon, which is itself coordinated with a metal "M" (indicated in the figure as "bound metal 730"), the former two components correspond to and operate in a functionally equivalent manner with respect to their more broadly denominated counterparts. Hence, the benzotriazole, labeled "binding compound 710" in the figure, will be referred to in the present discussion as a metal-coordinating compound 710, while "activated carbon 750" will be referred to as "sorbent 750." Liberation of metal 730 can be performed through any of the following scenarios: (i) metal 730 alone is recovered (i.e. metal-coordinating compound 710 remains sorbed to or adsorbed by sorbent 750, (ii) metal 730 and metal-coordinating compound 710 come off of sorbent 750 as a complex or desorbed unit, and (iii) as a result of a chemical treatment, metal coordinating-compound 710 may release itself from the carbon surface and/or may release metal 730.

Any of the following treatments may be used, as non-limiting examples, to liberate metal-coordinating compound (e.g., benzotriazole) bound metals that are immobilized on an activated carbon surface, irrespective of the pH at which the metal was immobilized. These treatments include, but are not limited to: (i) heating, (ii) pH adjustment (acid or base addition), (iii) bacterial biodegradation of the metal-coordinating compound, (iv) solvent elution (which may include, but is not limited to, the use of simple short chain alcohols like methanol or ethanol), (v) salt addition (producing a sharp increase in ionic strength). It is important to understand that these various treatments can be applied in any useful combination.

While the discussions above, referring to FIGS. 1-12 are considered to enable one of ordinary skill in the art to practice the present invention, still further details will be provided below with reference to the remaining figures, for further explanatory purposes. Initially, details are provided regarding the sorption behavior in acidic pH ranges well below the $pH_{zpc}$ (the point of zero charge) of a sorbent used in this application, and $2^{nd}$ $pK_a$ of methylbenzotriazole in still further support of the foregoing discussion. The parameters affecting adsorption (solution pH, ionic strength, and temperature) were optimized.

To support polarographic measurements of MeBT, and provide a controlled level of ionic strength, Britton-Robinson buffers were used containing 0.04 M phosphoric acid, 0.04 M acetic acid and 0.04 M Boric acid (Accashian, Vinopal et al. 1998). The solution pH was adjusted with reagent grade hydrochloric acid or sodium hydroxide. Methylbenzotriazole was obtained from PMC Specialty Group Inc. (Cincinnati, Ohio, USA) or from Sigma-Aldrich Corporation (St Louis, Mo.). Calgon MRX-P GAC was obtained from EFX systems Inc. (Lansing, Mich.), a major industrial waste treatment firm experienced with activated carbon applications (Hickey 2001). Norit HD 3000 GAC was obtained from the EPA center for drinking water optimization at the University of Colorado.

A spectra-Physics high performance liquid chromatograph (HPLC) fitted with a UV detector ($\lambda$=254 nm) was used. 5-MeBT analysis was performed isocratically using two Zorbax Rx-C8 4.6×250 mm columns in series (MacMod Analytical, Inc., Chadds Ford, Pa., USA). The eluent consisted of a phosphate buffer mixed in a 70:30 ratio with HPLC grade acetylnitrile at a flow rate of 1.5 ml/minute with a sample injection volume of 200 µl. All samples were centrifuged at 10,000×g for 5 minutes prior to analysis.

Batch experiments were performed to characterize the sorptive behavior of 5-MeBT on MRX-P and Norit HD 3000 GAC at different ionic strength, temperatures, and pH conditions. These types of activated carbon were chosen because they are often used to treat wastewater streams containing petroleum distillates or included in anaerobic digesters treating industrial wastes including corrosion inhibitors. Five different MeBT concentrations, in the range between 10 and 2000 mg/L were prepared in Britton-Robinson buffers and added to Erlenmeyer flasks containing oven dried GAC such that the final concentration was 1% GAC w/vol. As system controls, flasks with otherwise identical content but without GAC, were also included. These reactors were compiled in triplicate, and allowed to equilibrate on a shaker table at three different temperatures (5, 15 and 25° C.).

Using simple time-series analysis of soluble methylbenzotriazole, the minimum time required for complete sorption was determined. Each experiment reached equilibrium before 48 hours, using a criteria of no more than 4% change in aqueous concentration during the observation period. Mass balances were used to determine the equilibrium portioning of MeBT in the microcosms system. Aqueous concentration data was used to calculate the amount of MeBT associated with GAC by differences. The equilibrium partioning data were then inverted and log-transformed, and tested against widely-accepted sorption models for "best-fit".

The properties of the two different granular activated carbon used, carbon MRX-P (Calgon Carbon Corporation) and HD 3000 (Norit Americas Inc.) are presented in Table 1.

TABLE 1

Properties of the two commercial activated carbon tested

| Activated Carbon | Calgon MRX-P | Norit HD 3000 |
|---|---|---|
| Properties | | |
| Surface area (m²/g) | 900 | 600 |
| Apparent density(g/ml) | 0.5 | 0.40 |
| $pH_{pzc}$ | 7.2 | 8.5 |
| Mech size | 10 × 30 | 8 × 30 |

The sorption capacity of MRX-P and Norit HD 3000 were compared under identical conditions, which suggested that for MeBT, MRX-P had both higher affinity as well as a higher capacity; thus, the effects of pH and ionic strength on MeBT sorption was observed for Calgon MRX-P only. Adsoprtion experiments were executed at three different pH levels (1, 3, and 5), through an ionic strength range of 0.005 through 0.02, and a temperature range of 5 to 25° C.

A Freundlich isotherm model successfully described MeBT sorption. The Freundlich constants and variability describing the isotherms constructed are summarized in Table 5-2. Freundlich's model fit isotherms to these sorption data with low sum of residual errors (0.85<$R^2$<0.96) regardless of the condition tested.

Freundlich Equation:

$$\frac{X}{M} = K_f * C_w^{1/n} \qquad (1)$$

where:
X=mass of adsorbed material (mg)
M=mass of solid material (g)
$K_f$=Freundlich constant [(mg 5-MeBT/g GAC)/(mg 5-MeBT/L)$^n$]
$C_w$=concentration of adsorbate in solution at equilibrium
N=empirical coefficient

TABLE 2

Freunlich isotherm constants for commercial GAC Samples under the conditions tested

| pH | Temp | Carbon | $K_F$ Value | l/n Value | $R^2$ |
|---|---|---|---|---|---|
| 1 | 5 | Calgon | 32.66 | 0.33 | 0.94 |
| 1 | 15 | Calgon | 33.35 | 0.41 | 0.85 |
| 1 | 25 | Calgon | 45.10 | 0.42 | 0.95 |
| 3 | 5 | Calgon | 34.53 | 0.34 | 0.95 |
| 3 | 15 | Calgon | 48.8 | 0.41 | 0.93 |
| 3 | 25 | Calgon | 48.19 | 0.43 | 0.96 |
| 3 | 15 | Norit | 36.69 | 0.38 | 0.93 |
| 5 | 15 | Calgon | 54.85 | 0.46 | 0.93 |

Note:
The Freundlich constants were (0.33 < l/n < 0.46) and adsorption coefficient (33 < $K_f$ < 55), which is considered as relatively high affinity and relatively high sorptive capacity.

Figure 14:
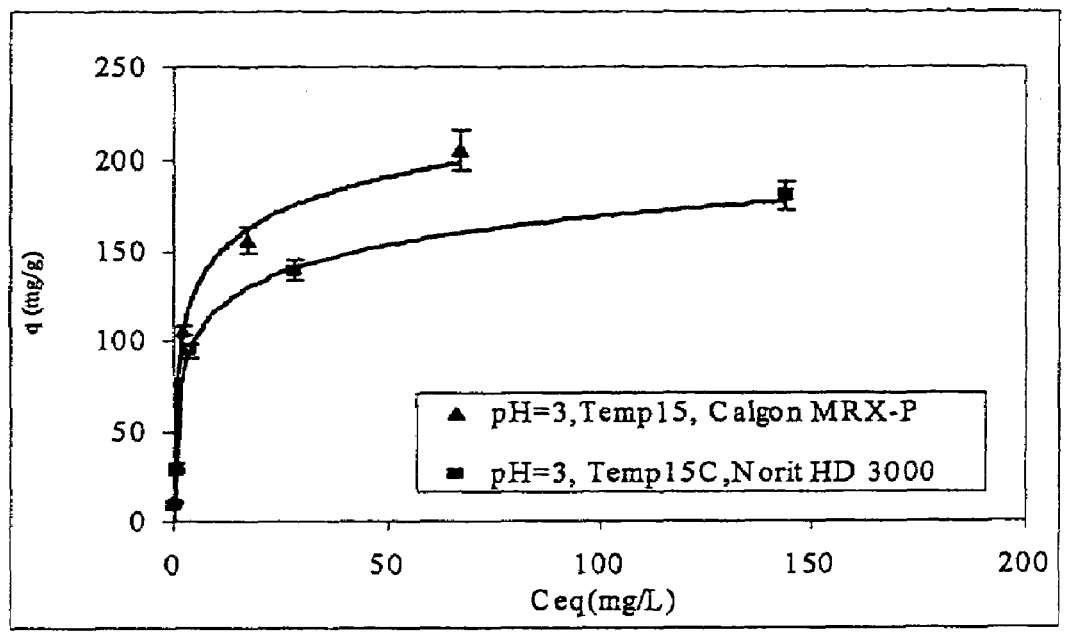
FIG. 14 is a plot illustrating sorptive behavior of 5-methybenzotriazole on Calgon MRX-P and Norit HD 3000 in Briton-Robinson buffer, pH=3, and 15° C. Equilibrium time was less than 48 hours. Error bars represent 95% confidence intervals, n=3.
Figure 15:
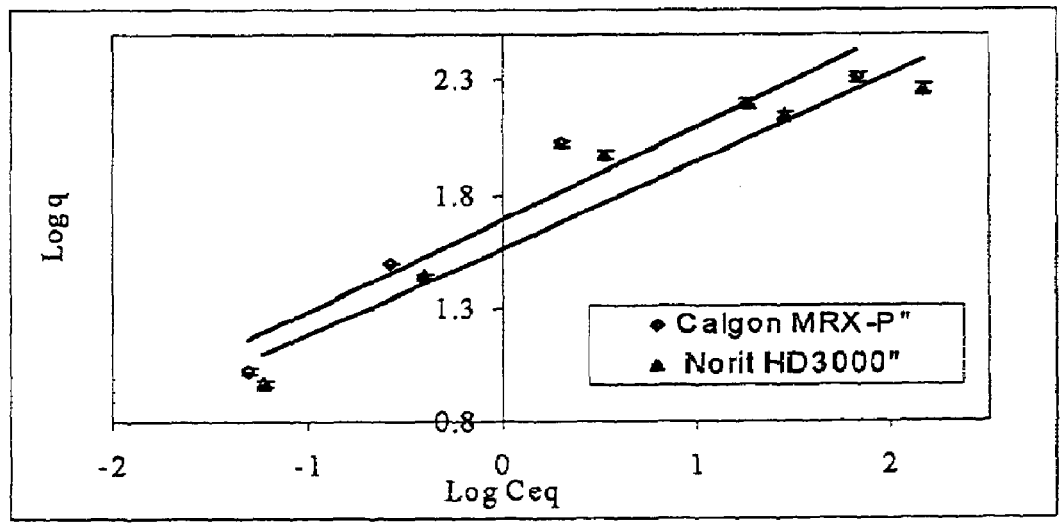
FIG. 15 is a plot showing a log-log linearization of MeBT equilibrium partitioning on Calgon MRX-P and Norit HD 3000 at pH=3 and 15° C. The initial MeBT concentration was between 10-2000 mg/L. Equilibrium time was 48 hours or less. Error bars represent 95% confidence intervals, n=3. In some instances, error bars have lower magnitude than the printing resolution of the original plot.

Based on the results from these experiments, Calgon MRX-P was found to be more effective than Norit HD 3000 in removing MeBT. At pH 3, GAC is predominantly in a protonated form (pH$_{zpc}$>7). Calgon MRX-P had a higher sorption capacity ($K_f$=49 (mg 5-MeBT/g GAC)/(mg 5-MeBT/L)$^n$) for MeBT than did Norit HD 3000 ($K_f$=37 (mg 5-MeBT/g GAC)/(mg 5-MeBT/L)$^n$). This is likely due to their differences in specific surface area and point (pH) of zero charge. The pH of the solutions for both experiments was pH 3. FIGS. 14 and 15, described immediately below, detail the experimental results.

FIG. 14 shows sorptive behavior of 5-methylbenzotriazole on Calgon MRX-P and Norit HD 3000 in Briton-Robinson buffer, pH=3, and 15° C. Equilibrium time was less than 48 hours. Error bars represent 95% confidence intervals, n=3.

FIG. 15 illustrates log-log linearization of MeBT equilibrium partitioning on Calgon MRX-P and Norit HD 3000 at pH=3 and 15° C. The initial MeBT concentration was between 10-2000 mg/L. Equilibrium time was 48 hours or less. Error bars represent 95% confidence intervals, n=3. In some instances, error bars have lower magnitude than printing resolution.

FIGS. 16 through 19, as will be further described, summarize the isotherms constructed to describe MeBT sorption behavior under conditions previously described. These data suggest that Freundlich isotherms can be effectively used to model MeBT partioning on Calgon MRX-P in an acidic pH range. No significant differences were observed until temperature was decreased to 5° C., and such a temperature response was consistent through all pH and ionic strength levels tested.

Figure 16:
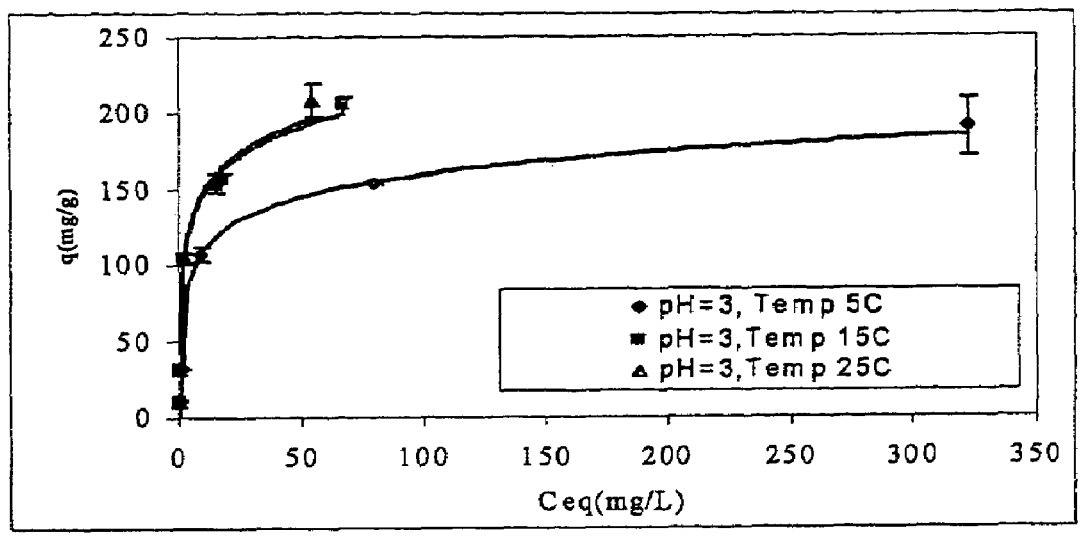
FIG. 16 plots sorptive behavior of 5-methybenzotriazole on Calgon MRX-P in Briton-Robinson buffer, pH=3, at three different temperature 5, 15 and 25° C. Equilibrium time was less than 48 hours. Error bars represent 95% confidence intervals, n=3.

FIG. 16 illustrates sorptive behavior of 5-methybenzotriazole on Calgon MRX-P in Briton-Robinson buffer, pH=3, at three different temperature 5, 15 and 25° C. Equilibrium time was less than 48 hours. Error bars represent 95% confidence intervals, n=3.

Figure 17:
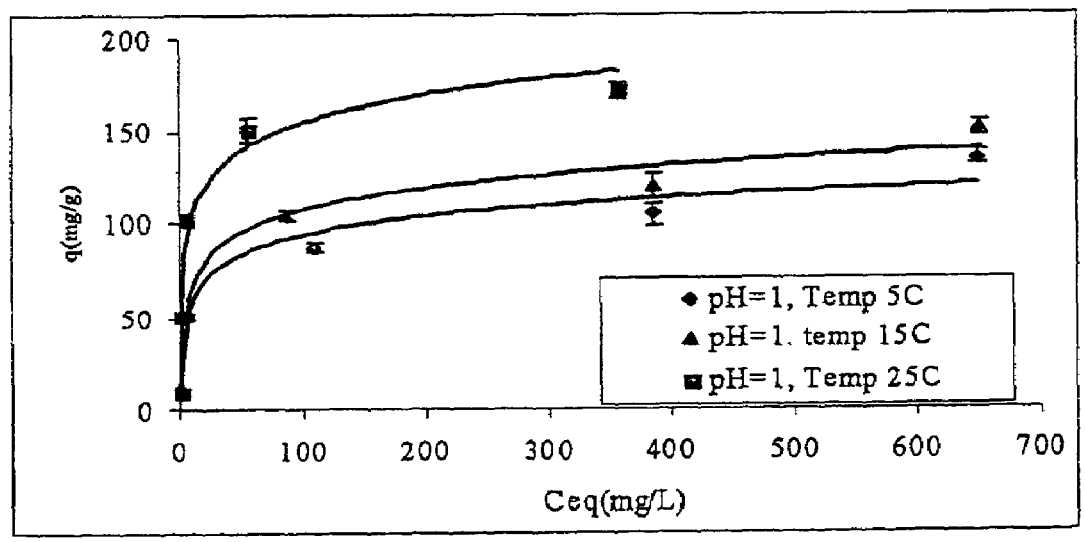
FIG. 17 plots sorptive behavior of 5-methybenzotriazole on Calgon MRX-P in Briton-Robinson buffer, pH=1, at three different temperature 5, 15, and 25° C. Equilibrium time was less than 48 hours. Error bars represent 95% confidence intervals, n=3. In some instances, error bars have lower magnitude than printing resolution.

FIG. 17 shows sorptive behavior of 5-methybenzotriazole on Calgon MRX-P in Briton-Robinson buffer, pH=3, at three different temperature 5, 15, and 25° C. Equilibrium time was less than 48 hours. Error bars represent 95% confidence intervals, n=3. In some instances, error bars have lower magnitude than printing resolution.

Figure 18:
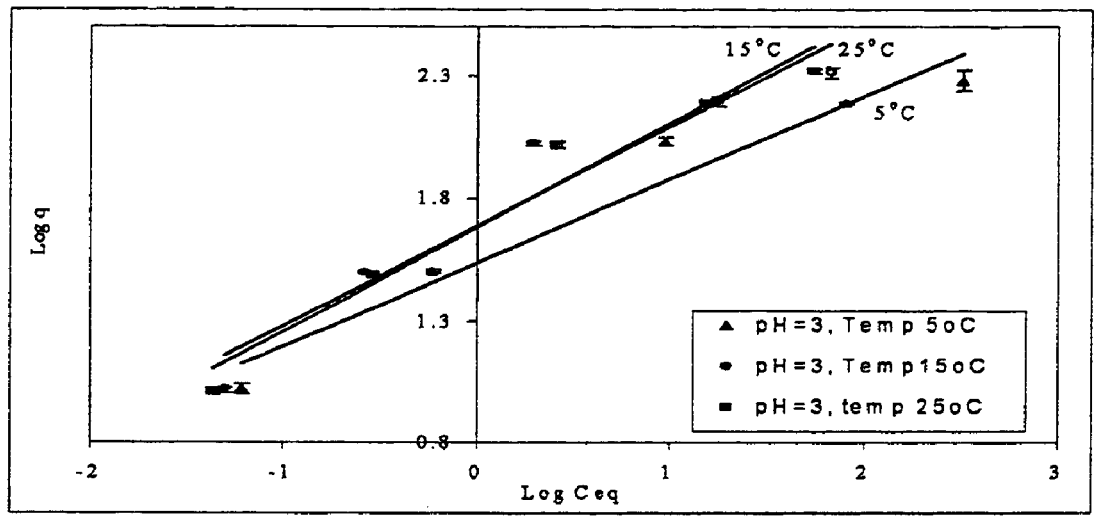
FIG. 18 is a log-log linearization of MeBT equilibrium partitioning on Calgon MRX-P at pH=3 and temperature 5, 15 and 25° C. The initial MeBT concentration was between 10-2000 mg/L. Equilibrium time was less than 48 hours. Error bars represent 95% confidence intervals, n=3. In some instances, error bars have lower magnitude than printing resolution.

FIG. 18 illustrates a log-log linearization of MeBT equilibrium partitioning on Calgon MRX-P at pH=3 and temperature 5, 15 and 25° C. The initial MeBT concentration was between 10-2000 mg/L. Equilibrium time was less than 48 hours. Error bars represent 95% confidence intervals, n=3. In some instances, error bars have lower magnitude than printing resolution.

Figure 19:
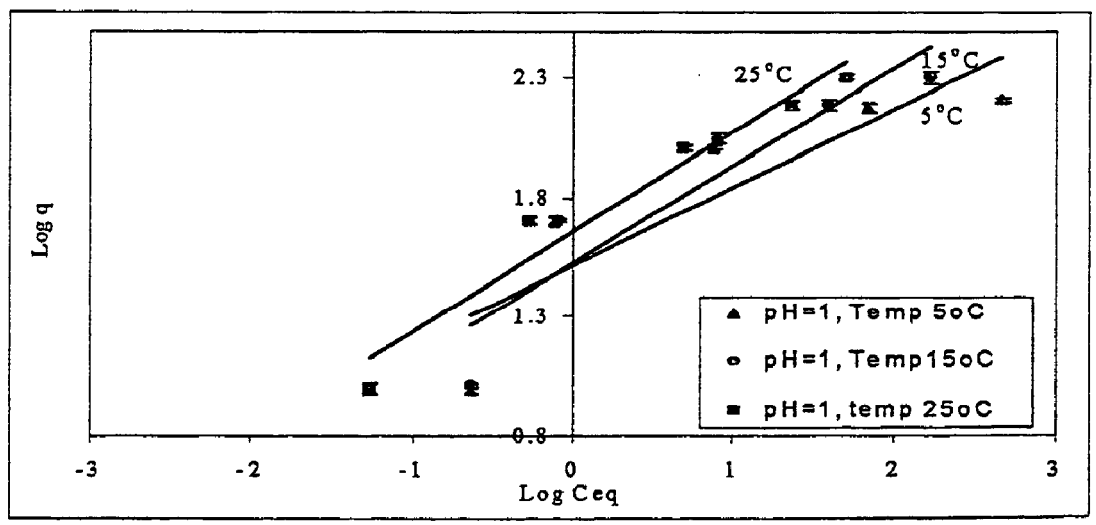
FIG. 19 is a log-log linearization of MeBT equilibrium partitioning on Calgon MRX-P at pH=1 and temperature 5, 15, and 25° C. The initial MeBT concentration was between 10-2000 mg/L. Equilibrium time was less than 48 hours. Error bars represent 95% confidence intervals, n=3. In some instances, error bars have lower magnitude than printing resolution.

FIG. 19 shows a log-log linearization of MeBT equilibrium partitioning on Calgon MRX-P at pH=1 and temperature 5, 15, and 25° C. The initial MeBT concentration was between 10-2000 mg/L. Equilibrium time was less than 48 hours. Error bars represent 95% confidence intervals, n=3. In some instances, error bars have lower magnitude than the printing resolution of the original plot.

Figure 20:
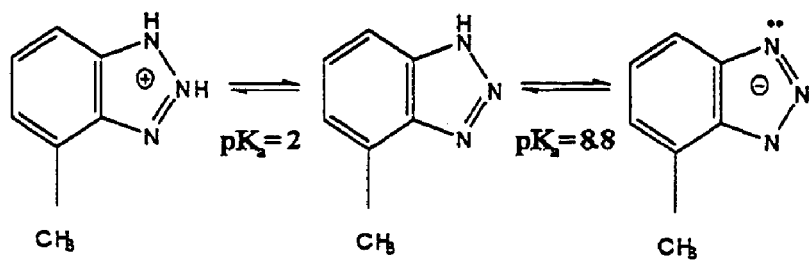
FIG. 20 is a diagram illustrating the acid/base properties of methylbenzotriazole in the pH range between 2 and 9, in which the predominant form of these derivatives is charge neutral.
Figure 21:
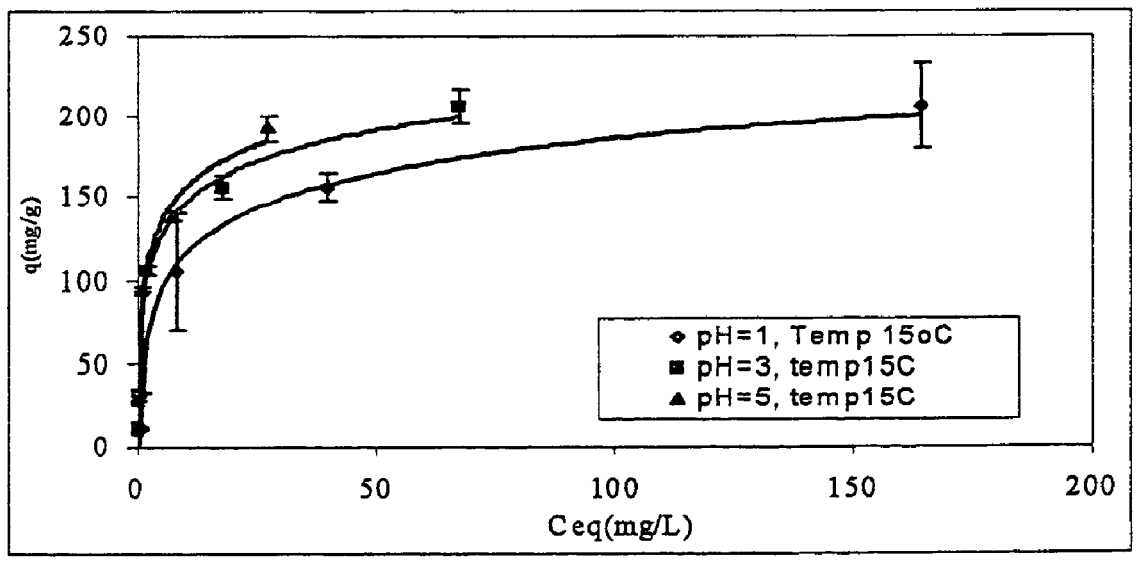
FIG. 21 is a plot of sorptive behavior of 5-methybenzotriazole on Calgon MRX-P in Briton-Robinson buffer, pH=1,3 and 5, and 15° C. Equilibrium time was less than 48 hours. Error bars represent 95% confidence intervals, n=3.
Figure 22:
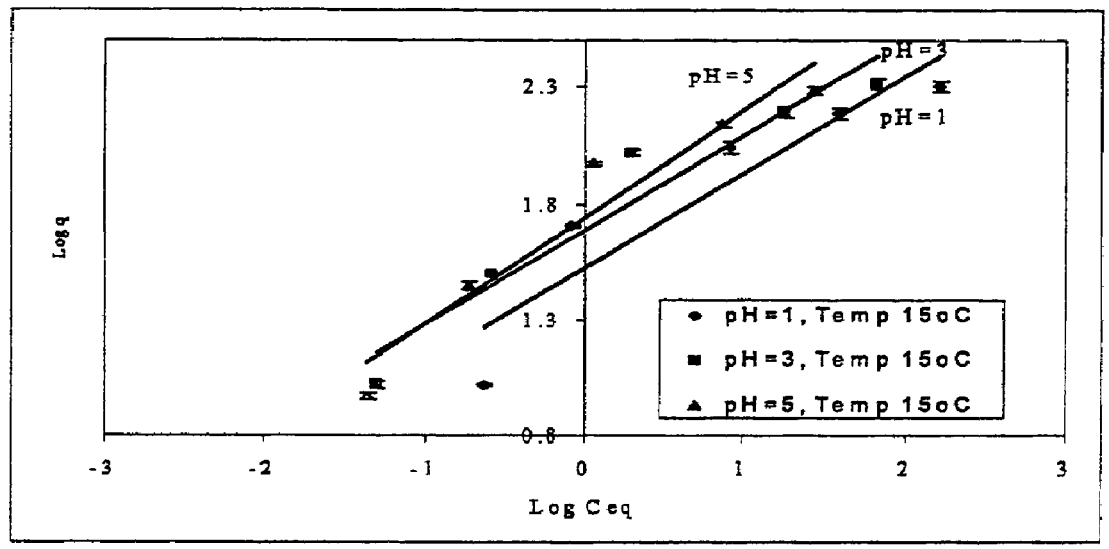
FIG. 22 is a log-log linearization of MeBT equilibrium partitioning on Calgon MRX-P at pH=1, 3, and 5, and 15° C. The initial MeBT concentration was between 10-2000 mg/L. Equilibrium time was less than 48 hours. Error bars represent 95% confidence intervals, n=3. In some instances, error bars have lower magnitude than printing resolution.

Referring generally to FIGS. 20-22, a series of tests was carried out using the protocol previously presented for the standard adsorption experiments, except that immediately prior to GAC addition, the pH was adjusted to 1, 3 or 5 by the addition of small amounts of 1.0 N HCl or NaOH. FIG. 20 illustrates the acid/base properties of methylbenzotriazole. In the pH range between 2 and 9, the predominant form of these derivatives is charge neutral. The effects of pH on the adsorption of MeBT on GAC are presented in FIGS. 21 and 22, as will be further described.

FIG. 21 plots sorptive behavior of 5-methylbenzotriazole on Calgon MRX-P in Briton-Robinson buffer, pH=1, 3 and 5, and 15° C. Equilibrium time was less than 48 hours. Error bars represent 95% confidence intervals, n=3.

FIG. 22 illustrates a log-log linearization of MeBT equilibrium partitioning on Calgon MRX-P at pH=1, 3, and 5, and 15° C. The initial MeBT concentration was between 10-2000 mg/L. Equilibrium time was less than 48 hours. Error bars represent 95% confidence intervals, n=3. In some instances, error bars have lower magnitude than the printing resolution of the original plot.

Figure 23:
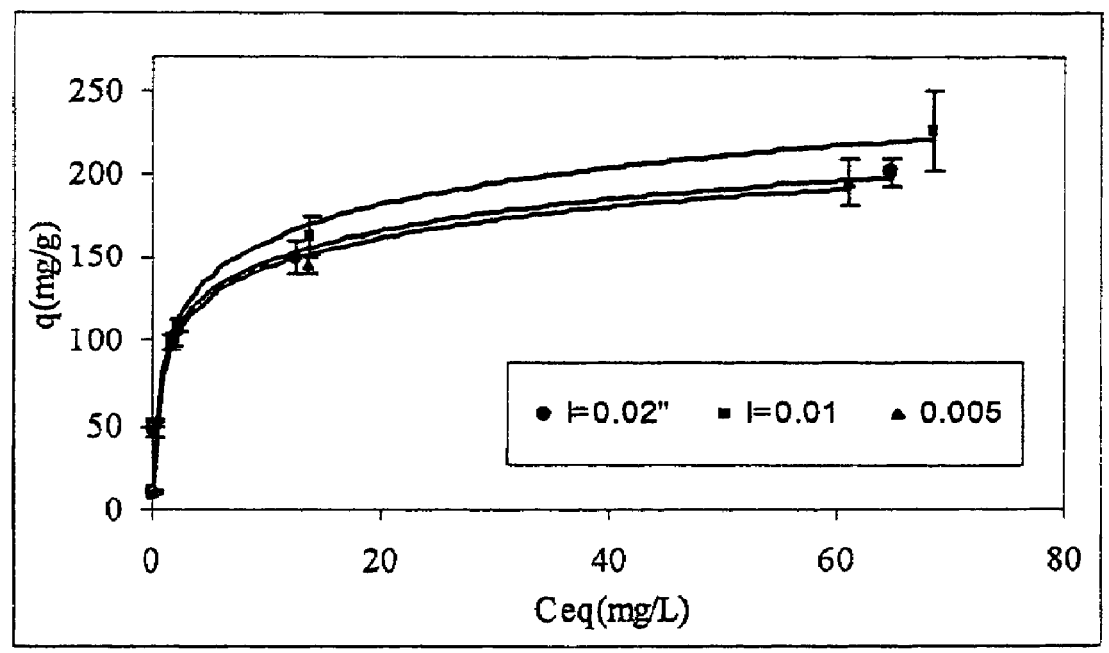
FIG. 23 plots sorptive behavior of 5-methybenzotriazole on Calgon MRX-P in Briton-Robinson buffer, pH=3, and 15° C., and ionic strength of 0.005, 0.01, and 0.02M. Equilibrium time was less than 48 hours. Error bars represent 95% confidence intervals, n=3.

FIG. 23 shows sorptive behavior of 5-methylbenzotriazole on Calgon MRX-P in Briton-Robinson buffer, pH=3, and 15° C., and ionic strength of 0.005, 0.01, and 0.02M. Equilibrium time was less than 48 hours. Error bars represent 95% confidence intervals, n=3.

Solution pH was found to be an important parameter influencing the equilibrium partioning of MeBT on this GAC type. Adsorption potential significantly increased in response to increases in pH between 1<pH<5. This is likely due to the protonation of functional groups on the carbon surfaces as well as the protonation and ionization of MeBT. The loss of sorptive potential with pH depression is consistent with the acid base properties of methylbenzotriazole. MeBT has two dissociations which liberate hydrogen: one near pH 2, the other near pH 9 (FIG. 20). The drop in sorptive capacity (and affinity) as pH drops below the first pKa of methylbenzotriazole is likely due to in part to the positive ionization of these molecules. In the pH range between 2 and 9, MeBT is charge neutral and will likely have its greatest sorption potential on non-charged GAC surfaces.

Figure 24:
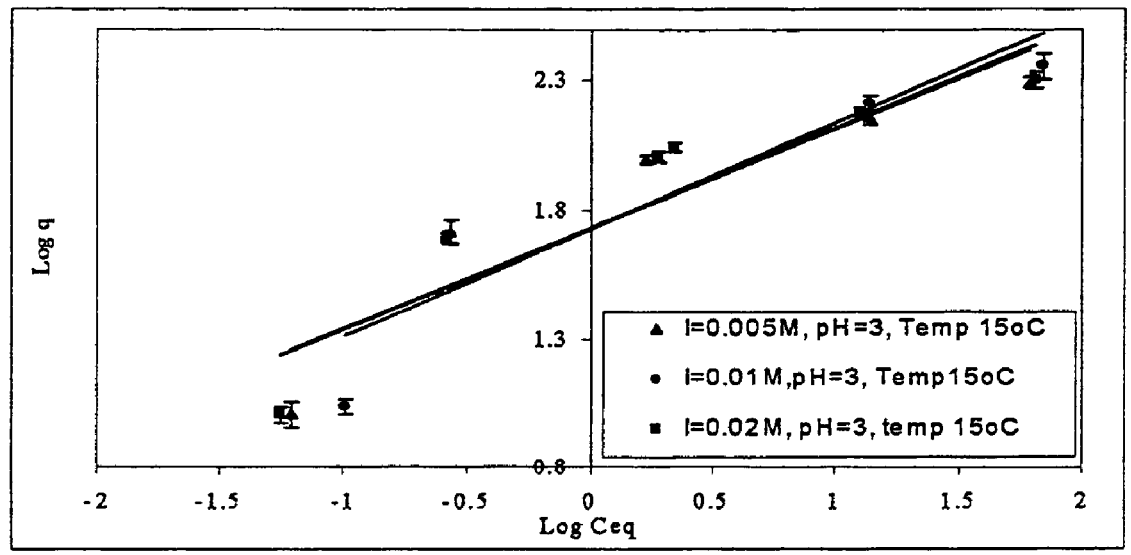
FIG. 24 is a log-log linearization of MeBT equilibrium partitioning on Calgon MRX-P at pH=3 and 15° C., and ionic strength of 0.005, 0.01, and 0.02M. The initial MeBT concentration was between 10-2000 mg/L. Equilibrium time was less than 48 hours. Error bars represent 95% confidence intervals, n=3. In some instances, error bars have lower magnitude than printing resolution.

In FIG. 24, adsorption isotherms for MeBT and Calgon MRX-P GAC at ionic strength 0.005, 0.01, and 0.02 M are presented using a log-log linearization of MeBT equilibrium partitioning on Calgon MRX-P at pH=3 and 15° C. Ionic strength had no significant effects on MeBT sorption. The initial MeBT concentration was between 10-2000 mg/L. Equilibrium time was less than 48 hours. Error bars represent 95% confidence intervals, n=3. In some instances, error bars have a lower magnitude than the printing resolution of the original plot.

Accordingly, these experiments have been performed in the context of the present invention to determine the effects of pH, temperature, and ionic strength on MeBT removal by GAC. Results suggest that MeBT sorption on GAC's commonly used for the treatment of petroleum distillates could be modeled using Freundlich isotherm. These observations are in general agreement with Gruden and coworkers (2001) who observed that MeBT partitioning on biosolids could be described using a Freundlich model. Increasing ionic strength had no effect on MeBT isotherm, whereas 5-MeBT sorption on GAC was found to be sensitive to pH, and solution temperature. The specific sorption and apparent affinity of MeBT for Calgon MRX-P suggested that this type of GAC (and others like it) can be successful in treating acidic water streams containing MeBT.

It is important in the context of the present invention to understand that transition metals become mobile when exposed to acidic solutions. Industrial processing (e.g. leather tanning, metal plating, electronic microchip manufacture), nuclear fuel processing and mining operations liberate significant quantities of metals in acidic discharges that need some level of (pre)treatment.

Industrial metal discharges can cause significant ecosystem damage. Recent USGS surveys (Stewart and Severson 1994) have reported that at least 1300 miles of streams in Colorado alone are negatively impacted by acid mine drainage (AMD). The generation of acid mine drainage occurs due to the exposure of sulfide containing minerals to oxygen and water, which can result in acidic conditions. Additionally, this runoff is characterized by high metal loadings according to local geology.

Current metal treatment remediation technology using both natural and engineered systems have been relatively successful, but are often costly. One of the most common remediation approaches involves alkaline precipitation usually induced by lime addition. A major disadvantage of this method is a requirement for large doses of alkaline materials to increase and maintain pH values well above 6.5 for optimal removal (McDonald and Grandt 1981). Additionally, liming often produces large volumes of secondary waste, such as metal hydroxide sludge and gypsum, which are highly regulated and have costly disposal requirements. Studies have also shown that alkaline precipitation alone does not always remove metals to the regulatory effluent limits.

Other methods of removing metals from aqueous streams include ion exchange, electrodialysis, membrane separation and ceramic filtration. While successful in some pretreatment arenas, these methods are relatively new and often more expensive with respect to alkaline precipitation processes, and activated carbon sorption, which is the focus of this research.

The concepts supporting metal sorption by activated carbon were first introduced by Watanabe and Ogawa (1929) cited in (Netzer and Hughes 1984), and this practice was largely limited to metallurgical recovery until the 1970's. Smith (Smith 1973) was the first to report the use of activated carbon for aqueous metal removal, as applied to mercury, (again) in a neutral to basic pH solution.

Metal adsorption on activated carbons is generally observed to be inversely proportional to metal solubility; better adsorption can be expected when conditions render metal-containing compounds less soluble. Thus, as described above, the motivation provided by the prior art is to convert to a neutral or basic solution, since most transition metals become less soluble, often forming oxides, hydroxides and carbonate precipitates as the solution pH is increased. In acidic pH ranges, most transition metal ions do not effectively sorb to activated carbon surfaces; thus, carbon is not often used for metals removal in many aqueous systems, and industrial waste streams.

In a series of batch studies, Netzer and Hughes (1984) observed poor adsorption of lead, copper, or cobalt to activated carbon below a well defined solution pH value for each metal. This and numerous other studies report transition metal sorption by activated carbon is insignificant below pH 4. An explanation offered for changes in metal sorption behavior in response to pH changes is the hydrolysis and loss of outer hydration sphere and formation of complexes.

Acidic powdered activated carbons have been shown to have high sorption capacities for the inorganic ions of mercury, lead, copper, cobalt (Huang and Blankenship 1984; Netzer and Hughes 1984; Wilczak and Keinath 1993). Whereas basic granular activated carbons have exhibited high capacities for some chromium complexes (Kim 1976). Reed (1995) reported that lead removal can be due to precipitation mechanisms on activated carbon surfaces. Chen and Haung (1992) investigated the treatment of actual wastewaters containing zinc, and organic solvents. The motivation for this and other studies was that alkaline precipitation alone was not able to reach the effluent limits (1 mg/L) because of the presence of organic contaminants. A combination of chemical precipitation and activated carbon was proposed. It is of interest to note that the present invention, in contrast, enhances metal immobilization potential with a metal-coordinating ligand that retains sorptive affinity of activated carbon and other sorbents in pH ranges whereas the prior art studies, under discussion, show that metal sorption potential declines toward practical insignificance. Stated in a slightly different way, the use of a metal-coordinating compound, as taught by the present invention, effectively completely alters the sorptive behavior of the activated carbon, in contrast with the subject prior art.

The presence of organic and inorganic compounds, competing metals, varying ionic strength, and background electrolyte can alter the partitioning of a metal to activated carbon surfaces with respect to ligand-free systems. It is recognized by the present invention that a metal ion which has been complexed in solution may display significantly different partitioning interactions with activated carbon surfaces than its uncomplexed counter part. Factors determining the effect of ligands on metal adsorption include the type and concentration of ligand and metal, solution pH, and ionic strength. In systems with more than one sorbing species, competition between the adsorbates for surface sites may occur. The degree of competition is largely dependent on the type and concentration of competing ions and complexes, numbers of surface sites, and the affinity of the surface for each free metal ion and metal-ligand complex. The ionic strength and background electrolyte composition can affect metal adsorption by altering soluble metal chemistry, and the structure and nature of the electrostatic interactions between metals, ligand-metal complexes and sorbent surfaces.

The present invention recognizes that complexation of metals with an organic molecule prior to contacting surfaces may enhance their affinity for activated carbon or other industrial sorbents. The complexing agent of choice should be highly sorbable by activated carbon and able to form strong complexes with free metal ions or their common hydrolysis products. With this recognition in hand, it would be expected that the resultant metal-organic complex would display sorption properties more heavily influenced by those of the organic molecule than of the free metal ions.

Rubin and Mercer (1987) found that ethylene diamine tetracetic acid (EDTA) enhanced adsorption of cadmium on Nuchar WV-L GAC (Westvaco, Covington, Va.) at low cadmium to carbon ratios (carbon dose 5000 mg/L) and reduced cadmium adsorption at lower carbon doses (500 mg/L). They illustrated that the suppressive effect of EDTA on cadmium adsorption is proportional to the EDTA to Cd(II) molar ratios. Shay and Etzel (1992) studied the effect of chelating agents on metal removal to determine if the use of activated carbon to treat metal plating wastewaters was feasible; they investigated the removal of several heavy metals (Cu, Ni, and Zn) that were chelated with citrate or EDTA. For citrate, increasing the metal to chelate molar ratios improved column performance for all metals; better adsorption was observed when the metals were chelated with EDTA as compared to citrate. However, unlike citrate, metal removal was not improved by increasing the EDTA: metal molar ratio beyond 1:1. These studies demonstrated that leveraging the sorptive properties of amphipathic chelating agents are dependent on optimizing conditions for the electrostatic immobilization of metal-organic and complexes.

Studies of complexation effect on metal sorption are not limited to organic ligands; Reed and Noavinakere (1992) reported that Ni(II) adsorption on Calgon F400 decreased in the presence of orthophosphate—a strong non-amphipathic ligand and corrosion inhibitor for many transition metals and alloys.

In this context, the present invention recognizes that the coordination of transition metals with benzotriazole derivatives changes the charge distribution and the hydrophobic characteristic of these ligands over that of their free counterparts and, as a result, its affinity for granular activated carbon (GAC) may be enhanced by its coordination with certain metals. The success of this process is dependent not only on the strength of the metal-benzotriazole interactions, but their attraction and retention on sorbent surfaces. Retention can be optimized by using sorbents which have surfaces with zero point charge approximately equal to, or just larger than, the operational pH. Many metal-benzotriazole complexes have high stability constants and this behavior may be leveraged for removing transition metals from acidic natural and wastewaters, where previous activated carbon applications failed.

Accordingly, benzotriazole derivatives, which are commonly used as corrosion inhibitors in a wide variety of industrial applications, are considered by the present invention as being useful in removing metals from solution. Because benzotriazoles can strongly bind metal ions while maintaining a strong surface sorption character, they can remove metals from acidic waste streams without pH adjustment or sludge production. Such a process may be more economical than the process associated with alkaline precipitation or ion exchange, and may offer realistic possibilities for metal recovery.

Differential Pulse Polarography and Stability Theory

Differential pulse polarography (DPP) can be used for the determination of consecutive and overall stability constants of metal complexes that can be reversibly reduced. Such an approach was applied to estimate the strength of metal-benzotriazole interactions in acidic solutions. The current that flows during a single life time of a dropping mercury electrode (DME) is held at a given potential in a polarograph and is described by the Ilkovic Equation:

$$I_d = 708 n D_o^{1/2} C_0^* m^{2/3} t^{1/6} \tag{2}$$

In which, $I_d$=diffusion current (A)

n=number of electrons transferred/molecule, m=mercury flow rate (mg/s).

t=Sampling interval(s).

$D_o$=diffusion coefficient (cm$^2$/sec)

$C_o^*$=Concentration of oxidized species in bulk solution (mol/cm$^3$)

The overall electrode reaction can be generally represented by $$M^{x+} + nL^{y-} \leftrightarrow ML_n^{(x+y)}$$

$$M^{x+} + xe^- \leftrightarrow M \tag{3}$$

Where, $M^{x+}$ represt some metal ion, $L^{-y}$ a ligand, and $ML^{(x+y)}$ a complex formed.

In their classic report, Deford and Hume (1951) defined a series of functions, where the change in reduction potential of a target ion, measured with a polarograph, can be directly related to its complexation stability by the progressive addition of a known ligand.

$$F_0(x) = \sum \beta_n C_L^n = antilog\left[0.434\frac{nF}{RT}\Delta E_P\right] + Log\frac{(I_p)_s}{(I_p)_s} \tag{4}$$

In which, $\beta_n$=overall stability constant of the n$^{th}$ complex, $C_L$=ligand concentration assuming $C_L \gg C_M$, $(I_p)_s$=diffusion current constant of free metals.

$(I_p)_c$=diffusion current constant of complexed metal.

The shift in DPP potential on the addition of complexing ligand is given as:

$$\Delta E_p = (E_p)_s - (E_p)_C \tag{5}$$

Under most common testing conditions $(I_p)_s = (I_p)_C$ for most inorganic species (Heath and Hefter 1977), so equation (4) condenses to $$F_0(x) = \sum \beta_n C_L^n = antilog\left[0.434\frac{nF}{RT}\Delta E_P\right] \tag{6}$$

Stability constants are obtained as follows where $$F_0(x) = \Sigma \beta_n C_L^n = \beta_0 \beta_1 C_L + \beta_2 C_L^{2+} \cdots + \beta_n C_L^n \tag{7}$$

In which, $\beta_0$ has a value of unity. The function $F_n(X)$ is introduced where $$F_n(X) = \frac{F_{n-1}(X) - \beta_{n-1}}{C_L} \quad (8)$$

In order to obtain $\beta_1, \ldots, \beta_n$, a widely-accepted graphical extrapolation method derived by Leden (1941) was applied. Sequential plots of equation (7) ($F_n(X)$ vs. C) yielded a family of curves, through which coordination chemistry between metals and benzotriazoles was determined.

The maximum coordination number was also independently determined using the Lingane method reported by Crow (1969) with a plot of $\Delta E_{1/2}$ Vs. Log $C_x$ relationship, using the Lingane equation:

$$(E_p)_S = (E_p)_C - \frac{0.0591}{n}\text{Log}\beta_{mxj} - j\frac{0.0591}{n}\text{Log}C_x \quad (9)$$

$\beta_{mxj}$ (the overall stability constant), and j (maximum number of ligands coordinated with a metal through a reversible series of complexing interactions), were determined for Cu(II), Pb(II) and Zn(II) interactions with benzotriazoles. The present application reports the development and use of polarographic methods for quantification of benzotriazole complexes to study their potential for immobilizing metals on activated carbon surfaces.

Experimental Materials and Methods

Reagents

Chemicals for HPLC and DPP analysis were obtained from Fisher Scientific (Pittsburgh, Pa., USA). Sulfuric and nitric acid were used for pH adjustment. $NaClO_4$ was used for ionic strength adjustment. Methylbenzotriazole derivatives were obtained from PMC Specialty Group Inc. (Cincinnati, Ohio, USA) or bought from Sigma-Aldrich Corporation (St Louis, Mo.). Calgon MRX-P GAC was obtained in kind from EFX systems Inc. (Lansing, MI); an industrial waste treatment firm experienced with activated carbon applications in biological waste treatment systems (Hickey 2001). MRX-P is often used for applications to sequester petroleum distillates from wastewater effluents and biological treatment system.

Analytical Methods

HPLC

A spectra-Physics high performance liquid chromatography (HPLC) with UV-Vis Detector ($\lambda$=254 nm) was used. Methylbenzotriazole analysis was performed isocratically using two Zorbax Rx-C8 4.6×250 mm columns in series (MacMod Analytical, Inc., Chadds Ford, Pa., USA). The eluent consisted of a phosphate buffer mixed in a 70:30 ratio with HPLC grade acetylnitrile at a flow rate of 1.5 ml/minute with a sample injection volume of 200 μl. All samples were centrifuged at 10,000×g for 5 minutes prior to analysis.

Polarography

Polarographic and voltammetric measurements were performed with a CV-50W Voltametric analyzer fitted with a controlled growth mercury electrode; this multimode electrode was used in a static mercury drop electrode (SMDE) mode. The mercury electrode was multiplexed using BAS commercial software (Bioanalytical Systems, Inc., Lafayette, Ind., USA) a platinum auxiliary electrode and an Ag/AgCl (3 M KCl) reference electrode. All potentials were normalized to the Ag/AgCl electrode. A system scan rate of 5 mV s$^{-1}$ was used with a drop time of 1 sec. For DPP, the pulse amplitude was 100 mV with a sample width of 17 msec. A repeatable drop size was produced using a borosilicate capillary tube. The solenoid activation setting was 100 ms for all runs.

Procedure and Experimental Design

Batch experiments were performed to characterize the sorptive behavior of 5-MeBT on calgon MRX-P in the presence or absence of select transition metals. The properties of MRX-P are summarized in Table 3.

TABLE 3

| Common engineering properties of Calgon MRX-P | |
|---|---|
| Properties | |
| Surface area (m2/g) | 900 |
| Apparent density(g/ml) | 0.5 |
| pHpzc (The point of zero charge) | 7.2 |
| Mesh size | 10 × 30 |

Experiments were executed to bracket a range of MeBT and carbon concentrations near the sorptive capacity of calgon MRX, as judged by Freundlich isotherm modeling (c.a. 49 mg/g). Lead, copper, and zinc were chosen as models to study the complexation behavior and sorptive interactions when MeBT is bound to different transition metals. Different ratios of ligand (MeBT) and metal were chosen based on the coordination stichiometry of MeBT with each metal. The ionic strength was held constant at 0.0 1M, and $H_2SO_4$ and $HNO_3$ were used as background electrolytes. Lead, copper and zinc concentrations of 10 mg/L and carbon concentrations of 5 g/L were employed for batch microcosm assays.

Microcosms used for benzotriazole-metal immobilization experiments on GAC. Microcosms consisted of 250 ml Erlenmeyer flasks containing 75 mls of test solution with and without activated carbon. 75 milliliter aliquots of MeBT solution containing known GAC masses were placed in 250 ml Erlenmeyer flask. The samples were allowed to equilibrate on a shaker table at 15° C. for no more than 24 hours. Following equilibration, the samples were centrifuged and the supernatant was analyzed for both metal and 5-MeBT content. Metal-ligand molar ratios of 1:0, 1:2, 1:10, and 1:30 were employed. Identical experiments were conducted for each metal in the absence of GAC for the same metal: ligand ratios to determine any possible metal removal effects associated with precipitation. The resulting aqueous metal concentrations were measured by DPP and confirmed by inductive coupled plasma/atomic emission spectroscopy (ARL 3410 ICP/AES) in an EPA certified laboratory in the Geology department at University of Colorado. 5-MeBT was measured by both DPP and HPLC methods. Control systems consisted of otherwise identical systems that did not include MeBT.

After sorption, GAC was removed, washed with water, and then transferred to a clean electrolyte solution at different pH (pH 2-4) to investigate the stability of the metal: 5-MeBT complexes once immobilized on activated carbon. After 24 hours of equilibration and at time intervals 0, 7, and 30 days, 5 mls of each sample was centrifuged and analyzed for both metal and 5-MeBT content using both ICP/EAS and HPLC.

For the stability constant calculations, a 15 ml supporting electrolyte solution was pipetted into the voltammetric cell and the metal salt addition was adjusted to yield a final concentration of approximately 10$^{-5}$ M. The ligand (5-methybenzotriazole) was then added in increasing concentration from 0 to 1×10$^{-2}$ M. Polarograms were constructed, and the shift in the half wave potential was recorded after each ligand addition. All DPP measurements were made in triplicate.

Reversibility

DeFord-Hume analysis is based on assumption that the complexation observed of the electrode surfaces is reversible, which is the case for benzotriazole metal interactions. According to a widely accepted metric developed by Parry and Osteryoung (1965), the reversibility of a polarographic wave is most accurately assessed by its half peak width, these researchers derived a general expression for the half peak width of DPP polarogram, which predicts a value of 62 mV for a fully reversible two electron reduction at an applied pulse of 50 mV. In the present work, DPP polarograms in Britton-Robenson buffer media had half peak widths of 62±2 mV for both free copper and complexed copper, indicating a high degree of reversibility. The same value was observed for both free lead and complexed lead in sulfuric acid media. Reversibility was further tested using Tomes criterion: Given that $E_{3/4}$-$E_{1/4}$ represents the potential at ¾ and ¼ the diffusion current respectively (Crow 1969), according to this criterion $E_{3/4}$-$E_{1/4}$ for a two electron reduction process where an applied pulse at 50 mV results in a 29 mV response confirms a reversible reduction. In the DPP work, an applied pulse of 50 mV, $E_{3/4}$-$E_{1/4}$ was observed with differences of 30±1 and 29±1 mV for both Cu (II) and Pb (II) respectively.

Complexation of Pb with 5-Methylbenzotriazole

Figure 25:
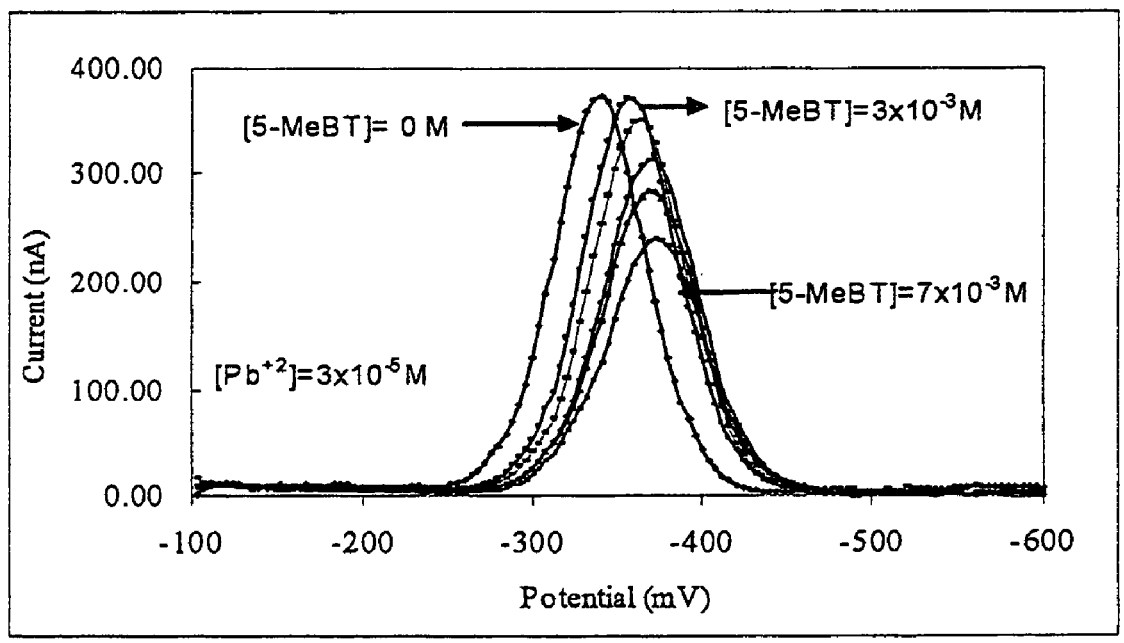
FIG. 25 is a differential pulse polarogram of Pb (II):5-methylbenzotriazole system showing the potential shift and streaming current reduction resulting from the addition of increasing amounts of benzotriazole. $[Pb^{+2}]=3\times10^{-5}M$.

Test solutions containing Pb(II) responded with significant and reproducible potential shifts upon the addition of 5-methylbenzotriazole; which validated the use of DPP spectra for formation constant determinations. FIG. 25 is a differential pulse polarogram of Pb (II):5-methylbenzotriazole system showing the potential shift and streaming current reduction resulting from the addition of increasing amounts of benzotriazole. These polarograms are typical of those associated with a lead-5-methylbenzotriazole system after the incremental additions of MeBT addition of different ligand concentrations.

Figure 26:
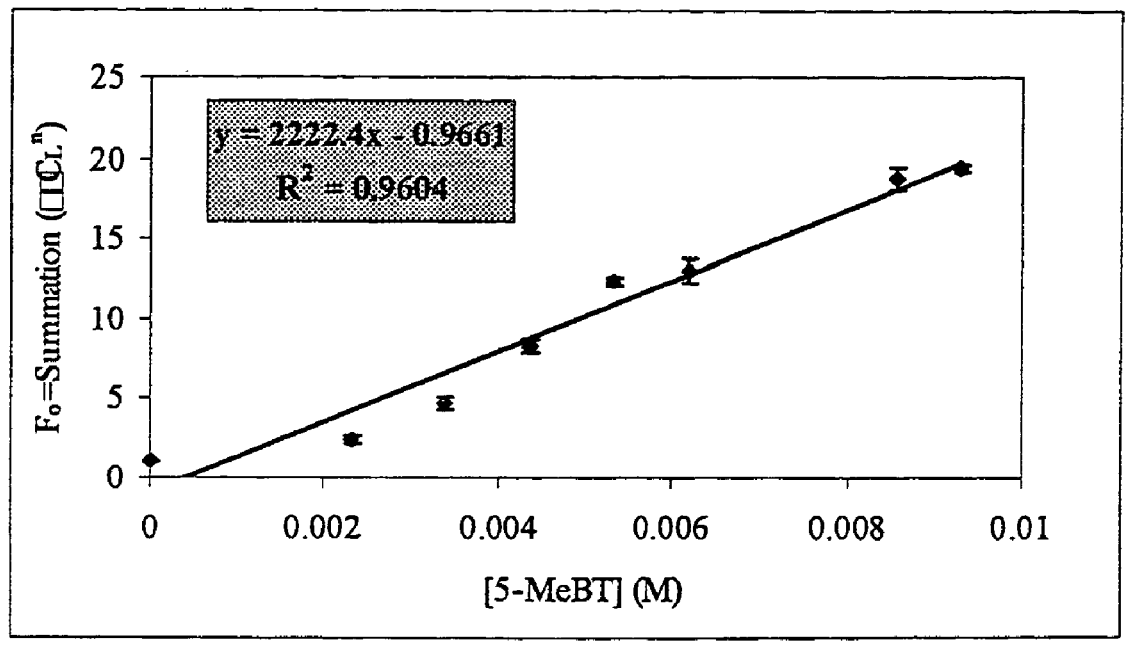
FIG. 26 is a plot showing a summation of stepwise stability constant-ligand concentration products for test solutions containing Pb(II) and increasing concentrations of 5-methylbenzotriazole. $[Pb(II)]=3\times10^{-5}M$, pH=3, T=25° C., Symbols represent the averages of triplicate observations; error bars represent standard deviation.

FIG. 26 is a plot of $F_o(X)$ vs. [MeBT] yielding a straight line indicating that the stoichometric ligand saturation had corresponded to a metal:ligand ratio of 1. The slope of this line corresponded to a value of $\beta_1$ approximately equal to $2.2 \times 10^3$.

Figure 27:
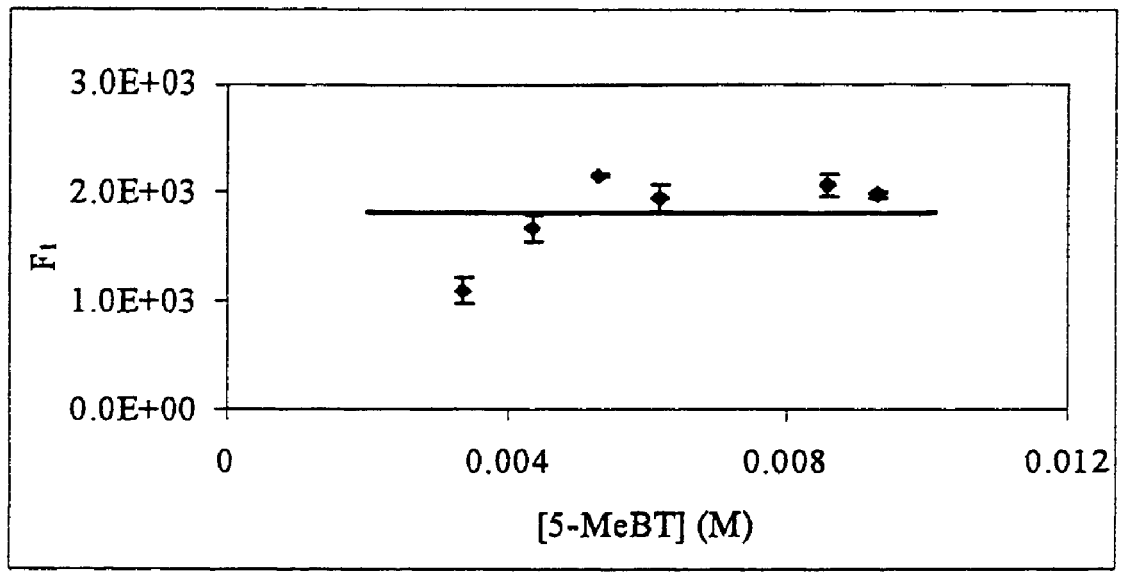
FIG. 27 plots first derivatives of stability constant-ligand concentration product summation for test solutions containing Pb(II) and increasing concentrations of 5-methylbenzotriazole. $[Pb(II)]=3\times10^{-5}M$, pH=3, T=25° C., Symbols represent the averages of triplicate observations; error bars represent standard deviation.

Analytical confirmation for the coordination stoichometry, the intercept of the plot of $F_1(X)$ vs. [MeBT] yielded a straight line parallel to the [MeBT] axis, indicating that the highest ligand: metal ratio of Pb-MeBT interactions was 1 (as shown in FIG. 27). The intercept corresponded to a value of 62$_1$ was approximately equal to $1.8 \times 10^3$. The maximum coordination number was also confirmed by the Lingane method using the slope of the plots of $\Delta E_{1/2}$ vs. Log [MeBT] (Crow 1969), which was also found to approach the maximum ligand coordination number of 1.

Figure 28:
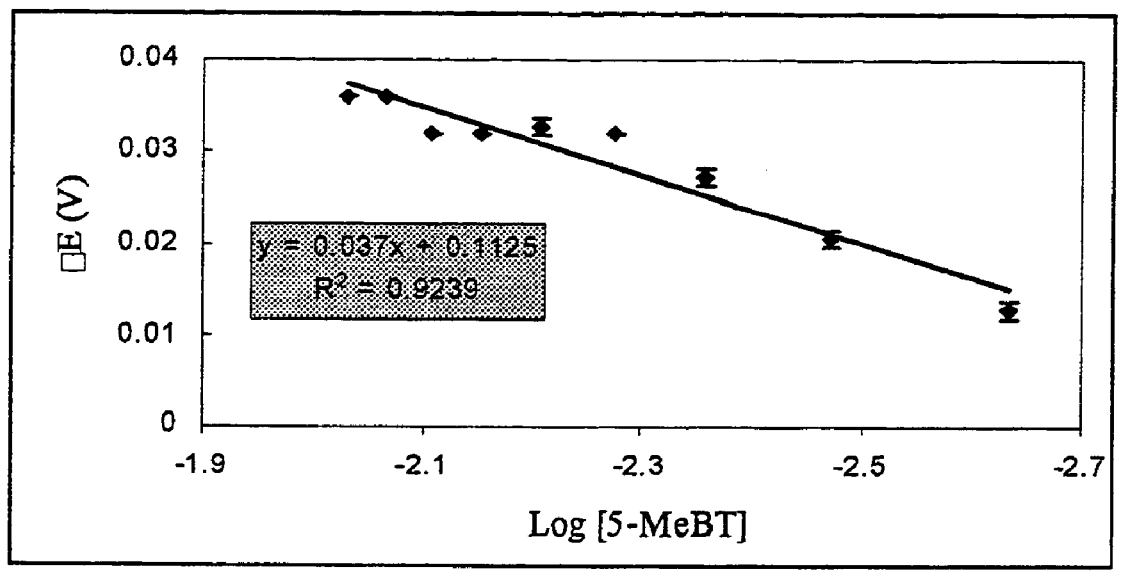
FIG. 28 illustrates half wave potential shift for the reduction of Pb(II) in response to increasing concentrations of 5-methybenzotriazole. pH=3; T=25° C. Symbols represent the averages of triplicate observations; error bars represent standard deviation.

FIG. 28 illustrates half wave potential shift for the reduction of Pb(II) in response to increasing concentrations of 5-methybenzotriazole. pH=3; T=25° C.

Complexation of Cu with 5-Methylbenzotriazole

Figure 29:
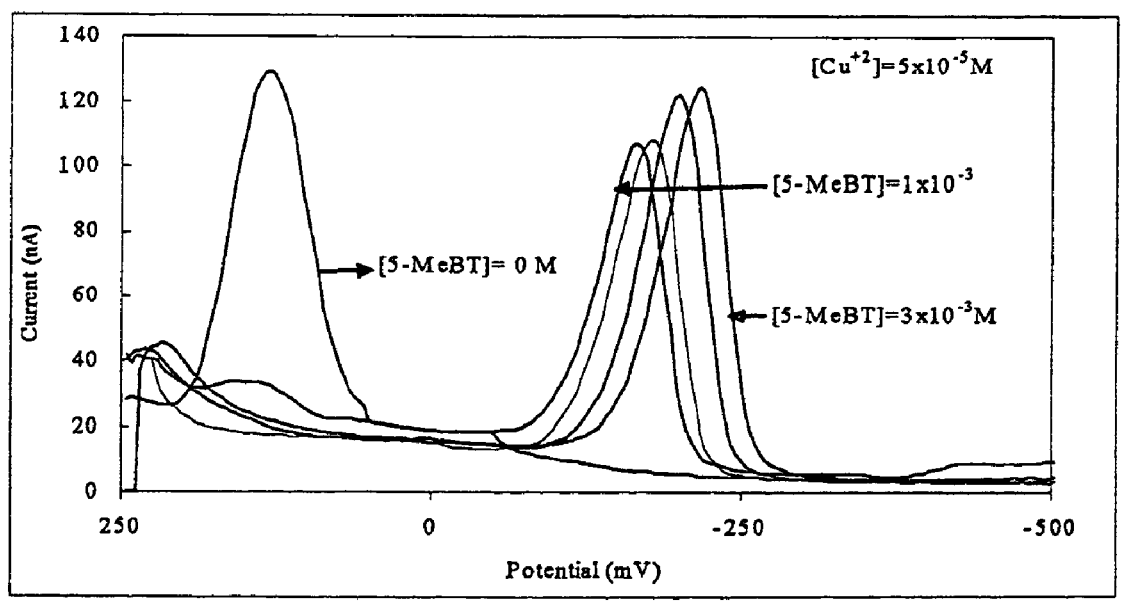
FIG. 29 is a differential pulse polarogram of Cu(II):5-methylbenzotriazole system showing the potential shift and streaming current reduction resulting from the addition of increasing amounts of benzotriazole. $Cu(II)=5\times10^{-5}M$

A relatively large potential shift was observed when 5-MeBT was added to solution containing Cu (II); this shift pattern validated the use of DPP for formation constant determinations. FIG. 29 presents a polarogram typical of those associated with a copper-methylbenzotriazole system after the incremental additions of MeBT.

Figure 30:
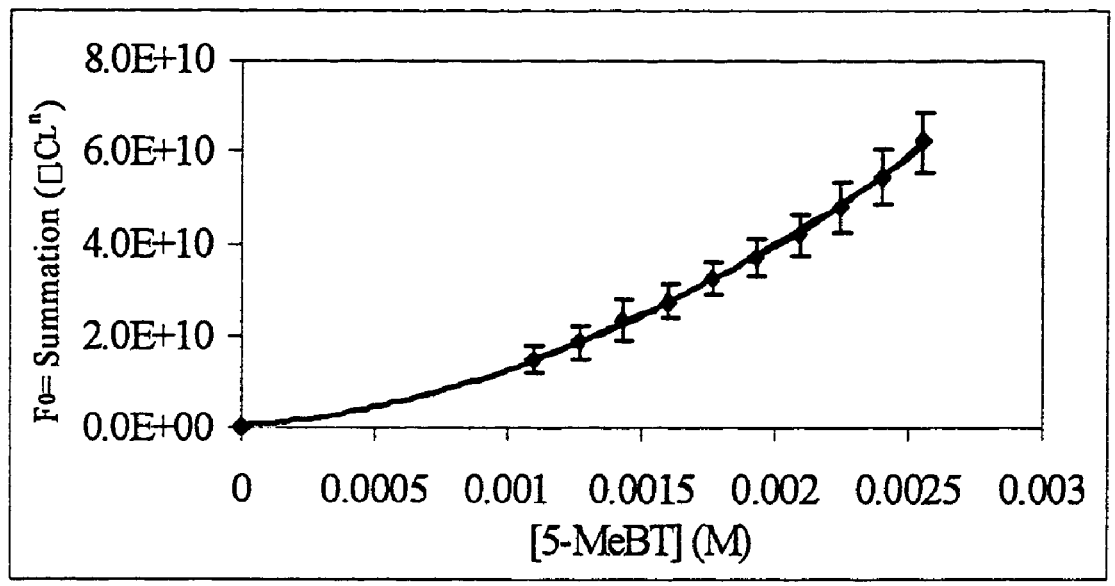
FIG. 30 illustrates a summation of stepwise stability constant-ligand concentration products for test solutions containing Cu(II) and increasing concentrations of 5-methylbenzotriazole. $[Cu(II)]=5\times10^{-5}M$, pH=2.5, T=25° C. Symbols represent the averages of triplicate observations; error bars represent standard deviation.
Figure 31:
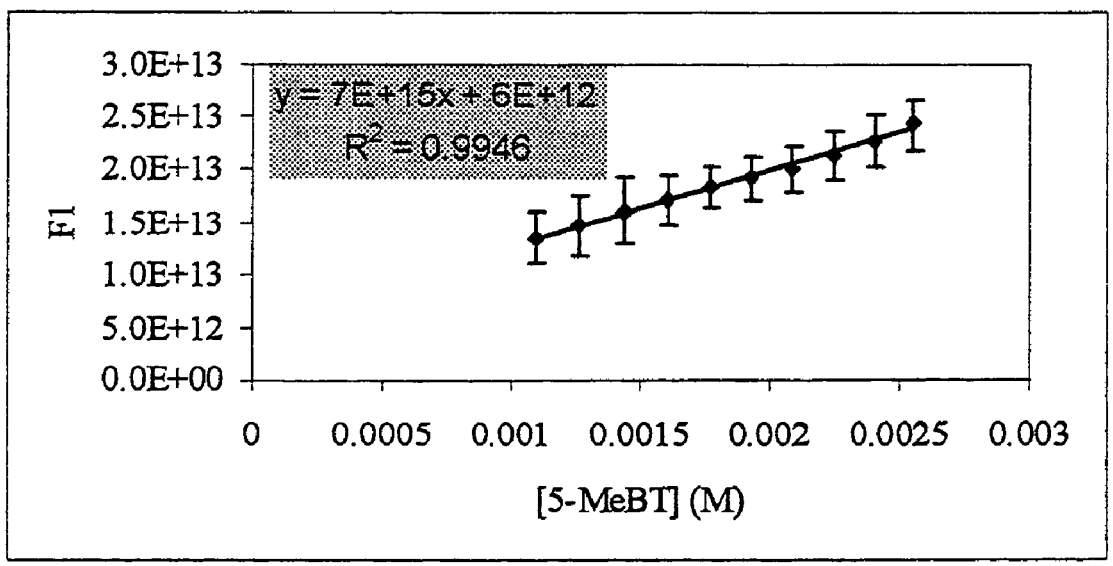
FIG. 31 illustrates first derivatives of stability constant-ligand concentration product summation for test solutions containing Cu(II) and increasing concentrations of 5-methylbenzotriazole. $[Cu(II)]=5\times10^{-5}M$, pH=2.5, T=25° C. Symbols represent the averages of triplicate observations; error bars represent standard deviation.
Figure 32:
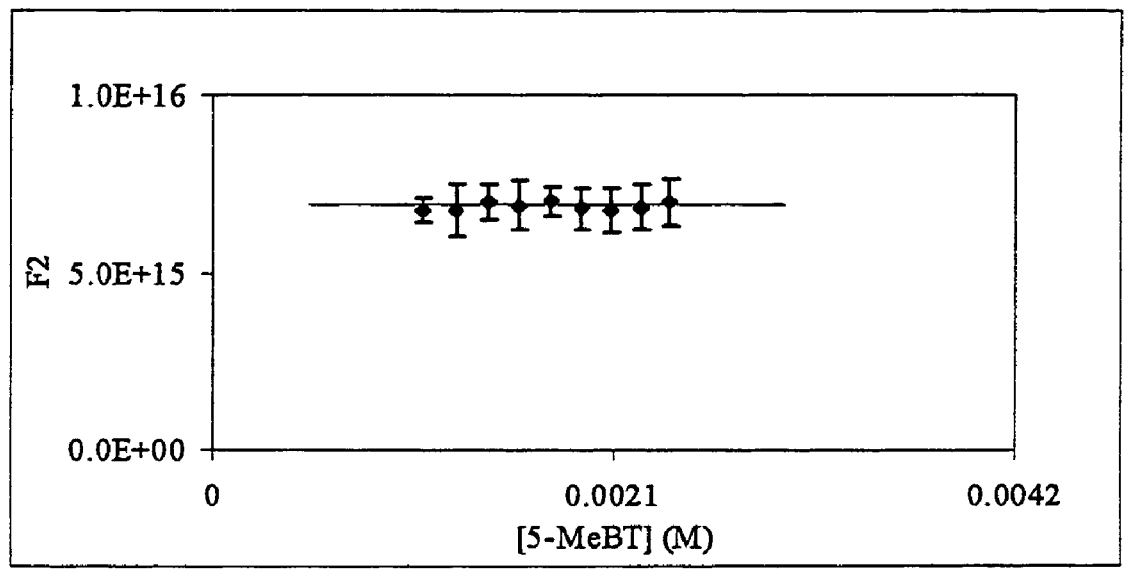
FIG. 32 illustrates second derivatives of stability constant-ligand concentration product summation for test solutions containing Cu(II) and increasing concentrations of 5-methylbenzotriazole. $[Cu(II)]=5\times10^{-5}M$, pH=2.5, T=25° C. Symbols represent the averages of triplicate observations; error bars represent standard deviation.

In this study, the conditional stepwise stability constants (i.e. non-saturated copper complexes) as well as the overall (conditional) stability constant $\beta_2$ for Cu (II) were determined. FIGS. 30 through 32 present the polarographic results obtained for Cu (II): 5-methylbenzotrizole system. A plot of $F_o(X)$ vs. [MeBT], yielded a rising curve with an intercept of $\beta_o$, which was equal to one. A first derivative of the previous plot, $F_1(X)$ vs. [MeBT] yielded a straight line indicating that copper ions are coordinated with benzotriazole ligands at a maximum stoichiometric ratio of 2. Regression analysis showed that the intercept of the first derivative plot, $F_1(X)$ corresponded to a value of $\beta_1$ (first complex stability) approximately equal to $6 \times 10^{12}$, while the slope of this line corresponded to a value of $\beta_2$ (overall stability constant) approximately equal to $7 \times 10^{15}$. A confirmation for the value for $\beta_2$ was provided by the intercept of the second derivative plot, $F_2(X)$ vs. [5-MeBT], which yielded a straight line parallel to the [5-MeBT] axis, indicating that the highest ligand: metal ratio of Cu-MeBT interactions was 2. The intercept was found to equal $7 \times 10^{15}$. The maximum coordination number was also confirmed by the slope of the plots of half wave potential shifts vs. Log [5-MeBT] according to the methods of Crow (1969).

Figure 33:
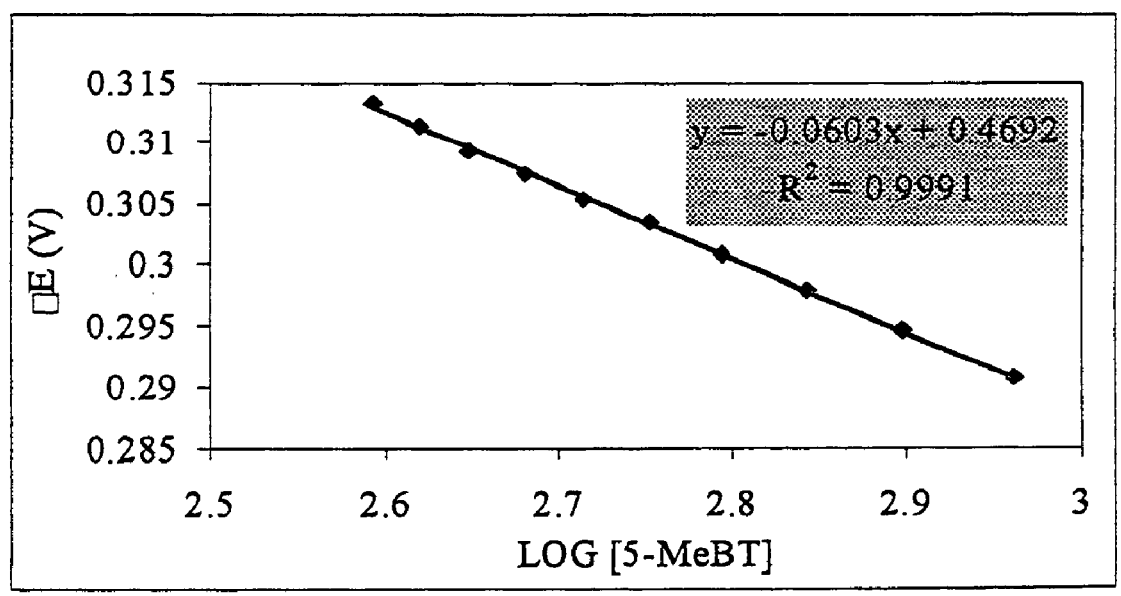
FIG. 33 illustrates half wave potential shift for the reduction of Cu(II) in response to increasing concentrations of 5-methylbenzotriazole. pH=2.5; T=25° C. Symbols represent the averages of triplicate observations; error bars represent standard deviation.

FIG. 33 presents independent confirmation of the results determined by the DeFord-Hume approach using the Ligane method [6-10], where the coordination between Cu and methylbenzotriazole was found to approach the maximum ligand number of 2.

Figure 34:
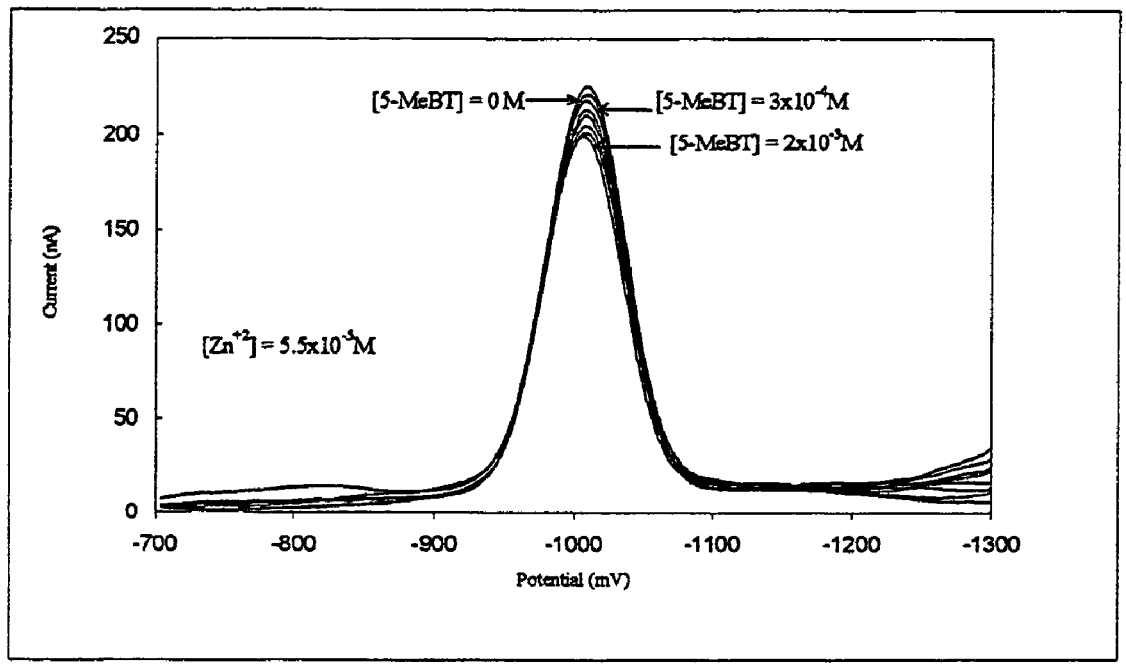
FIG. 34 is a differential pulse polarogram of a Zn(II):5-methylbenzotriazole system showing the potential shift and streaming current reduction resulting from the addition of increasing amounts of benzotriazole.

As seen in FIG. 34, no significant potential shifts were observed when increasing methybenzotriazole masses were added to zinc-containing solutions, indicating that either weak (or no) complexes formed, or DPP could not be used in this application. Since DPP was unsuitable for formation constant determination of Zn(II): MeBT complexes, further electrochemical characterization was abandoned for zinc-MeBT interactions.

Table 4 summarizes stability constants for 5-methylbenzotriazole complexes with Pb(II), Cu(II) and Zn(II) derived from DeFord-Hume and Lingane polarographic analysis.

TABLE 4

Summary of Deford Hume and Lingane stability constants for Pb(II), Cu(II), and Zn(II) complexation interactions with 5-methybenzotriazole

| Metal | Metal conc. (M) | 5-MeBT conc. (M) | Lingane method Log $\beta_n$ | DeFord-Hume method Log $\beta_1$ | DeFord-Hume Log $\beta_2$ | Maximum coordination number |
|---|---|---|---|---|---|---|
| Pb(II) | $3 \times 10^{-5}$ | $0\text{-}7 \times 10^{-3}$ | 3.8 | 3.3 | — | 1 |
| Cu(II) | $5 \times 10^{-5}$ | $0\text{-}3 \times 10^{-3}$ | 15.8 | 12.8 | 15.8 | 2 |
| Zn(II) | $5.5 \times 10^{-5}$ | $0\text{-}2 \times 10^{-3}$ | — | — | — | — |

Metal Immobilization Studies

Lead

Figure 35:
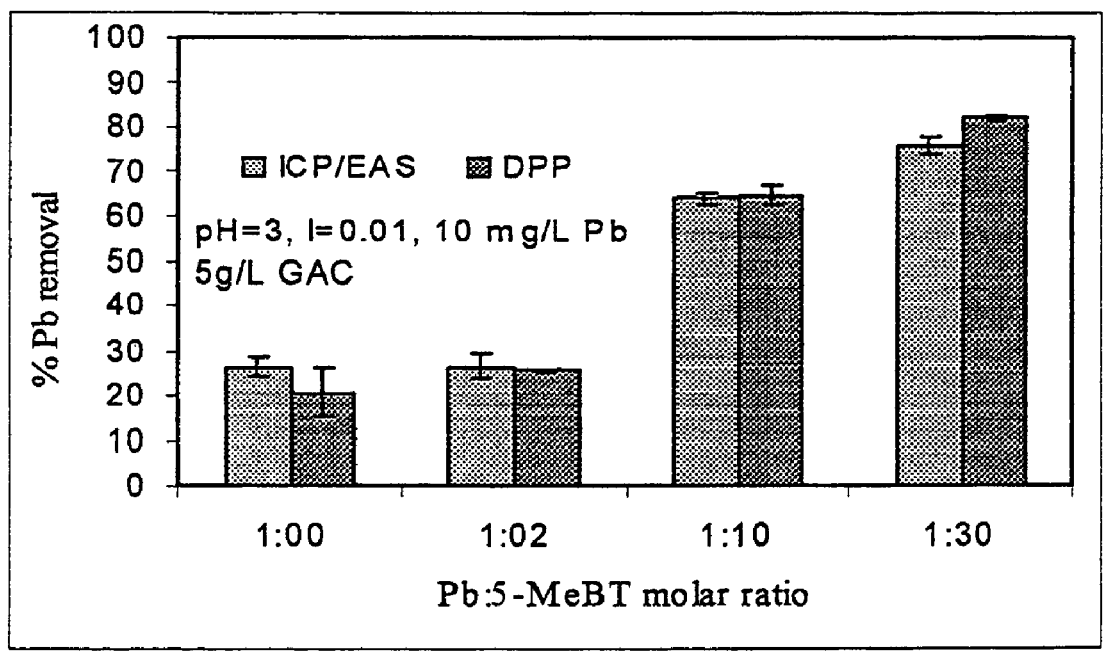
FIG. 35 is a bar chart illustrating lead removal on Calgon GAC at pH 3 for different Pb: 5-MeBT molar ratios. Two different metal analysis techniques were used; differential pulse polarography and inductive coupled plasma/atomic emission spectroscopy. Initial lead concentration was 10 mg/L, pH=3, I=0.01M. Results are averages of three independent observations. Error bars are ±1standard deviation.
Figure 36:
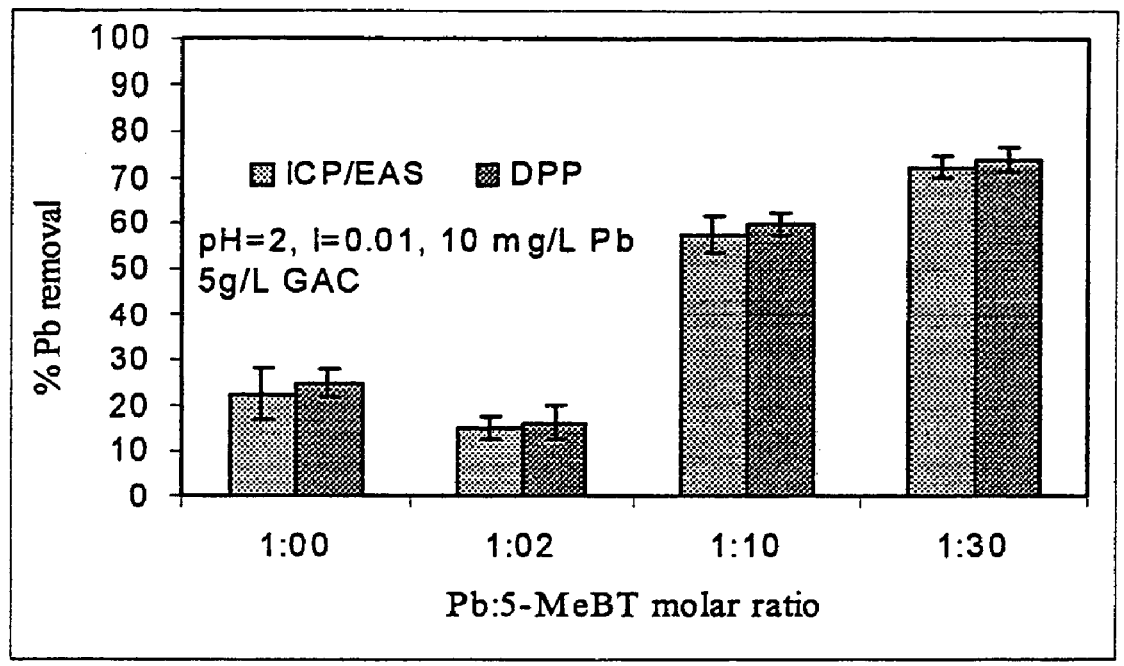
FIG. 36 is a bar chart illustrating lead removal on Calgon GAC at pH 2 for different Pb: 5-MeBT molar ratios. Two different metal analysis techniques were used; differential pulse polarography and inductive coupled plasma/atomic emission spectroscopy. Initial lead concentration was 10 mg/L, pH=3, I=0.01M. Results are averages of three independent observations. Error bars are ±1standard deviation.

The ability of 5-MeBT to enhance the immobilization of Pb(II) on activated carbon under acidic conditions is summarized in FIGS. 35 and 36. Several MeBT concentrations were investigated, and carbon doses of 5 g/L were employed. At pH 3, in the absence of MeBT, between 16-20% of the Pb(II) present was sequestered on the activated carbon surfaces. The addition of 5-MeBT resulted in markedly increased removal efficiency to a maximum of 82%, which required a ligand to metal ratio of approximately 30:1. The molar ratio between Pb(II) and the chelating agent (5-MeBT) was found to have strong effect on the removal of this heavy metal. These results are in general in agreement with those observed for Pb(II)-EDTA complexes on other types of GAC ($pH_{zpc}$=8.5), except that they were not exceuted under acidic conditions (Shay and Etzel 1992). However, these results are contrary to many literature reports, which suggest that the presence of several different types of chelating agents can reduce the metal immobilization potential by activated carbon (SenGupta 2002).

Most attempts to leverage metal-chelating molecules for enhancing metal sorption on GAC used relatively small compounds (e.g. phosphate, EDTA), none of which had aromatic character or strong amphipathic properties, or were useful under acidic conditions. In contrast, benzotriazoles are extremely strong metal-chelating agents through a very broad pH range (2-9) and exhibit amphipathic properties because of their resonant aromatic and heterocyclic stucture, as well as the functional groups conjugated to the aromatic and heterocyclic moieties. Indeed, their complexation to metals likely increases their hydrophobic character.

Figure 37:
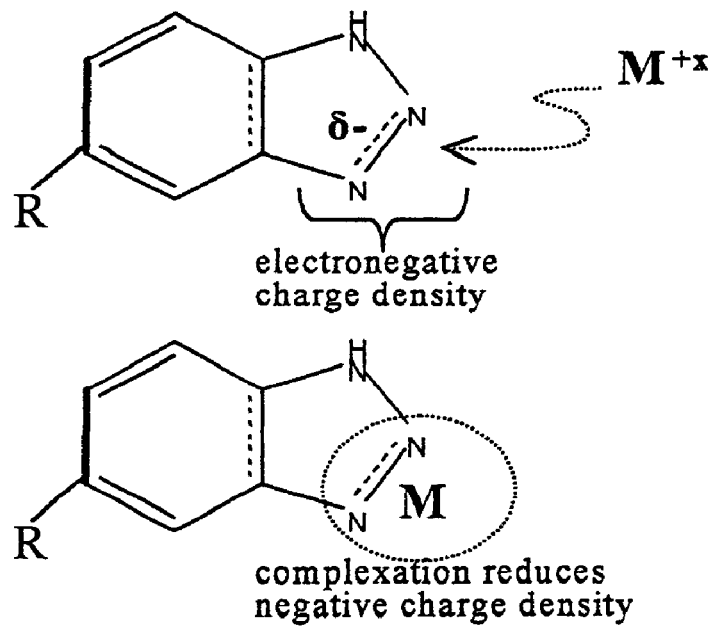
FIG. 37 is a diagram illustrating that benzotriazole coordination with metal ions greatly reduces the hydrophilic character of benzotriazole by neutralizing the negative charge density of its triazole ring.

A major mechanism supporting the ability of MeBT to enhance the metal immobilization potential of activated carbon is based on the following hypothesis: Given that activated carbon has surface sites with an affinity for nonpolar molecules with aromatic character, the net absorption force is driven by thermodynamic exclusion of a hydrophobic compound for a surface. In the case of benzotriazole derivatives, their complexation with a metal increases their hydrophobic surface character and sorption potential (FIG. 37) in a pH range where they are charge neutral (FIG. 20).

Precipitate

Another enhancement mechanism is likely associated with precipitation. Benzotriazoles have been documented to form microprecipitates with some transition metals (above a pH dependent concentration threshold). These precipitates then retained on the surface of activated carbon.

During the metal-removal studies executed and reported here, the effect of MeBT ligands had on lead removal by precipitation was also investigated. At pH 2, Pb(II) removal in the absence of GAC was approximately 2.5%, 6% and 12% when MeBT was added to Pb(II) molar ratios of 2, 10 and 30 respectively. At pH 3, this precipitation-associated removal increased to about 20%. Soluble 5-MeBT concentration was measured using HPLC, and for all observations, 5-MeBT content was less than 0.25 mg/L after 24 hours of exposure to GAC. While some precipitation occurred, centrifugation confirmed that sorption of MeBT:Pb complexes, precipitation was not the dominant mechanism. Results suggest that resultant Pb:5-MeBT complex display adsorption properties more closely related to those of MeBT than that of free metal ions: of the total amount of lead sequestered on GAC surfaces, approximately 25% was associated with an MeBT precipitate, and 75% was associated with soluble MeBT complex. The governing lead removal mechanism was thus sorption of Pb:MeBT complexes; however MeBT did induce some precipitation of Pb(II), some of which was also removed by GAC association (s).

Figure 38:
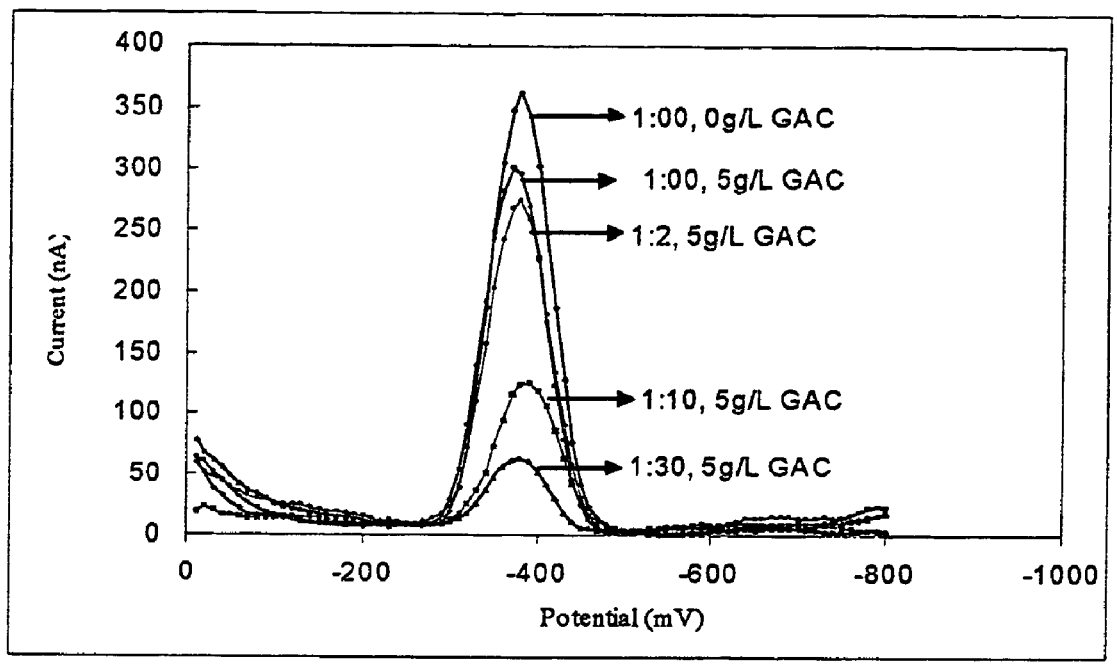
FIG. 38 is a plot showing polarographic response to increasing MeBT concentrations in solution containing 10 mg/L Pb(II), and in the presence and absence of granular activated carbon at pH 3.
Figure 39:
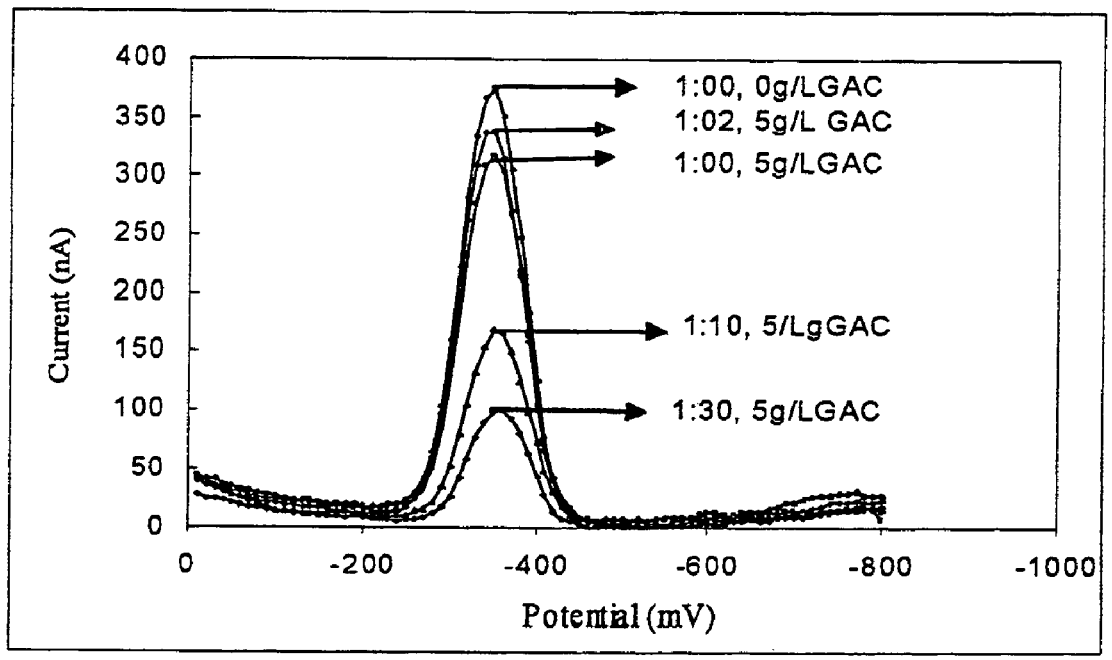
FIG. 39 is a plot showing polarographic response to increasing MeBT concentrations in solutions containing 10 mg/L Pb(II), and in the presence and absence of granular activated carbon at pH 2.
Figure 40:
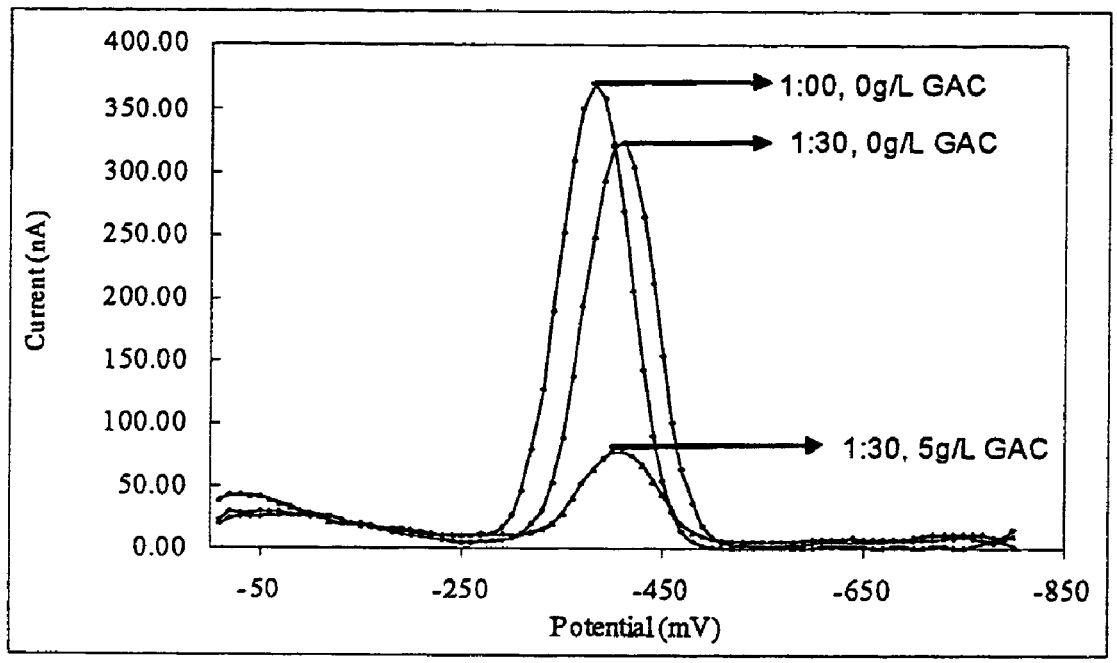
FIG. 40 is a plot showing polarographic response to MeBT addition in the presence and absence of granular activated carbon at pH=3 in solution containing 10 mg/L Pb.

FIGS. 38 and 39 present the net reduction in polarographic streaming current that resulted from increasing additions of MeBT to lead-containg solutions at different pH levels ($2 \leq pH \leq 3$). Not only was a reduction in streaming current observed, but a concomitant negative potential shift was also observed upon MeBT addition, which is consistent with polarographic theory confirming the formation of a Pb(II)-MeBT complex (FIG. 40). Increases in MeBT concentrations corresponded to nearly proportional decreases in Pb(II) removal in a certain range (e.g. MeBT addition corresponding to molar ratios of 1:2 and 1:10 Pb(II) to MeBT). These results confirmed that MeBT can increase the adsorption of lead on certain types of activated carbon.

Copper.

Figure 41:
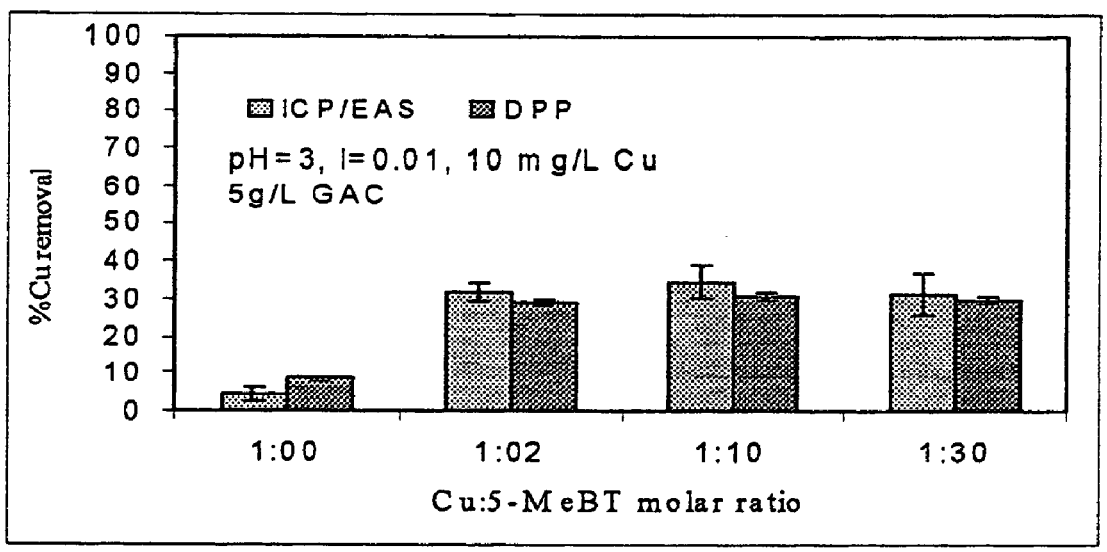
FIG. 41 is a bar chart illustrating copper removal by Calgon MRX-P GAC at pH 3 and different Cu: 5-MeBT molar ratio. Two different metal analysis techniques were used; differential pulse polarography and inductive coupled plasma/atomic emission spectroscopy. Initial copper concentration was 10 mg/L, pH=3, I=0.01M. Results are averages of three independent observations. Error bars are ±1standard deviation.
Figure 42:
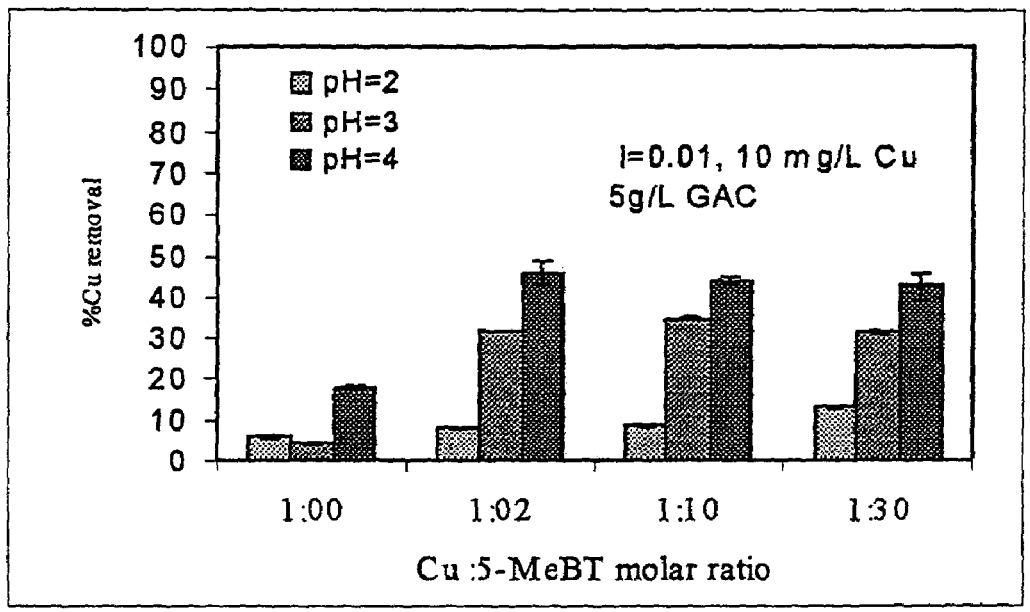
FIG. 42 is a bar chart showing copper removal by Calgon MRX-P GAC at pH 2, 3 and 4 and different Cu: 5-MeBT molar ratio. Results are averages of three independent observations. Error bars are ±1stadard deviation. Results analyzed ICP/AES.

The ability of 5-MeBT to enhance the immobilization of copper on activated carbon through pH range between 2 and 4, are summarized in FIGS. 41 and 42. Several MeBT concentrations were investigated, and carbon doses of 5 g/L were employed. At pH 2, in the absence of MeBT, approximately 6% of the Cu(II) present was sequestered on the activated carbon surfaces. Increasing ligand concentrations resulted in increased removal efficiency to a maximum of 13% at a ligand to metal ratio of 30:1. The molar ratio between Cu(II) and the chelating agent (5-MeBT) was found to have little effect on the removal of this heavy metal in the pH range studied. At pH 3, a Cu(II) removal was between 32-35% for MeBT to Cu(II) molar ratios of 2, 10 and 30; while only 4% was removed in the absence of MeBT. At pH 4, and a metal to ligand ratios of 1:2, 1:10, and 1:30, 42 to 46% of Cu(II) were removed and where only 18% was removed in the absence of MeBT. 5-MeBT concentration was measured using HPLC and for all observations, 5-MeBT content was less than 0.25 mg/L after 24 hours of exposure to GAC. Metal removal was not improved by increasing the Cu(II): MeBT molar ratio above 1:2. MeBT is an extremely strong copper complexing agent ($\beta \sim 10^{15}$), and on this particular activated carbon, high MeBT concentrations did not affect the metal removal potential until enough MeBT was added so that the competition between MeBT and Cu(II)-MeBT complexes for the carbon surface become important. The removal of Cu(II)-5-MeBT complex for the three different ratios was improved by increasing pH, which was likely due to the precipitation of Cu(II)-MeBT polymers at higher pH levels. At higher pH, the governing copper removal mechanism was likely precipitation and green-colored particulate matter was formed immediately after the addition of MeBT to copper-containing solutions at pH 4 (FIG. 6-19). At pH 2, almost none of the total amounts of copper sequestered on GAC surfaces was associated with an MeBT precipitate, whereas approximately 18, and 40% of the copper removal was associated with an MeBT precipitate at pH 3 and 4, respectively.

Figure 43:
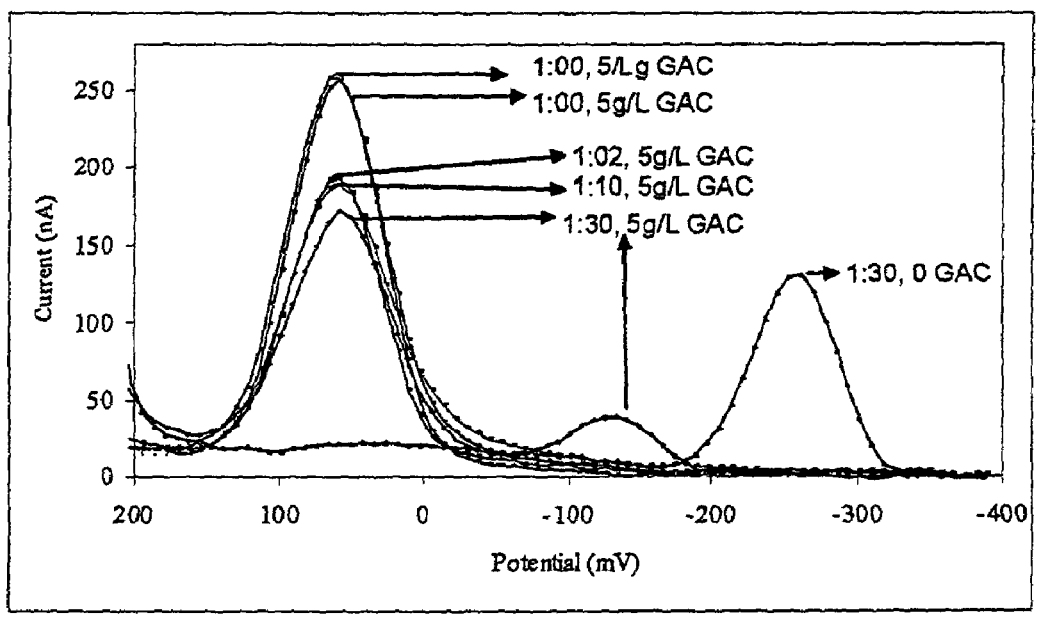
FIG. 43 is a plot of polarographic response to increasing MeBT concentrations in solution containing 10 mg/L Cu(II), and in the presence and absence of granular activated carbon at pH 3.

FIG. 43 shows the net reduction in polarographic streaming current that resulted from increasing additions of MeBT to copper-containing solution at pH 3. After the addition of 5-MeBT, a large negative potential shift was observed, which confirmed complex formation. At an MeBT to Cu(II) molar ratio of 30, two spectral peaks emerged, one at 58 mV and the other at −135 mV. The total current for both peaks is equal to that for 1:2 which, suggest the formation of another type of Cu:MeBT complex or precipetate at high MeBT concentration.

Zinc.

Figure 44:
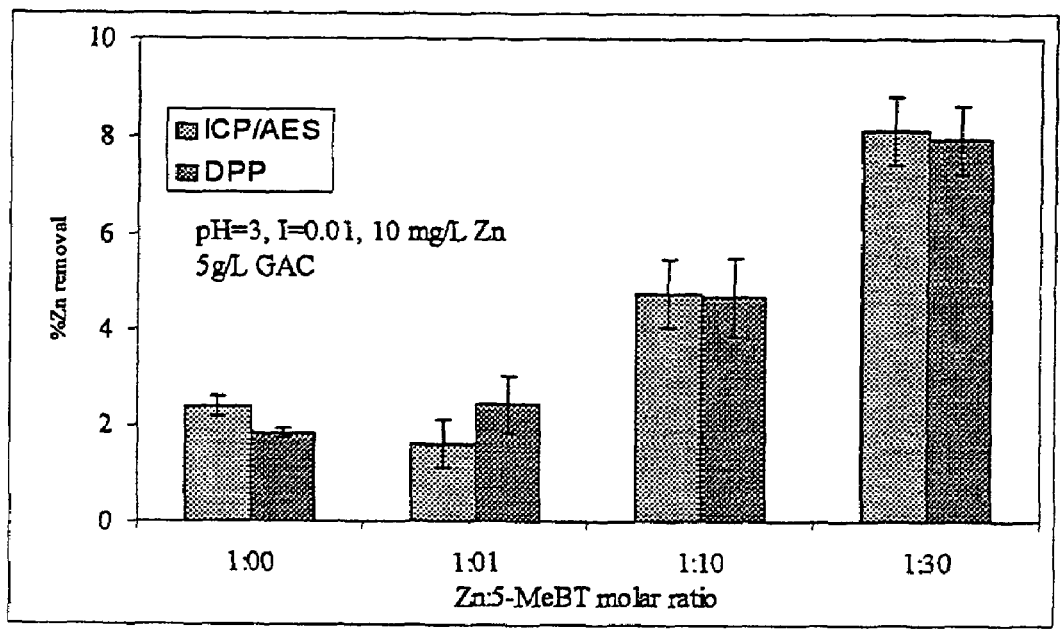
FIG. 44 is a bar chart illustrating zinc removal by Calgon MRX-P GAC at pH 3 and different Zn(II): 5-MeBT molar ratio. Results are averages of three independent observations. Two different metal analysis techniques were used; differential pulse polarography and inductive coupled plasma/atomic emission spectroscopy. Initial Zn concentration was 10 mg/L, pH=3, I=0.01M. Error bars are ±1standard deviation.

The ability of 5-MeBT to enhance the immobilization of zinc on activated carbon at pH 3 is summarized in FIG. 44. Several MeBT concentrations were investigated, and carbon doses of 5 g/L were employed. In the absence of MeBT, only 2% of the Zn(II) present was sequestered on the activated carbon surfaces. Increasing MeBT ligand concentrations resulted in increased removal efficiency to a maximum of 9% at a ligand to metal ratio of 30:1. 5-MeBT concentration was measured using HPLC and for all observations, 5-MeBT content was less than 0.25 mg/L after 24 hours of exposure to GAC.

Figure 45:
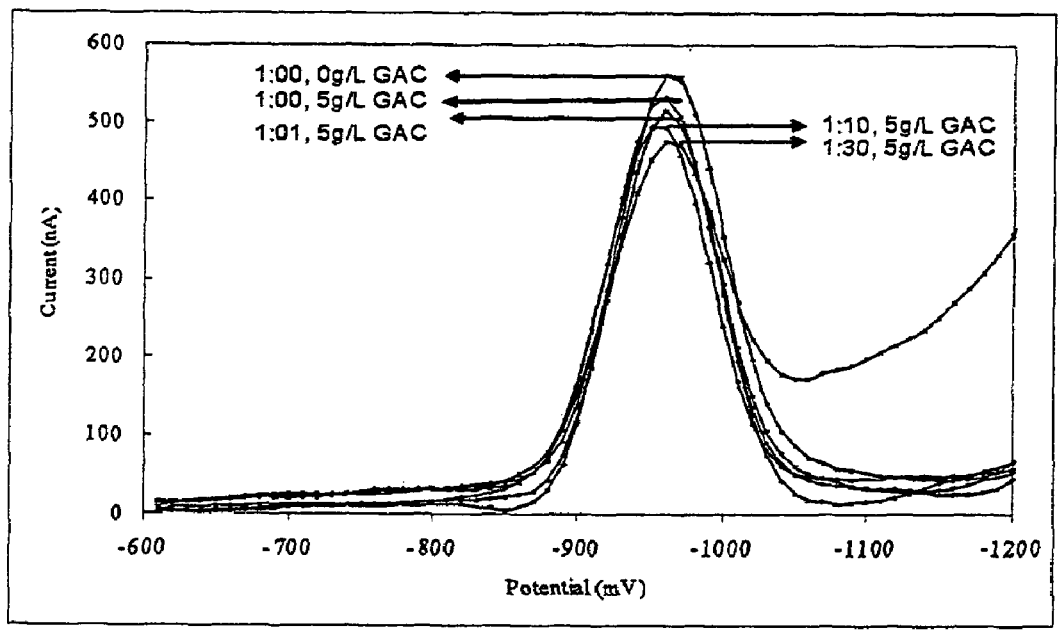
FIG. 45 is a plot of polarographic response to increasing MeBT concentrations to 10 mg/L Zn(II) in the presence and absence of granular activated carbon at pH 3.

As shown in FIG. 45, no potential shifts were observed upon addition of different 5-MeBT concentration indicating that either no zinc-MeBT complex formed, or the complex is very weak, which makes DPP unsuitable to quantify the interactions between zinc and methylbenzotriazole. Clearly Zn(II)-MeBT behavior was not parallel to that of lead or copper. These results explain the poor enhancement MeBT can have on increasing zinc removal potential on GAC.

Desorption Potential

The potential for the desorption of MeBT from GAC surfaces was monitored over a 30 day period. Placing Calgon MRX-P, which was previously saturated with methybenzotriazole in metal-and benzotriazole-free solutions of varrying pH (2-5) and ionic strength, did not liberate measurable amounts of 5-MeBT from the GAC. This desorption behavior suggests that regardless of metal complexaxation conditions, that once methylbenzotriazole is sorbed to GAC, its release is negligibale for practical purposes.

It has been demonstrated herein that 5-MeBT can be used to enhance metal removal at low pH by sequestering metal:MeBT complexes and precipitates onto activated carbon. Metal:ligand molar ratio and pH had significant effects on selected metal removal, while the type and strength of background electrolyte had little effects. For lead systems, Pb:MeBT molar ratio was important, since higher removal could be achieved by simple increases in MeBT exposure. For copper systems, there was no advantage of using molar ratios higher than 1:2, and at ratios higher than 1:2 no sorptive inhibition observed. For zinc systems, there was little enhancement of metal removal in response to the addition of MeBT. This may be due to a weak complex formation. MeBT enhancement to the immobilization of metals on GAC was sensitve to pH changes particularly near the first $pK_a$ of MeBT (pH 2) or where precipitation products became evident.

The ability of 5-MeBT to enhance the sorptive removal of transition metals from acidic water emphasizes the potential to leverage these types of corrosion inhibitors in a two-phase process incorporating activated carbon with an additional cost of $1 per gram for MeBT over GAC. Such a treatment is considered to offer process flexibility and economic advantages over conventional alkaline precipitation or ion exchange processes.

Based on Benzotriazole sorption modeling performed in the context of the present invention, on activated carbon, equilibrium capacity for lead in a Benzotriazole-GAC system is approximately 52 grams of lead for every Kg of activated carbon. Accordingly, a conservative calculation of capacity to remove lead at pH 3, using the present invention, uses 1 kg of activated carbon to completely immobilize approximately 52 grams of lead when it is used in a 30:1 ratio. Completely immobilize, in this context, means that the lead content in the treated water is below the detection limit of the best available technology (EPA definition from "Methods for Determination of Metals in Environmental Samples," pg. 35, 3: EPA Monitoring and Support Laboratory, Cincinnati, Ohio). If a severely contaminated water stream, containing approximately 10 mg/L of lead, were mixed with Benzotriazole (30:1), as taught herein, and passed through activated carbon (see FIG. 13), 1 kg of activated carbon can treat approximately 5000 L of water (or approximately 1250 gallons) provided the water is not compromised by other dissolved or particulate contaminants. It is noted that this estimate is based on a 10 hour contact time in a flow through column. These results are considered to be no less than remarkable over current metal contamination remediation in acidic solutions.

Thus, systems and methods for using metal binding compounds and sorbents therefore to remove metals from solution have been disclosed. These systems and methods may provide an important new tool in environmental remediation of metal contaminated waters and wastewaters. For example, the compounds and sorbents disclosed herein may be used to reduce the environmental risks associated with acid mine drainage and other discharges. Embodiments of the present invention may extend the engineering possibilities to remove soluble metals from acid mine drainage streams and industrial waste discharges, either through retrofitting existing precipitation, ion exchange, or membrane treatment facilities (or combination thereof), or through in situ applications that can be applied to natural or engineered surface water impoundments such as wetlands.

Although described with reference to specific embodiments it should be remembered that various modifications and changes may be made to the techniques described herein without departing from the broader spirit and scope of the invention. The specification and drawings are accordingly to be regarded in an illustrative rather than a restrictive sense and the invention measured only in terms of the claims, which follow.

BIBLIOGAPHY (Note: Certain references not included in this list have been cited in full above.)

Accashian, J. V., R. T. Vinopal, et al. (1998). "Aerobic Growth on Nitroglycerin as the Sole Carbon, Nitrogen, and Energy Source by a Mixed Bacterial Culture." *Applied and Environmental Microbiology* 64(9): 3300-3304.

Cancilla, D. A., J. Martinez, et al. (1998). "Detection of Aircraft Deicing/Anti-Icing Fluid Additives in a Perched Water Monitoring Well at an International Airport." *Environmental Science and Technology* 32: 3834-3835.

Coburn, C. B., R. D. Hudgens, et al. (1999). "Environmental effects of engine coolant additives." *Chem. Abs.* 130:235862.

Cornell, J. S. (2002). The Environmental Chemistry of Aircraft Deicing Fluid (ADF) Component Chemicals. *Civil, Environmental and Architectural Engineering.* Boulder, University of Colorado.

Crow, D. R. (1969). *Polarographic of Metal Complexes.* London and New York, Academic Press.

Deford, D. D. and D. N. Hume (1951). "The Determination of Concecutive Formation Constants of Complex Ions from Polarographic Data." *J. AM. Chem. Soc.* 73: 5321-5322.

Gruden, C. L. (2000). Fate and Toxicity of aircraft deicing fluid additives through anaerobic digester. *Department of civil. environmental. and architectural engineering.* Boulder, University of Colorado.

Gruden, C. L., S. M. Dow, et al. (2001). "Fate and Toxicity of Aircraft Deicing Fluids Additives through Anaerobic Digestion." *Water Environment Research* 73(1): 72-79.

Heath, G. A. and G. Hefter (1977). "The Use of Differential Pulse Polarography for the Determination of Stability Constants." *J. Electroanal Chem.* 84: 295-302.

Hickey, R. (1998). *Design and operation of a full-scale anaerobic fluidized bed reactor at the Albany County Airport.* Treatment of De-Icing Waste at Albany count Airport, Albany, N.Y., USA.

Kolpin, D. W., E. T. Furlong, et al. (2002). "Pharmaceuticals, Hormones, and other Organic Wastewater Contaminants in US Streams, 1999-2000: A national Reconnaissance." *Environmental Science & Technology* 36(6): 1202-1211.

Leden, I. (1941). *Z. phys. chem.*

McDonald, D. G. and A. F. Grandt (1981). Limestone-lime treatment of acid mine drainage-full scale., Environmental Protection Agency.

O'Brien, I. (2002). The Environmental Chemistry of Aircraft Deicing Fluid (ADF) Component Chemicals. *Civil, Environmental and Architectural Engineering.* Boulder, University of Colorado.

Parry, E. P. and R. A. Osteryoung (1965). "Evaluation of analytical pulse polarography." *anal. Chem.* 37: 1634.

Stewart, K. C. and R. C. E. Severson (1994). Guidline on geology, history, and surface water contamination in the area from Denver to Idaho springs. Colo., united state geological survey.

Sung, R. L. (1985). "Corrosion inhibitor and motor fuel composition containing it." *Chem. Abs.* 103:198394.

USEPA (1977). Investigation of Selected Potential Environmental Contaminants: Benzotriazoles. Washington D.C., Environmental Protection Agency: 191.

What is claimed is:

1. A method, comprising:
   in a solution having a specific acidic pH and containing metal cations, adding (i) an amphipathic, heterocyclic, metal-coordinating compound that is selected based, at least in part, on a charge distribution which maintains, at least approximately, a charge neutrality of the amphipathic, heterocyclic, metal-coordinating compound at said specific acidic pH and (ii) a sorbent, such that the addition at the specific acidic pH causes at least some of the metal-coordinating compound to bind with some of the metal cations and at least some of the metal-coordinating compound to sorb to the sorbent, along with any metal cations bound therewith by forming a combination of the metal-coordinating compound sorbed to the sorbent and, thereafter, introducing the combination into said solution.

2. The method of claim 1 wherein said sorbent includes activated carbon.

3. The method of claim 1 wherein said metal-coordinating compound includes a binding portion containing a plurality of heteroatoms and a hydrophobic portion for hydrophobically sorbing to the sorbent.

4. The method of claim 1 wherein the metal-coordinating compound is selected from the group consisting of a benzotriazole and a benzothiazole.

5. The method of claim 1 wherein said specific pH is in a range from approximately pH 2 to pH 6 and said metal-coordinating compound is benzotriazole, benzothiazole or methylbenzotriazole.

6. The method of claim 5 wherein said sorbent is an H type activated carbon.

7. The method of claim 1 wherein said specific pH is less than approximately 2.

8. The method of claim 7 wherein said metal-coordinating compound is selected as at least one member of the group consisting of carboxybenzotriazole, any fatty acid conjugated benzotriazole derivative, butylbenzotriazole, other aliphatic conjugated benzotriazole and benzothiazole.

9. The method of claim 7 wherein said sorbent is an acidic activated carbon.

10. A method, comprising:
    in a solution having a specific acidic pH of less than approximately 2 and containing metal cations, adding (i) an amphipathic, heterocyclic, metal-coordinating compound that is selected based, at least in part, on a charge distribution which maintains, at least approximately, a charge neutrality of the amphipathic, heterocyclic, metal-coordinating compound at said specific acidic pH and (ii) a sorbent, such that the addition at the specific acidic pH causes at least some of the metal-coordinating compound to bind with some of the metal cations and at least some of the metal-coordinating compound to sorb to the sorbent, along with any metal cations bound therewith and said sorbent is an L type activated carbon.

11. The method of claim 9 wherein said metal-coordinating compound is at least one of benzotriazole and benzothiazole.

12. The method of claim 11 wherein said sorbent is an acidic activated carbon.

13. A method, comprising:
    in a solution having a specific acidic pH of less than approximately 2 and containing metal cations, adding (i) an amphipathic, heterocyclic, metal-coordinating compound that is selected based, at least in part, on a charge distribution which maintains, at least approximately, a charge neutrality of the amphipathic, heterocyclic, metal-coordinating compound at said specific acidic pH and that is at least one of benzotriazole and benzothiazole and (ii) a sorbent, such that the addition at the specific acidic pH causes at least some of the metal-coordinating compound to bind with some of the metal cations and at least some of the metal-coordinating compound to sorb to the sorbent, along with any metal cations bound therewith and said sorbent is an L type activated carbon that is an acidic activated carbon.

14. The method of claim 1 including enclosing the sorbent and the metal-coordinating compound in a liquid permeable enclosure through which said acidic solution passes.

15. A method, comprising:
    in a solution having a specific acidic pH and containing metal cations, adding (i) an amphipathic, heterocyclic, metal-coordinating compound that is selected based, at least in part, on a charge distribution which maintains, at least approximately, a charge neutrality of the amphipathic, heterocyclic, metal-coordinating compound at said specific acidic pH and (ii) a sorbent, such that the addition at the specific acidic pH causes at least some of the metal-coordinating compound to bind with some of the metal cations and at least some of the metal-coordinating compound to sorb to the sorbent, along with any metal cations bound therewith;
    enclosing the sorbent and the metal-coordinating compound in a liquid permeable enclosure through which said acidic solution passes; and
    equilibrating the sorbent and the metal-coordinating compound prior to said enclosing.

16. A method, comprising:
  in a solution having a specific acidic pH and containing metal cations, adding (i) an amphipathic, heterocyclic, metal-coordinating compound that is selected based, at least in part, on a charge distribution which maintains, at least approximately, a charge neutrality of the amphipathic, heterocyclic, metal-coordinating compound at said specific acidic pH and (ii) a sorbent, such that the addition at the specific acidic pH causes at least some of the metal-coordinating compound to bind with some of the metal cations and at least some of the metal-coordinating compound to sorb to the sorbent, along with any metal cations bound therewith; and
  removing from the solution the metal-coordinating compound sorbed to the sorbent and the metal cations bound with the sorbed metal-coordinating compound.

17. The method of claim 1 wherein the metal cations bind the metal-coordinating compound by each metal ion coordinating with a plurality of heteroatoms of the metal-coordinating compound.

18. A method, comprising:
  in a solution having a specific acidic pH and containing metal cations, adding (i) an amphipathic, heterocyclic, metal-coordinating compound that is selected based, at least in part, on a charge distribution which maintains, at least approximately, a charge neutrality of the amphipathic, heterocyclic, metal-coordinating compound at said specific acidic pH and (ii) a sorbent, such that the addition at the specific acidic pH causes at least some of the metal-coordinating compound to bind with some of the metal cations and at least some of the metal-coordinating compound to sorb to the sorbent, along with any metal cations bound therewith, wherein adding includes separately introducing each of the metal-coordinating compound and the sorbent to said solution.

19. The method of claim 18 wherein said metal-coordinating compound is introduced before said sorbent is introduced.

20. The method of claim 1 wherein said metal-coordinating compound includes a ring selected from the group consisting of a triazole ring and a thiazole ring and the metal cations bind with said ring.

21. The method of claim 1 wherein said solution is aqueous and adding includes selecting a compound from the group consisting of a benzotriazole and a benzothiazole as said metal-coordinating compound.

22. The method of claim 1 wherein the metal cations include at least one of an arsenic ion, a cadmium ion, a cobalt ion, a copper ion, a gold ion, a iron ion, a lead ion, a mercury ion, a nickel ion, a selenium ion, a silver ion, and a zinc ion and wherein the method includes selecting as the sorbent an activated carbon.

23. The method of claim 1 wherein (1) said metal cations which are bound with said metal-coordinating compound, and (2) said metal-coordinating compound sorbed to said sorbent form a complexation, said method further comprising: removing the metal cations from the complexation to recover a base metal of the metal cations.

24. A method, comprising:
  in a solution having a specific acidic pH and containing metal cations, adding (i) an amphipathic, heterocyclic, metal-coordinating compound and (ii) a sorbent and providing said metal-coordinating compound and said sorbent in a dissolvable tablet form, such that the addition at the specific acidic pH causes at least some of the metal-coordinating compound to bind with some of the metal cations and at least some of the metal-coordinating compound to sorb to the sorbent, along with any metal cations bound therewith.

25. A method for removing metal cations from a solution having a specific acidic pH, said method comprising:
  enclosing an amphipathic, heterocyclic metal-coordinating compound that is selected based, at least in part, on a charge distribution which maintains, at least approximately, a charge neutrality of the amphipathic, heterocyclic, metal-coordinating compound at said specific pH and a sorbent in a flow-through enclosure; and
  causing said solution to flow through the enclosure such that at least some of the metal cations bind with the binding compound at the specific acidic pH and at least some of the metal-coordinating compound sorbs to the sorbent at said specific acidic pH, in said enclosure, along with any metal cations bound therewith and including sorbing the metal-coordinating compound to the sorbent before said enclosing.

26. A method for removing metal cations from a solution having a specific acidic pH, said method comprising:
  enclosing an amphipathic, heterocyclic metal-coordinating compound that is selected based, at least in part, on a charge distribution which maintains, at least approximately, a charge neutrality of the amphipathic, heterocyclic, metal-coordinating compound at said specific pH and a sorbent in a flow-through enclosure; and
  causing said solution to flow through the enclosure such that at least some of the metal cations bind with the binding compound at the specific acidic pH and at least some of the metal-coordinating compound sorbs to the sorbent at said specific acidic pH, in said enclosure, along with any metal cations bound therewith and including equilibrating the metal-coordinating compound with the sorbent before said enclosing.

* * * * *